US012340755B2

(12) United States Patent
Liu et al.

(10) Patent No.: US 12,340,755 B2
(45) Date of Patent: Jun. 24, 2025

(54) SCAN CIRCUIT, DISPLAY APPARATUS, AND METHOD OF OPERATING SCAN CIRCUIT

(71) Applicant: BOE Technology Group Co., Ltd., Beijing (CN)

(72) Inventors: Weixing Liu, Beijing (CN); Wanpeng Teng, Beijing (CN); Chunfang Zhang, Beijing (CN); Zhiqiang Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/040,769

(22) PCT Filed: Apr. 28, 2022

(86) PCT No.: PCT/CN2022/089890
§ 371 (c)(1),
(2) Date: Feb. 6, 2023

(87) PCT Pub. No.: WO2023/206231
PCT Pub. Date: Nov. 2, 2023

(65) Prior Publication Data
US 2024/0265875 A1 Aug. 8, 2024

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0852* (2013.01); *G09G 2310/08* (2013.01)

(58) Field of Classification Search
CPC ............... G09G 3/3266; G09G 3/3233; G09G 2300/0852; G09G 2310/08;
(Continued)

(56) References Cited

U.S. PATENT DOCUMENTS

2006/0279205 A1* 12/2006 Li ........................ H10K 59/128 313/506
2008/0266234 A1 10/2008 Ieong et al.
(Continued)

FOREIGN PATENT DOCUMENTS

CN 103534747 A 1/2014
CN 104143310 A 11/2014
(Continued)

OTHER PUBLICATIONS

International Search Report & Written Opinion mailed Jan. 20, 2023, regarding PCT/CN2022/089890.

*Primary Examiner* — Antonio Xavier
(74) *Attorney, Agent, or Firm* — Intellectual Valley Law, P.C.

(57) ABSTRACT

A scan circuit is provided. The scan circuit includes a plurality of scan units in a plurality of stages, respectively. A respective scan unit of the plurality of scan units includes an output subcircuit. The output subcircuit includes a first switch transistor and a second switch transistor. A source electrode of the first switch transistor is coupled to a third terminal configured to receive a first clock signal. A drain electrode of the first switch transistor is coupled to a first output terminal configured to output a first control signal. A source electrode of the second switch transistor is coupled to a fourth terminal configured to receive the third clock signal. A drain electrode of the second switch transistor is coupled to a second output terminal configured to output a second control signal. Gate electrodes of the first switch transistor and the second switch transistor are coupled to a first node.

17 Claims, 30 Drawing Sheets

(58) Field of Classification Search
CPC ... G09G 2300/0443; G09G 2310/0267; G09G 2310/0286; G09G 2320/0209
See application file for complete search history.

(56) References Cited

U.S. PATENT DOCUMENTS

| | | | | |
|---|---|---|---|---|
| 2009/0322718 | A1* | 12/2009 | Higashida | H10K 59/1275 345/205 |
| 2014/0035891 | A1 | 2/2014 | Tanaka | |
| 2014/0333596 | A1 | 11/2014 | Yang et al. | |
| 2018/0217461 | A1 | 8/2018 | Guo et al. | |
| 2019/0110344 | A1 | 4/2019 | Lo et al. | |
| 2020/0243032 | A1 | 7/2020 | Gu et al. | |
| 2022/0101785 | A1 | 3/2022 | Chung et al. | |
| 2022/0102464 | A1 | 3/2022 | Lee et al. | |
| 2023/0186849 | A1* | 6/2023 | Chai | G09G 3/3266 345/204 |
| 2023/0186858 | A1* | 6/2023 | Kim | G09G 3/3233 345/214 |
| 2023/0274687 | A1* | 8/2023 | In | G09G 3/2096 |
| 2023/0326388 | A1* | 10/2023 | In | G09G 3/2092 |
| 2023/0351972 | A1* | 11/2023 | In | G09G 3/3266 |

FOREIGN PATENT DOCUMENTS

| | | | |
|---|---|---|---|
| CN | 104732950 | A | 6/2015 |
| CN | 107808604 | A | 3/2018 |
| CN | 109244116 | A | 1/2019 |
| CN | 109416902 | A | 3/2019 |
| CN | 109559679 | A | 4/2019 |
| CN | 110246459 | A | 9/2019 |
| TW | 201635515 | A | 10/2016 |
| WO | 2017219430 | A | 12/2017 |

* cited by examiner

SCAN CIRCUIT, DISPLAY APPARATUS, AND METHOD OF OPERATING SCAN CIRCUIT

CROSS-REFERENCE TO RELATED APPLICATION

This application is a national stage application under 35 U.S.C. § 371 of International Application No. PCT/CN2022/089890, filed Apr. 28, 2022, the contents of which are incorporated by reference in the entirety.

TECHNICAL FIELD

The present invention relates to display technology, more particularly, to a scan circuit, a display apparatus, and a method of operating a scan circuit.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In one aspect, the present disclosure provides a scan circuit, comprising a plurality of scan units in a plurality of stages, respectively; wherein a respective scan unit of the plurality of scan units comprises at least one of an input subcircuit, a first processing subcircuit, a second processing subcircuit, or an output subcircuit; the respective scan unit is configured to receive at least one of a first clock signal, a second clock signal, a third clock signal, a fourth clock signal, a first reference signal, or a second reference signal; wherein the output subcircuit comprises a first output terminal, a second output terminal, a first switch transistor, and a second switch transistor; a source electrode of the first switch transistor is coupled to a third terminal configured to receive the first clock signal; a drain electrode of the first switch transistor is coupled to the first output terminal configured to output a first control signal; a source electrode of the second switch transistor is coupled to a fourth terminal configured to receive the third clock signal; a drain electrode of the second switch transistor is coupled to the second output terminal configured to output a second control signal; and gate electrodes of the first switch transistor and the second switch transistor are coupled to a first node.

Optionally, the output subcircuit further comprises a tenth transistor and a thirteenth transistor; a source electrode of the tenth transistor and a source electrode of the thirteenth transistor are coupled to a fifth terminal configured to receive the first reference signal; a drain electrode of the tenth transistor is coupled to the first output terminal; a drain electrode of the thirteenth transistor is coupled to the second output terminal; and gate electrodes of the tenth transistor and the thirteenth transistor are coupled to a second node.

Optionally, the output subcircuit further comprises an eleventh transistor coupled between the tenth transistor and the first switch transistor; a gate electrode of the eleventh transistor is coupled to the first node; and at least one of a source electrode and a drain electrode of the eleventh transistor is coupled to the first output terminal.

Optionally, both of the source electrode and the drain electrode of the eleventh transistor is coupled to the first output terminal.

Optionally, the respective scan unit further comprises a second capacitor; a first capacitor electrode of the second capacitor is coupled to the source electrode of the tenth transistor; and a second capacitor electrode of the second capacitor is coupled to the second node.

Optionally, the respective scan unit further comprises a third capacitor; a first capacitor electrode of the third capacitor is coupled to the first node; and a second capacitor electrode of the third capacitor is coupled to a second terminal configured to receive a second reference signal.

Optionally, the input subcircuit comprises an input transistor, a first transistor, an input terminal, and a first terminal; a gate electrode of the input transistor and a source electrode of the first transistor are coupled to the first terminal configured to receive the second clock signal; a gate electrode of the first transistor and a drain electrode of the input transistor are coupled to a third node; a source electrode of the input transistor is coupled to the input terminal configured to receive a start signal or an output signal from a previous scan unit of a previous stage; and a drain electrode of the first transistor is coupled to a second node.

Optionally, the first processing subcircuit comprises a second transistor, a third transistor, a fourth transistor, and a fifth transistor; source electrodes of the third transistor and the fourth transistor are coupled to a drain electrode of the fifth transistor; drain electrodes of the third transistor and the fourth transistor are coupled to a third node; a gate electrode of the third transistor is coupled to the third terminal configured to receive the first clock signal; and a gate electrode of the fourth transistor is coupled to the fourth terminal configured to receive the third clock signal.

Optionally, a gate electrode of the fifth transistor and a drain electrode of the second transistor are coupled to a second node; a source electrode of the fifth transistor is coupled to a fifth terminal configured to receive the first reference signal; and a source electrode of the second transistor is coupled to a second terminal configured to receive the second reference signal.

Optionally, the second processing subcircuit comprises a seventh transistor and an eighth transistor; a gate electrode of the seventh transistor is coupled to a fourth node; a source electrode of the seventh transistor and a gate electrode of the eighth transistor are coupled to a sixth terminal configured to receive the fourth clock signal; a drain electrode of the seventh transistor and a source electrode of the eighth transistor are coupled to a fifth node; and a drain electrode of the eighth transistor is coupled to the first node.

Optionally, the second processing subcircuit further comprises a sixth transistor and a first capacitor; a gate electrode of the sixth transistor is coupled to a second terminal configured to receive the second reference signal; a source electrode of the sixth transistor is coupled to a third node; a drain electrode of the sixth transistor and a first capacitor electrode of the first capacitor are coupled to the fourth node; and a second capacitor electrode of the first capacitor is coupled to the fifth node.

Optionally, the respective scan unit further comprises a third processing subcircuit; wherein the third processing subcircuit comprises a ninth transistor having a gate electrode coupled to a second node, a source electrode coupled to a sixth terminal configured to receive the fourth clock signal, and a drain electrode coupled to the first node.

In another aspect, the present disclosure provides a display apparatus, comprising a light emitting substrate and the scan circuit described herein or fabricated by a method described herein, the scan circuit configured to provide control signals to the light emitting substrate.

Optionally, the display apparatus comprises a plurality of subpixels; wherein a respective subpixel of the plurality of subpixels comprises a first light emitting element; a first pixel driving circuit configured to control light emission in the first light emitting element; a second light emitting element; and a second pixel driving circuit configured to control light emission in the second light emitting element; wherein the first pixel driving circuit is configured to receive the first control signal output from the first output terminal; and the second pixel driving circuit is configured to receive the second control signal output from the second output terminal.

Optionally, the first light emitting element and the second light emitting element are configured to emit a light of a same color.

Optionally, the display apparatus further comprises a color filter substrate; wherein the color filter substrate comprises a color conversion layer comprising a plurality of color conversion blocks; and a color filter comprising a plurality of color filter blocks.

In another aspect, the present disclosure provides a method of operating a display apparatus comprising a light emitting substrate and a scan circuit configured to provide control signals to the light emitting substrate, comprising providing at least one of a first clock signal, a second clock signal, a third clock signal, a fourth clock signal, a first reference signal, or a second reference signal to a respective scan unit of a plurality of scan units of the scan circuit; outputting an effective voltage of the first clock signal as a first control signal to the light emitting substrate; and outputting an effective voltage of the third clock signal as a second control signal to the light emitting substrate.

Optionally, outputting the first control signal and outputting the second control signal comprise providing the first clock signal to a source electrode of a first switch transistor; providing the third clock signal to a source electrode of a second switch transistor; and coupling gate electrodes of the first switch transistor and the second switch transistor to a first node.

Optionally, the first control signal and the second control signal are out of phase with respect to each other; and the light emitting substrate comprises a plurality of subpixels, a respective subpixel of the plurality of subpixels comprising at least a main light emitting element driven by a main pixel driving circuit and at least an auxiliary light emitting element driven by an auxiliary pixel driving circuit; wherein the method further comprises providing the first control signal to the main pixel driving circuit; providing the second control signal to the auxiliary pixel driving circuit; providing a first data signal to the main pixel driving circuit; and providing a second data signal to the auxiliary pixel driving circuit; wherein the first data signal and the second data signal are provided using a single data line connecting a source integrated circuit and the light emitting substrate.

Optionally, the method further comprises adjusting the third clock signal to have a constant ineffective voltage level; and outputting an ineffective voltage of the third clock signal to the light emitting substrate.

Optionally, the light emitting substrate comprises a plurality of subpixels, a respective subpixel of the plurality of subpixels comprising at least a main light emitting element driven by a main pixel driving circuit and at least an auxiliary light emitting element driven by an auxiliary pixel driving circuit; wherein the method further comprises providing the first control signal to the main pixel driving circuit; and providing the ineffective voltage of the third clock signal to the auxiliary pixel driving circuit.

Optionally, the first control signal and the second control signal are in phase with respect to each other.

Optionally, the method comprises providing control signals to a high-resolution subarea of the light emitting substrate; and providing control signals to a low-resolution subarea of the light emitting substrate; wherein providing control signals to the high-resolution subarea of the light emitting substrate comprises outputting the effective voltage of the first clock signal as the first control signal to a first adjacent row of subpixels in the high-resolution subarea; and outputting the effective voltage of the third clock signal as the second control signal to a second adjacent row of subpixels in the high-resolution subarea; wherein providing control signals to the low-resolution subarea of the light emitting substrate comprises outputting the effective voltage of the first clock signal as the first control signal to a third adjacent row of subpixels in the low-resolution subarea; adjusting the third clock signal to have a constant ineffective voltage level; and outputting an ineffective voltage of the third clock signal to a fourth adjacent row of subpixels in the low-resolution subarea.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Accordingly, the present disclosure provides, inter alia, a scan circuit, a light emitting substrate, a display apparatus, and a method of operating a scan circuit that substantially obviate one or more of the problems due to limitations and disadvantages of the related art. In one aspect, the present disclosure provides a scan circuit. In some embodiments, the scan circuit includes a plurality of scan units in a plurality of stages, respectively. Optionally, a respective scan unit of the plurality of scan units comprises at least one of an input subcircuit, a first processing subcircuit, a second processing subcircuit, or an output subcircuit. Optionally, the respective scan unit is configured to receive at least one of a first clock signal, a second clock signal, a third clock signal, a fourth clock signal, a first reference signal, or a second reference signal. Optionally, the output subcircuit comprises a first output terminal, a second output terminal, a twelfth transistor (e.g., a first switch transistor), and a fourteenth transistor (i.e., a second switch transistor). Optionally, a source electrode of the twelfth transistor is coupled to a third terminal configured to receive the first clock signal. Optionally, a drain electrode of the twelfth transistor is coupled to the first output terminal configured to output a first control signal. Optionally, a source electrode of the fourteenth transistor is coupled to a fourth terminal configured to receive the third clock signal. Optionally, a drain electrode of the fourteenth transistor is coupled to the second output terminal configured to output a second control signal. Optionally, gate electrodes of the twelfth transistor and the fourth transistor are coupled to a first node.

Figure 1:
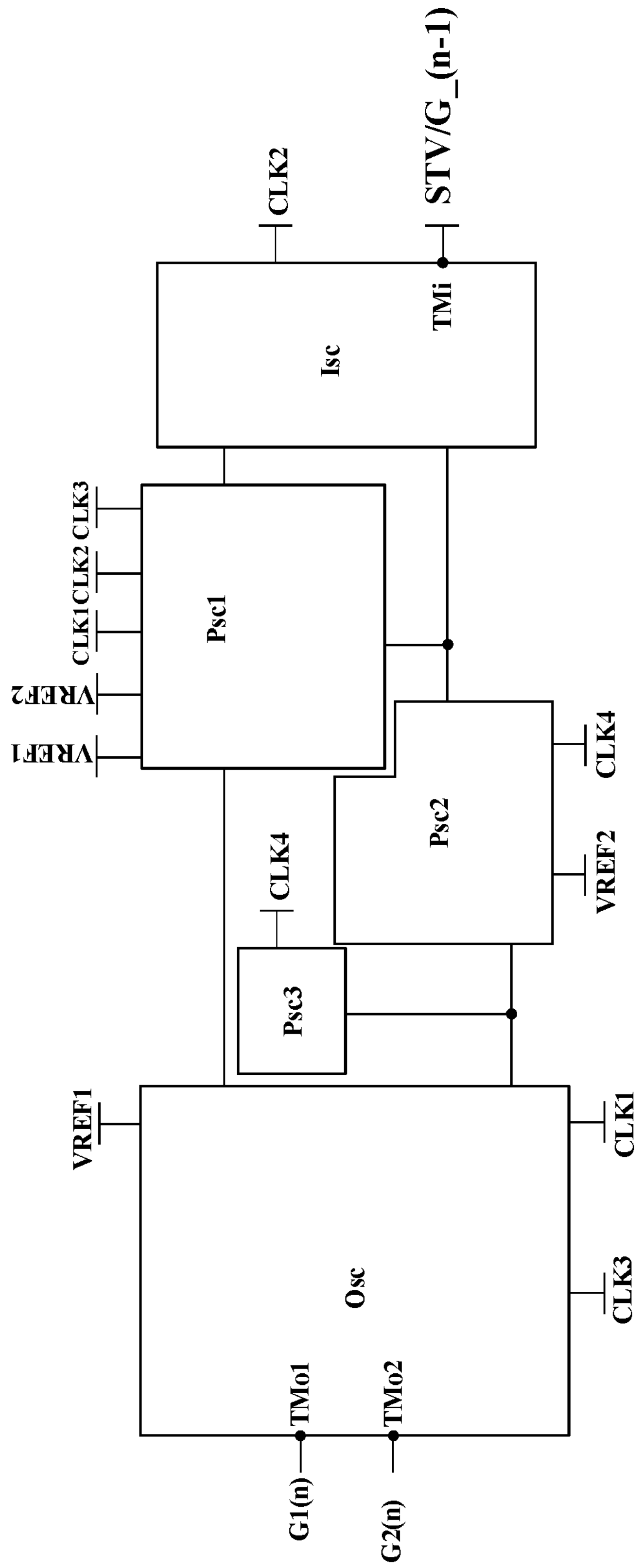
FIG. 1 is a schematic diagram illustrating a respective scan unit in a scan circuit in some embodiments according to the present disclosure.

FIG. 1 is a schematic diagram illustrating a respective scan unit in a scan circuit in some embodiments according to the present disclosure. Referring to FIG. 1, the respective scan unit in some embodiments includes an input subcircuit Isc, a first processing subcircuit Psc1, a second processing subcircuit Psc2, a third processing subcircuit Psc3, and an output subcircuit Osc. The input subcircuit Isc is configured to receive a start signal STV or an output signal G_(n−1) from a previous scan unit of a previous stage. Optionally, the input subcircuit Isc is further configured to receive a second clock signal CLK2. The Input subcircuit is connected to the first processing subcircuit Psc1 and to the second processing subcircuit Psc2.

In some embodiments, the first processing subcircuit Psc1 is configured to receive at least one of a first clock signal CLK1, a second clock signal CLK2, a third clock signal CLK3, a fourth clock signal CLK4, a first reference signal VREF1, or a second reference signal VREF2. Optionally, the first processing subcircuit Psc1 is configured to receive a first clock signal CLK1, a second clock signal CLK2, a third clock signal CLK3, a first reference signal VREF1, and a second reference signal VREF2. Optionally, the first processing subcircuit Psc1 is connected to the input subcircuit Isc, to the second processing subcircuit Psc2, and the output subcircuit Osc. Optionally, the first processing subcircuit Psc1 functions as a first denoising subcircuit.

In some embodiments, the second processing subcircuit Psc2 is configured to receive at least one of a fourth clock signal CLK4 or a second reference signal VREF2. Optionally, the second processing subcircuit Psc2 is configured to receive a fourth clock signal CLK4 and a second reference signal VREF2. Optionally, the second processing subcircuit Psc2 is connected to the input subcircuit Isc, to the first processing subcircuit Psc1, to the third processing subcircuit Psc3, and to the output subcircuit Osc. Optionally, the second processing subcircuit Psc2 functions as a delay writing-in subcircuit.

In some embodiments, the third processing subcircuit Psc3 is configured to receive a fourth clock signal CLK4. Optionally, the third processing subcircuit Psc3 is connected to the second processing subcircuit Psc2 and to the output subcircuit Osc. Optionally, the third processing subcircuit Psc3 functions as a second denoising subcircuit.

In some embodiments, the output subcircuit Osc is configured to output a first control signal G1(*n*) and a second control signal G2(*n*). In one example, the first control signal G1(*n*) and the second control signal G2(*n*) are output time sequentially. In another example, the first control signal G1(*n*) and the second control signal G2(*n*) are output at the same time.

In some embodiments, the output subcircuit Osc is configured to receive at least one of a first clock signal CLK1, a third clock signal CLK3, or a first reference signal VREF1. Optionally, the output subcircuit Osc is connected to the first processing subcircuit Psc1, the second processing subcircuit Psc2, or the third processing subcircuit Psc3.

Figure 2:
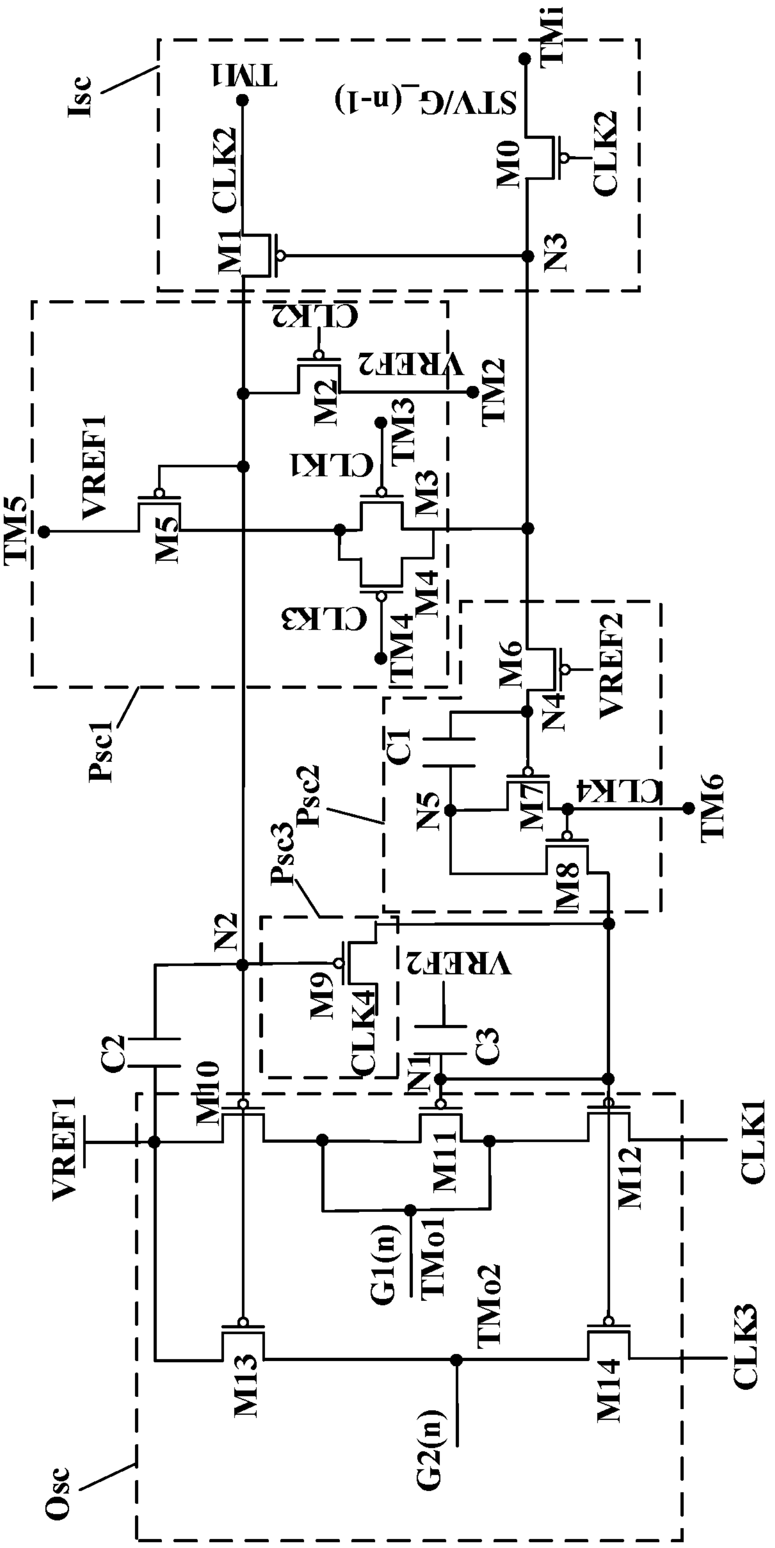
FIG. 2 is a circuit diagram of a respective scan unit in a scan circuit in some embodiments according to the present disclosure.

FIG. 2 is a circuit diagram of a respective scan unit in a scan circuit in some embodiments according to the present disclosure. FIG. 2 illustrates a respective scan unit in which the transistors are p-type transistors. Various implementations of the scan circuit may be practiced. In one example, the transistors of the scan circuit may be p-type transistors, as illustrated in FIG. 2. In another example, the transistors of the scan circuit may be n-type transistors. In another example, the transistors of the scan circuit may include one or more p-type transistors and one or more n-type transistors.

Referring to FIG. 2, the input subcircuit in some embodiments is configured to write the start signal STV or the output signal G_(n−1) from a previous scan unit of a previous stage into a first capacitor C1, write the second clock signal CLK2 into a second capacitor C2 to maintain a low voltage level at a gate electrode of a tenth transistor M10. The second processing subcircuit Psc2 in some embodiments is configured to write the start signal STV or the output signal G_(n−1) from a previous scan unit of a previous stage into a gate electrode of a twelfth transistor M12 (i.e., a first switch transistor) and/or a fourteenth transistor M14 (i.e., a second switch transistor), realizing signal delay. The output subcircuit Osc in some embodiments is configured to output the first control signal G1(*n*) when the twelfth transistor M12 is turned-on, and configured to output the second control signal G2(*n*) when the fourteenth transistor M14 is turned-on. The first processing subcircuit Psc1 in some embodiments is configured to set a voltage level at a fourth node N4 to be a turning-off voltage level (e.g., a high voltage level when the transistors in the respective scan unit are p-type transistors). The third processing subcircuit Psc3 in some embodiments is configured to set a voltage level at a fifth node N5 to be a turning-off voltage level (e.g., a high voltage level when the transistors in the respective scan unit are p-type transistors), when a voltage level at a gate electrode of the tenth transistor M10 is a turning-on voltage level (e.g., a low voltage level when the transistors in the respective scan unit are p-type transistors), thereby setting the voltage levels at gate electrodes of the tenth transistor M10 and the twelfth transistor M12 to be reverse to each other, preventing the output voltage signal to become floating. For example, if the voltage levels at gate electrodes of the tenth transistor M10 and the twelfth transistor M12 are both high voltage levels, then the output voltage signal may be floating and may be prone to noise interference.

In some embodiments, the input subcircuit Isc includes a first transistor M1 and an input transistor M0. The first transistor M1 is coupled between a first terminal TM1 and a second node N2. The input transistor M0 is coupled between an input terminal TMi and a third node N3. The third node N3 is coupled to the first processing subcircuit Psc1 and to the second processing subcircuit Psc2.

A gate electrode of the first transistor M1 is coupled to a drain electrode of the input transistor M0. A source electrode of the first transistor M1 is coupled to the first terminal TM1, and is configured to receive a second clock signal CLK2. A drain electrode of the first transistor M1 is coupled to the second node N2.

A gate electrode of the input transistor M0 is coupled to the first terminal TM1, and is configured to receive the second clock signal CLK2 from the first terminal TM1. A source electrode of the input transistor M0 is coupled to the input terminal TMi, and is configured to receive a start signal STV or an output signal G_(n−1) from a previous scan unit of a previous stage. A drain electrode of the input transistor M0 is coupled to the third node N3. When a second clock signal CLK2 is provided to the first terminal TM1, the input transistor M0 is turned on to electrically couple the input terminal TMi with the third node N3; the first transistor M1 is turned on to electrically couple the first terminal TMI with the second node N2.

In some embodiments, the first processing subcircuit Psc1 includes a second transistor M2, a third transistor M3, a fourth transistor M4, and a fifth transistor M5. The second transistor M2 is coupled between the second node N2 and a second terminal TM2, and is configured to receive a second reference signal VREF2 from the second terminal TM2. The third transistor M3 is coupled between the N3 node and the fifth transistor M5. The fourth transistor M4 is coupled between the N3 node and the fifth transistor M5. The fifth transistor M5 is coupled between a fifth terminal TM5 and the third transistor M3 or the fourth transistor M4, and is configured to receive a first reference signal VREF1 from the fifth terminal TM5.

A gate electrode of the second transistor M2 is coupled to the first terminal TM1, and is configured to receive the second clock signal CLK2 from the first terminal TM1. A source electrode of the second transistor M2 is coupled to the second terminal TM2, and is configured to receive the second reference signal VREF2 from the second terminal TM2. A drain electrode of the second transistor M2 is coupled to the second node N2.

A gate electrode of the third transistor M3 is coupled to a third terminal TM3, and is configured to receive a first clock signal CLK1 from the third terminal TM3. A source electrode of the third transistor M3 is coupled to the drain electrode of the fifth transistor M5. A drain electrode of the third transistor M3 is coupled to the third node N3.

A gate electrode of the fourth transistor M4 is coupled to a fourth terminal TM4, and is configured to receive a third clock signal CLK3 from the fourth terminal TM4. A source electrode of the fourth transistor M4 is coupled to the drain electrode of the fifth transistor M5. A drain electrode of the fourth transistor M4 is coupled to the third node N3.

A gate electrode of the fifth transistor M5 is coupled to the second node N2. A source electrode of the fifth transistor M5 is coupled to a fifth terminal TM5, and is configured to receive the first reference signal VREF1 from the fifth terminal TM5. A drain electrode of the fifth transistor M5 is coupled to source electrodes of the third transistor M3 and the fourth transistor M4.

In some embodiments, the second processing subcircuit Psc2 includes a sixth transistor M6, a seventh transistor M7, an eighth transistor M8, and a first capacitor C1. The sixth transistor M6 is coupled between the third node N3 and a fourth node N4. The seventh transistor M7 is coupled between a sixth terminal TM6 and the fifth node N5, and is configured to receive a fourth clock signal CLK4 from the sixth terminal TM6. The eighth transistor M8 is coupled between a first node N1 and the fifth node N5. The first node N1 is coupled to the third processing subcircuit Psc3 and to the output subcircuit Osc. The first capacitor C1 is coupled between the fourth node N4 and the fifth node N5.

A gate electrode of the sixth transistor M6 is coupled to the second terminal TM2, and is configured to receive a second reference signal VREF2 from the second terminal TM2. A source electrode of the sixth transistor M6 is coupled to the third node N3. A drain electrode of the sixth transistor M6 is coupled to the fourth node N4. When the input transistor M0 is turned on by the second clock signal CLK2, the start signal STV or the output signal G_(n−1) from a previous scan unit of a previous stage passes through the input transistor M0, the third node N3, and the sixth transistor M6, to the fourth node N4.

A gate electrode of the seventh transistor M7 is coupled to the fourth node N4. A source electrode of the seventh transistor M7 is coupled to a sixth terminal TM6, and is configured to receive the fourth clock signal CLK4 from the sixth terminal TM6. A drain electrode of the seventh transistor M7 is coupled to the fifth node N5. When the start signal STV or the output signal G_(n−1) from a previous scan unit of a previous stage is transmitted to the fourth node N4, the seventh transistor M7 is turned on, allowing the fourth clock signal CLK4 to pass to the fifth node N5.

A gate electrode of the eighth transistor M8 is coupled to the sixth terminal TM6, and is configured to receive the fourth clock signal CLK4 from the sixth terminal TM6. A source electrode of the eighth transistor M8 is coupled to the fifth node N5. A drain electrode of the eighth transistor M8 is coupled to the first node N1. When the eighth transistor M8 is turned on by the fourth clock signal CLK4, the first node N1 is electrically connected to the fifth node N5.

A first capacitor electrode of the first capacitor C1 is coupled to the fifth node N5. A second capacitor electrode of the first capacitor C1 is coupled to the fourth node N4.

In some embodiments, the third processing subcircuit Psc3 includes a ninth transistor M9. The ninth transistor M9 is coupled between the sixth terminal TM6 and the first node N1.

A gate electrode of the ninth transistor M9 is coupled to the second node N2. A source electrode of the ninth transistor M9 is coupled to the sixth terminal TM6, and is configured to receive the fourth clock signal CLK4 from the sixth terminal TM6. A drain electrode of the ninth transistor M9 is coupled to the first node N1.

In some embodiments, the output subcircuit Osc includes a tenth transistor M10, an eleventh transistor M11, a twelfth transistor M12, a thirteenth transistor M13, and a fourteenth transistor M14. The tenth transistor M10 is coupled between the fifth terminal TM5 and a first output terminal TMo1, and is configured to receive the first reference signal VREF1 from the fifth terminal TM5. The eleventh transistor M11 is coupled between the tenth transistor M10 and the twelfth transistor M12. The twelfth transistor M12 is coupled between the third terminal TM3 and the first output terminal TMo1, and is configured to receive the first clock signal CLK1 from the third terminal TM3. The thirteenth transistor M13 is coupled between the fifth terminal TM5 and a second output terminal TMo2, and is configured to receive a first reference signal VREF1 from the fifth terminal TM5. The fourteenth transistor M14 is coupled between the fourth terminal TM4 and the second output terminal TMo2, and is configured to receive the third clock signal CLK3 from the fourth terminal TM4.

A gate electrode of the tenth transistor M10 is coupled to the second node N2. A source electrode of the tenth transistor M10 is coupled to the fifth terminal TM5, and is configured to receive the first reference signal VREF1 from the fifth terminal TM5. A drain electrode of the tenth transistor M10 is coupled to the first output terminal TMo1 and a source electrode of the eleventh transistor M11.

A gate electrode of the eleventh transistor M11 is coupled to the first node N1. A source electrode and a drain electrode of the eleventh transistor M11 are coupled to the first output terminal TMo1.

A gate electrode of the twelfth transistor M12 is coupled to the first node N1. A source electrode of the twelfth transistor M12 is coupled to the third terminal TM3, and is configured to receive the first clock signal CLK1 from the third terminal TM3. A drain electrode of the twelfth transistor M12 is coupled to the first output terminal TMo1 and a drain electrode of the eleventh transistor M11.

In some embodiments, the gate electrodes of the eleventh transistor M11 and the twelfth transistor M12 are connected to each other, and the source electrode and drain electrode of the eleventh transistor M11 are connected to each other. In the operation of a respective scan unit, the twelfth transistor M12 is maintained in an off state for an elongated period, resulting in a relatively large gate-source voltage Vgs. By having the eleventh transistor M11 in the respective scan unit, the gate-source voltage Vgs of the twelfth transistor M12 may be reduced, particularly when both the eleventh transistor M11 and the twelfth transistor M12 are turned off.

A gate electrode of the thirteenth transistor M13 is coupled to the second node N2. A source electrode of the thirteenth transistor M13 is coupled to the fifth terminal TM5, and is configured to receive the first reference signal VREF1 from the fifth terminal TM5. A drain electrode of the thirteenth transistor M13 is coupled to the second output terminal TMo2.

A gate electrode of the fourteenth transistor M14 is coupled to the first node N1. A source electrode of the fourteenth transistor M14 is coupled to the fourth terminal TM4, and is configured to receive the third clock signal CLK3 from the fourth terminal TM4. A drain electrode of the fourteenth transistor M14 is coupled to the second output terminal TMo2.

Figure 3:
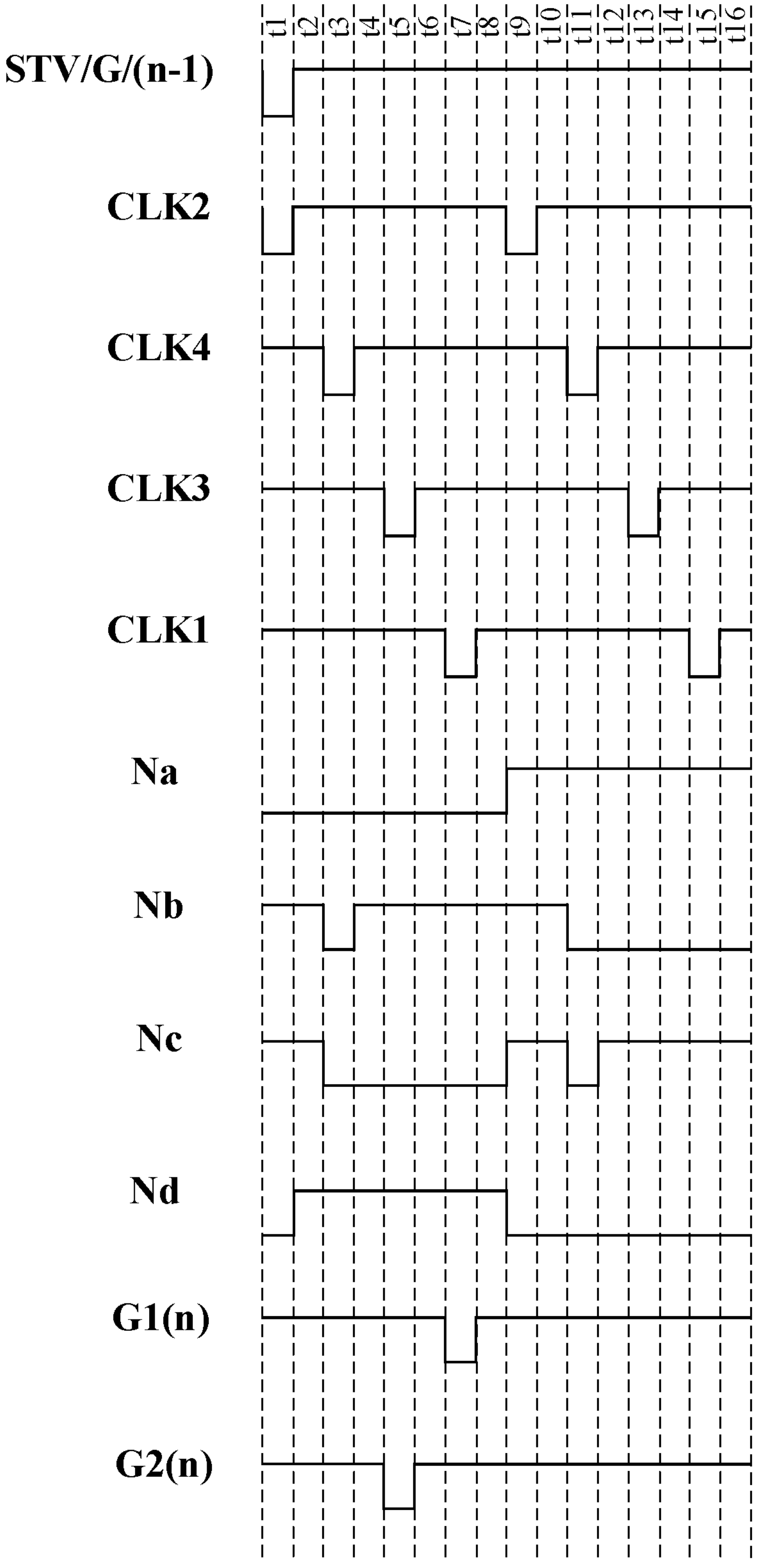
FIG. 3 is a timing diagram of operating a respective scan unit in a scan circuit in some embodiments according to the present disclosure.

FIG. 3 is a timing diagram of operating a respective scan unit in a scan circuit in some embodiments according to the present disclosure. Referring to FIG. 3, the respective scan unit in a frame of image may be operated in at least one phase of sixteen phases t1 to t16. In some embodiments, the operation of the respective scan unit includes phases t1 to t8. Optionally, the operation of the respective scan unit further includes phases t9 to t16.

Referring to FIG. 1, FIG. 2, and FIG. 3, in the first phase t1, an effective voltage of a start signal STV or an output signal G_(n−1) from a previous scan unit of a previous stage is provided to the input terminal TMi; an effective voltage of a second clock signal CLK2 is provided to the first terminal TM1; an ineffective voltage of a fourth clock signal CLK4 is provided to the sixth terminal TM6; an ineffective voltage of a third clock signal CLK3 is provided to the fourth terminal TM4; and an ineffective voltage of a first clock signal CLK1 is provided to the third terminal TM3. As used herein, an effective voltage refers to a low voltage in the context of p-type transistors and to a high voltage in the context of n-type transistors; and an ineffective voltage refers to a high voltage in the context of p-type transistors and to a low voltage in the context of n-type transistors.

In the first phase t1, the input transistor M0 is turned on by the effective voltage of the second clock signal CLK2, the sixth transistor M6 is turned on by the second reference signal VREF2. When the input transistor M0 and the sixth transistor M6 are turned on, the fourth node N4 is charged to an effective voltage level (e.g., a low voltage level in the context of p-type transistors) by the effective voltage of the start signal STV or the output signal G_(n−1) from a previous scan unit of a previous stage. The first transistor M1 is turned on by the effective voltage charged at the fourth node N4, allowing the effective voltage of the second clock signal CLK2 to charge the second node N2. The fifth node N5 and the first node N1 remain at ineffective voltage levels (e.g., high voltage levels in the context of p-type transistors).

The tenth transistor M10 and the thirteenth transistor M13 are turned on by the effective voltage charged at the second node N2, allowing the first reference signal VREF1 to be transmitted to the first output terminal TMo1 and the second output terminal TMo2. The first reference signal VREF1 are ineffective voltage signals (e.g., high voltage signals in the context of p-type transistors). Accordingly, the first output signal G1(*n*) and the second output signal G2(*n*) are ineffective control signals.

In the second phase t2, an ineffective voltage of a start signal STV or an output signal G_(n−1) from a previous scan unit of a previous stage is provided to the input terminal; an ineffective voltage of a second clock signal CLK2 is provided to the first terminal TM1; an ineffective voltage of a fourth clock signal CLK4 is provided to the sixth terminal TM6; an ineffective voltage of a third clock signal CLK3 is provided to the fourth terminal TM4; and an ineffective voltage of a first clock signal CLK1 is provided to the third terminal TM3. The voltage level at the first terminal TM1 switches from an effective voltage level to an ineffective voltage level.

In the second phase t2, the voltage level at the fourth node N4 remains at the effective voltage level (e.g., a low voltage level in the context of p-type transistors), the first transistor M1 remains turned on, allowing the ineffective voltage of the second clock signal CLK2 to pass through the first transistor M1 to charge the second node N2. The voltage level at the second node N2 switches from the effective voltage level to an ineffective voltage level (e.g., a high voltage level in the context of p-type transistors).

In the second phase t2, the tenth transistor M10 and the thirteenth transistor M13 are turned off by the ineffective voltage at the second node N2. The eleventh transistor M11, the twelfth transistor M12, and the fourteenth transistor M14 are turned off by the ineffective voltage at the first node N1. Accordingly, the first output signal G1(*n*) and the second output signal G2(*n*) remain ineffective control signals.

In the third phase t3, an ineffective voltage of a start signal STV or an output signal G_(n−1) from a previous scan unit of a previous stage is provided to the input terminal; an ineffective voltage of a second clock signal CLK2 is provided to the first terminal TM1; an effective voltage of a fourth clock signal CLK4 is provided to the sixth terminal TM6; an ineffective voltage of a third clock signal CLK3 is provided to the fourth terminal TM4; and an ineffective voltage of a first clock signal CLK1 is provided to the third terminal TM3. The voltage level at the sixth terminal TM6 switches from an ineffective voltage level to an effective voltage level.

In the third phase t3, the voltage level at the fourth node N4 remains at the effective voltage level, and the voltage level at the second node N2 remains at the ineffective voltage level. An effective voltage of the fourth clock signal CLK4 turns on the eighth transistor M8. The effective voltage at the fourth node N4 turns on the seventh transistor M7. The effective voltage of the fourth clock signal CLK4 passes through the seventh transistor M7 to the fifth node N5, and passes through the eighth transistor M8 to the first node N1. Accordingly, the voltage levels at the fifth node N5 and the first node N1 switch from ineffective voltage levels to effective voltage levels.

In the third phase t3, the twelfth transistor M12 is turned on by the effective voltage at the first node N1, allowing the ineffective voltage of the first clock signal CLK1 to pass through the twelfth transistor M12 to the first output terminal TMo1. The fourteenth transistor M14 is turned on by the effective voltage at the first node N1, allowing the ineffective voltage of the third clock signal CLK3 to pass through the fourteenth transistor M14 to the second output terminal TMo2. Accordingly, the first output signal G1(*n*) and the second output signal G2(*n*) remain ineffective control signals.

In the fourth phase t4, an ineffective voltage of a start signal STV or an output signal G_(n−1) from a previous scan unit of a previous stage is provided to the input terminal; an ineffective voltage of a second clock signal CLK2 is provided to the first terminal TM1; an ineffective voltage of a fourth clock signal CLK4 is provided to the sixth terminal TM6; an ineffective voltage of a third clock signal CLK3 is provided to the fourth terminal TM4; and an ineffective voltage of a first clock signal CLK1 is provided to the third terminal TM3. The voltage level at the sixth terminal TM6 switches from an effective voltage level to an ineffective voltage level.

In the fourth phase t4, the voltage level at the fourth node N4 remains at the effective voltage level (e.g., a low voltage level in the context of p-type transistors), the first transistor M1 remains turned on, allowing the ineffective voltage of the second clock signal CLK2 to pass through the first transistor M1 to charge the second node N2. The voltage level at the second node N2 remains at the ineffective voltage level (e.g., a high voltage level in the context of p-type transistors). The voltage level at the first node N1 remains at the effective voltage level. The effective voltage at the fourth node N4 turns on the seventh transistor M7, allowing the ineffective voltage of the fourth clock signal CLK4 to charge the fifth node N5. The voltage level at the fifth node N5 switches from the effective voltage level to an ineffective voltage level.

In the fourth phase t4, the twelfth transistor M12 remains turned on by the effective voltage at the first node N1, allowing the ineffective voltage of the first clock signal CLK1 to pass through the twelfth transistor M12 to the first output terminal TMo1. The fourteenth transistor M14 remains turned on by the effective voltage at the first node N1, allowing the ineffective voltage of the third clock signal CLK3 to pass through the fourteenth transistor M14 to the second output terminal TMo2. Accordingly, the first output signal G1(*n*) and the second output signal G2(*n*) remain ineffective control signals.

In the fifth phase t5, an ineffective voltage of a start signal STV or an output signal G_(n−1) from a previous scan unit of a previous stage is provided to the input terminal; an ineffective voltage of a second clock signal CLK2 is provided to the first terminal TM1; an ineffective voltage of a fourth clock signal CLK4 is provided to the sixth terminal TM6; an effective voltage of a third clock signal CLK3 is provided to the fourth terminal TM4; and an ineffective voltage of a first clock signal CLK1 is provided to the third terminal TM3. The voltage level at the fourth terminal TM4 switches from an ineffective voltage level to an effective voltage level.

In the fifth phase t5, the voltage level at the fourth node N4 remains at the effective voltage level (e.g., a low voltage level in the context of p-type transistors), the first transistor M1 remains turned on, allowing the ineffective voltage of the second clock signal CLK2 to pass through the first transistor M1 to charge the second node N2. The voltage level at the second node N2 remains at the ineffective voltage level (e.g., a high voltage level in the context of p-type transistors). The voltage level at the first node N1 remains at the effective voltage level. The effective voltage at the fourth node N4 turns on the seventh transistor M7, allowing the ineffective voltage of the fourth clock signal CLK4 to charge the fifth node N5. The voltage level at the fifth node N5 remains at the ineffective voltage level.

In the fifth phase t5, the twelfth transistor M12 remains turned on by the effective voltage at the first node N1, allowing the ineffective voltage of the first clock signal CLK1 to pass through the twelfth transistor M12 to the first output terminal TMo1. The fourteenth transistor M14 remains turned on by the effective voltage at the first node N1, allowing the effective voltage of the third clock signal CLK3 to pass through the fourteenth transistor M14 to the second output terminal TMo2. Accordingly, the first output signal G1(*n*) remains an ineffective control signal. The second output signal G2(*n*) is output as an effective control signal.

In the sixth phase t6, an ineffective voltage of a start signal STV or an output signal G_(n−1) from a previous scan unit of a previous stage is provided to the input terminal; an ineffective voltage of a second clock signal CLK2 is provided to the first terminal TM1; an ineffective voltage of a fourth clock signal CLK4 is provided to the sixth terminal TM6; an ineffective voltage of a third clock signal CLK3 is provided to the fourth terminal TM4; and an ineffective voltage of a first clock signal CLK1 is provided to the third terminal TM3. The voltage level at the fourth terminal TM4 switches from an effective voltage level to an ineffective voltage level.

In the sixth phase t6, the voltage level at the fourth node N4 remains at the effective voltage level (e.g., a low voltage level in the context of p-type transistors), the first transistor M1 remains turned on, allowing the ineffective voltage of the second clock signal CLK2 to pass through the first transistor M1 to charge the second node N2. The voltage level at the second node N2 remains at the ineffective voltage level (e.g., a high voltage level in the context of p-type transistors). The voltage level at the first node N1 remains at the effective voltage level. The effective voltage at the fourth node N4 turns on the seventh transistor M7, allowing the ineffective voltage of the fourth clock signal CLK4 to charge the fifth node N5. The voltage level at the fifth node N5 remains at the ineffective voltage level.

In the sixth phase t6, the twelfth transistor M12 remains turned on by the effective voltage at the first node N1, allowing the ineffective voltage of the first clock signal CLK1 to pass through the twelfth transistor M12 to the first output terminal TMo1. The fourteenth transistor M14 remains turned on by the effective voltage at the first node N1, allowing the ineffective voltage of the third clock signal CLK3 to pass through the fourteenth transistor M14 to the second output terminal TMo2. Accordingly, the first output signal G1(*n*) remains an ineffective control signal. The second output signal G2(*n*) is output also as an ineffective control signal.

In the seventh phase t7, an ineffective voltage of a start signal STV or an output signal G_(n−1) from a previous scan unit of a previous stage is provided to the input terminal; an ineffective voltage of a second clock signal CLK2 is provided to the first terminal TM1; an ineffective voltage of a fourth clock signal CLK4 is provided to the sixth terminal TM6; an ineffective voltage of a third clock signal CLK3 is provided to the fourth terminal TM4; and an effective voltage of a first clock signal CLK1 is provided to the third terminal TM3. The voltage level at the third terminal TM3 switches from an ineffective voltage level to an effective voltage level.

In the seventh phase t7, the voltage level at the fourth node N4 remains at the effective voltage level (e.g., a low voltage level in the context of p-type transistors), the first transistor M1 remains turned on, allowing the ineffective voltage of the second clock signal CLK2 to pass through the first transistor M1 to charge the second node N2. The voltage level at the second node N2 remains at the ineffective voltage level (e.g., a high voltage level in the context of p-type transistors). The voltage level at the first node N1 remains at the effective voltage level. The effective voltage at the fourth node N4 turns on the seventh transistor M7, allowing the ineffective voltage of the fourth clock signal CLK4 to charge the fifth node N5. The voltage level at the fifth node N5 remains at the ineffective voltage level.

In the seventh phase t7, the twelfth transistor M12 remains turned on by the effective voltage at the first node N1, allowing the effective voltage of the first clock signal CLK1 to pass through the twelfth transistor M12 to the first output terminal TMo1. The fourteenth transistor M14 remains turned on by the effective voltage at the first node N1, allowing the ineffective voltage of the third clock signal CLK3 to pass through the fourteenth transistor M14 to the second output terminal TMo2. Accordingly, the second output signal G2(*n*) remains an ineffective control signal. The first output signal G1(*n*) is output as an effective control signal.

In the eighth phase t8, an ineffective voltage of a start signal STV or an output signal G_(n−1) from a previous scan unit of a previous stage is provided to the input terminal; an ineffective voltage of a second clock signal CLK2 is provided to the first terminal TM1; an ineffective voltage of a fourth clock signal CLK4 is provided to the sixth terminal TM6; an ineffective voltage of a third clock signal CLK3 is provided to the fourth terminal TM4; and an ineffective voltage of a first clock signal CLK1 is provided to the third terminal TM3. The voltage level at the third terminal TM3 switches from an effective voltage level to an ineffective voltage level.

In the eighth phase t8, the voltage level at the fourth node N4 remains at the effective voltage level (e.g., a low voltage level in the context of p-type transistors), the first transistor M1 remains turned on, allowing the ineffective voltage of the second clock signal CLK2 to pass through the first transistor M1 to charge the second node N2. The voltage level at the second node N2 remains at the ineffective voltage level (e.g., a high voltage level in the context of p-type transistors). The voltage level at the first node N1 remains at the effective voltage level. The effective voltage at the fourth node N4 turns on the seventh transistor M7, allowing the ineffective voltage of the fourth clock signal CLK4 to charge the fifth node N5. The voltage level at the fifth node N5 remains at the ineffective voltage level.

In the eighth phase t8, the twelfth transistor M12 remains turned on by the effective voltage at the first node N1, allowing the ineffective voltage of the first clock signal CLK1 to pass through the twelfth transistor M12 to the first output terminal TMo1. The fourteenth transistor M14 remains turned on by the effective voltage at the first node N1, allowing the ineffective voltage of the third clock signal CLK3 to pass through the fourteenth transistor M14 to the second output terminal TMo2. Accordingly, the second output signal G2(*n*) remains an ineffective control signal. The first output signal G1(*n*) is output also as an ineffective control signal.

In the ninth phase t9, an ineffective voltage of a start signal STV or an output signal G_(n−1) from a previous scan unit of a previous stage is provided to the input terminal TMi; an effective voltage of a second clock signal CLK2 is provided to the first terminal TM1; an ineffective voltage of a fourth clock signal CLK4 is provided to the sixth terminal TM6; an ineffective voltage of a third clock signal CLK3 is provided to the fourth terminal TM4; and an ineffective voltage of a first clock signal CLK1 is provided to the third terminal TM3.

In the ninth phase t9, the input transistor M0 is turned on by the effective voltage of the second clock signal CLK2, the sixth transistor M6 is turned on by the second reference signal VREF2. When the input transistor M0 and the sixth transistor M6 are turned on, the fourth node N4 is charged to an ineffective voltage level (e.g., a high voltage level in the context of p-type transistors) by the ineffective voltage of the start signal STV or the output signal G_(n−1) from a previous scan unit of a previous stage. The first transistor M1 is turned off by the ineffective voltage charged at the fourth node N4. The second transistor M2 is turned on by the effective voltage of the second clock signal CLK2, allowing the second reference signal VREF2 (e.g., an effective voltage) to pass through the second transistor M2. The second node N2 is charged to an effective voltage level (e.g., a low voltage level in the context of p-type transistors). The ninth transistor M9 is turned on by the effective voltage at the second node N2, allowing the ineffective voltage of the fourth clock signal CLK4 to pass through the ninth transistor M9 to the first node N1. The first node N1 switches from an effective voltage level to an ineffective voltage level (e.g., high voltage levels in the context of p-type transistors). The fifth node N5 remains at an ineffective voltage level as the seventh transistor M7 is turned off by the ineffective voltage at the fourth node N4 and the eighth transistor M8 is turned off by the ineffective voltage of the fourth clock signal CLK4.

The tenth transistor M10 and the thirteenth transistor M13 are turned on by the effective voltage charged at the second node N2, allowing the first reference signal VREF1 to be transmitted to the first output terminal TMo1 and the second output terminal TMo2. The first reference signal VREF1 are ineffective voltage signals (e.g., high voltage signals in the context of p-type transistors). Accordingly, the first output signal G1(*n*) and the second output signal G2(*n*) are ineffective control signals.

In the tenth phase t10, an ineffective voltage of a start signal STV or an output signal G_(n−1) from a previous scan unit of a previous stage is provided to the input terminal; an ineffective voltage of a second clock signal CLK2 is provided to the first input terminal TM1; an ineffective voltage of a fourth clock signal CLK4 is provided to the sixth input terminal TM6; an ineffective voltage of a third clock signal CLK3 is provided to the fourth input terminal TM4; and an ineffective voltage of a first clock signal CLK1 is provided to the third input terminal TM3. The voltage level at the first input terminal TM1 switches from an effective voltage level to an ineffective voltage level.

In the tenth phase t10, the voltage level at the fourth node N4 remains at the ineffective voltage level (e.g., a high voltage level in the context of p-type transistors), the first transistor M1 remains turned off. The voltage level at the second node N2 remains at the effective voltage level. The voltage level at the first node N1 remains at the ineffective voltage level. The voltage level at the fifth node N5 remains at the ineffective voltage level.

In the tenth phase t10, the eleventh transistor M11, the twelfth transistor M12, and the fourteenth transistor M14 are turned off by the ineffective voltage at the first node N1. The tenth transistor M10 and the thirteenth transistor M13 are turned on by the effective voltage at the second node N2, allowing the first reference signal VREF1 to pass through the tenth transistor M10 and the thirteenth transistor M13 to the first output terminal TMo1 and the second output terminal TMo2. The voltage level of the first reference signal VREF1 is an ineffective voltage level (e.g., a high voltage level in the context of p-type transistors). Accordingly, the first output signal G1(*n*) and the second output signal G2(*n*) remain ineffective control signals.

In the eleventh phase t11, an ineffective voltage of a start signal STV or an output signal G_(n−1) from a previous scan unit of a previous stage is provided to the input terminal; an ineffective voltage of a second clock signal CLK2 is provided to the first input terminal TM1; an effective voltage of a fourth clock signal CLK4 is provided to the sixth input terminal TM6; an ineffective voltage of a third clock signal CLK3 is provided to the fourth input terminal TM4; and an ineffective voltage of a first clock signal CLK1 is provided to the third input terminal TM3.

The voltage level at the sixth input terminal TM6 switches from an ineffective voltage level to an effective voltage level.

In the eleventh phase t11, the voltage level at the fourth node N4 remains at the ineffective voltage level, and the voltage level at the second node N2 remains at the effective voltage level. The effective voltage at the second node N2 turns on the ninth transistor M9. The effective voltage of the fourth clock signal CLK4 passes through the ninth transistor M9 to the first node N1. The effective voltage of the fourth clock signal CLK4 turns on the eighth transistor M8. The effective voltage at the first node N1 passes through the eighth transistor M8 to the fifth node N5. Accordingly, the voltage levels at the fifth node N5 and the first node N1 switch from ineffective voltage levels to effective voltage levels.

In the eleventh phase t11, the twelfth transistor M12 is turned on by the effective voltage at the first node N1, allowing the ineffective voltage of the first clock signal CLK1 to pass through the twelfth transistor M12 to the first output terminal TMo1. The fourteenth transistor M14 is turned on by the effective voltage at the first node N1, allowing the ineffective voltage of the third clock signal CLK3 to pass through the fourteenth transistor M14 to the second output terminal TMo2. The tenth transistor M10 is turned on by the effective voltage at the second node N2, allowing the ineffective voltage of the first reference signal VREF1 to pass through the tenth transistor M10 to the first output terminal TMo1. The thirteenth transistor M13 is turned on by the effective voltage at the second node N2, allowing the ineffective voltage of the first reference signal VREF1 to pass through the thirteenth transistor M13 to the second output terminal TMo2. Accordingly, the first output signal G1(*n*) and the second output signal G2(*n*) remain ineffective control signals.

In the twelfth phase t12, an ineffective voltage of a start signal STV or an output signal G_(n−1) from a previous scan unit of a previous stage is provided to the input terminal; an ineffective voltage of a second clock signal CLK2 is provided to the first input terminal TM1; an ineffective voltage of a fourth clock signal CLK4 is provided to the sixth input terminal TM6; an ineffective voltage of a third clock signal CLK3 is provided to the fourth input terminal TM4; and an ineffective voltage of a first clock signal CLK1 is provided to the third input terminal TM3. The voltage level at the sixth input terminal TM6 switches from an effective voltage level to an ineffective voltage level.

In the twelfth phase t12, the voltage level at the fourth node N4 remains at the ineffective voltage level (e.g., a high voltage level in the context of p-type transistors), the first transistor M1 remains turned off. The voltage level at the second node N2 remains at the effective voltage level (e.g., a low voltage level in the context of p-type transistors). The voltage level at the fifth node N5 remains at the effective voltage level. The effective voltage at the second node N2 turns on the ninth transistor M9, allowing the ineffective voltage of the fourth clock signal CLK4 to charge the first node N1. The voltage level at the first node N1 switches from the effective voltage level to an ineffective voltage level.

In the twelfth phase t12, the tenth transistor M10 is turned on by the effective voltage at the second node N2, allowing the ineffective voltage of the first reference signal VREF1 to pass through the tenth transistor M10 to the first output terminal TMo1. The thirteenth transistor M13 is turned on by the effective voltage at the second node N2, allowing the ineffective voltage of the first reference signal VREF1 to pass through the thirteenth transistor M13 to the second output terminal TMo2. Accordingly, the first output signal G1(*n*) remains an ineffective control signal. The second output signal G2(*n*) remains an ineffective control signal.

In the thirteenth phase t13, an ineffective voltage of a start signal STV or an output signal G_(n−1) from a previous scan unit of a previous stage is provided to the input terminal; an ineffective voltage of a second clock signal CLK2 is provided to the first input terminal TM1; an ineffective voltage of a fourth clock signal CLK4 is provided to the sixth input terminal TM6; an effective voltage of a third clock signal CLK3 is provided to the fourth input terminal TM4; and an ineffective voltage of a first clock signal CLK1 is provided to the third input terminal TM3. The voltage level at the fourth input terminal TM4 switches from an ineffective voltage level to an effective voltage level.

In the thirteenth phase t13, the voltage level at the fourth node N4 remains at the ineffective voltage level (e.g., a high voltage level in the context of p-type transistors), the first transistor M1 remains turned off. The voltage level at the second node N2 remains at the effective voltage level (e.g., a low voltage level in the context of p-type transistors). The voltage level at the first node N1 remains at the ineffective voltage level. The voltage level at the fifth node N5 remains at the effective voltage level.

In the thirteenth phase t13, the tenth transistor M10 is turned on by the effective voltage at the second node N2, allowing the ineffective voltage of the first reference signal VREF1 to pass through the tenth transistor M10 to the first output terminal TMo1. The thirteenth transistor M13 is turned on by the effective voltage at the second node N2, allowing the ineffective voltage of the first reference signal VREF1 to pass through the thirteenth transistor M13 to the second output terminal TMo2. Accordingly, the first output signal G1(*n*) remains an ineffective control signal. The second output signal G2(*n*) remains an ineffective control signal.

In the fourteenth phase t14, an ineffective voltage of a start signal STV or an output signal G_(n−1) from a previous scan unit of a previous stage is provided to the input terminal; an ineffective voltage of a second clock signal CLK2 is provided to the first input terminal TM1; an ineffective voltage of a fourth clock signal CLK4 is provided to the sixth input terminal TM6; an ineffective voltage of a third clock signal CLK3 is provided to the fourth input terminal TM4; and an ineffective voltage of a first clock signal CLK1 is provided to the third input terminal TM3. The voltage level at the fourth input terminal TM4 switches from an effective voltage level to an ineffective voltage level.

In the fourteenth phase t14, the voltage level at the fourth node N4 remains at the ineffective voltage level (e.g., a high voltage level in the context of p-type transistors), the first transistor M1 remains turned off. The voltage level at the second node N2 remains at the effective voltage level (e.g., a low voltage level in the context of p-type transistors). The voltage level at the first node N1 remains at the ineffective voltage level. The voltage level at the fifth node N5 remains at the effective voltage level.

In the fourteenth phase t14, the tenth transistor M10 is turned on by the effective voltage at the second node N2, allowing the ineffective voltage of the first reference signal VREF1 to pass through the tenth transistor M10 to the first output terminal TMo1. The thirteenth transistor M13 is turned on by the effective voltage at the second node N2, allowing the ineffective voltage of the first reference signal VREF1 to pass through the thirteenth transistor M13 to the second output terminal TMo2. Accordingly, the first output signal G1(*n*) remains an ineffective control signal. The second output signal G2(*n*) remains an ineffective control signal.

In the fifteenth phase t15, an ineffective voltage of a start signal STV or an output signal G_(n−1) from a previous scan unit of a previous stage is provided to the input terminal; an ineffective voltage of a second clock signal CLK2 is provided to the first input terminal TM1; an ineffective voltage of a fourth clock signal CLK4 is provided to the sixth input terminal TM6; an ineffective voltage of a third clock signal CLK3 is provided to the fourth input terminal TM4; and an effective voltage of a first clock signal CLK1 is provided to the third input terminal TM3. The voltage level at the third input terminal TM3 switches from an ineffective voltage level to an effective voltage level.

In the fifteenth phase t15, the voltage level at the fourth node N4 remains at the ineffective voltage level (e.g., a high voltage level in the context of p-type transistors), the first transistor M1 remains turned off. The voltage level at the second node N2 remains at the effective voltage level (e.g., a low voltage level in the context of p-type transistors). The voltage level at the first node N1 remains at the ineffective voltage level. The voltage level at the fifth node N5 remains at the effective voltage level.

In the fifteenth phase t15, the tenth transistor M10 is turned on by the effective voltage at the second node N2, allowing the ineffective voltage of the first reference signal VREF1 to pass through the tenth transistor M10 to the first output terminal TMo1. The thirteenth transistor M13 is turned on by the effective voltage at the second node N2, allowing the ineffective voltage of the first reference signal VREF1 to pass through the thirteenth transistor M13 to the second output terminal TMo2. Accordingly, the first output signal G1(*n*) remains an ineffective control signal. The second output signal G2(*n*) remains an ineffective control signal.

In the sixteenth phase t16, an ineffective voltage of a start signal STV or an output signal G_(n−1) from a previous scan unit of a previous stage is provided to the input terminal; an ineffective voltage of a second clock signal CLK2 is provided to the first input terminal TM1; an ineffective voltage of a fourth clock signal CLK4 is provided to the sixth input terminal TM6; an ineffective voltage of a third clock signal CLK3 is provided to the fourth input terminal TM4; and an ineffective voltage of a first clock signal CLK1 is provided to the third input terminal TM3. The voltage level at the third input terminal TM3 switches from an effective voltage level to an ineffective voltage level.

In the sixteenth phase t16, the voltage level at the fourth node N4 remains at the ineffective voltage level (e.g., a high voltage level in the context of p-type transistors), the first transistor M1 remains turned off. The voltage level at the second node N2 remains at the effective voltage level (e.g., a low voltage level in the context of p-type transistors). The voltage level at the first node N1 remains at the ineffective voltage level. The voltage level at the fifth node N5 remains at the effective voltage level.

In the sixteenth phase t16, the tenth transistor M10 is turned on by the effective voltage at the second node N2, allowing the ineffective voltage of the first reference signal VREF1 to pass through the tenth transistor M10 to the first output terminal TMo1. The thirteenth transistor M13 is turned on by the effective voltage at the second node N2, allowing the ineffective voltage of the first reference signal VREF1 to pass through the thirteenth transistor M13 to the second output terminal TMo2. Accordingly, the first output signal G1(*n*) remains an ineffective control signal. The second output signal G2(*n*) remains an ineffective control signal.

Figure 4:
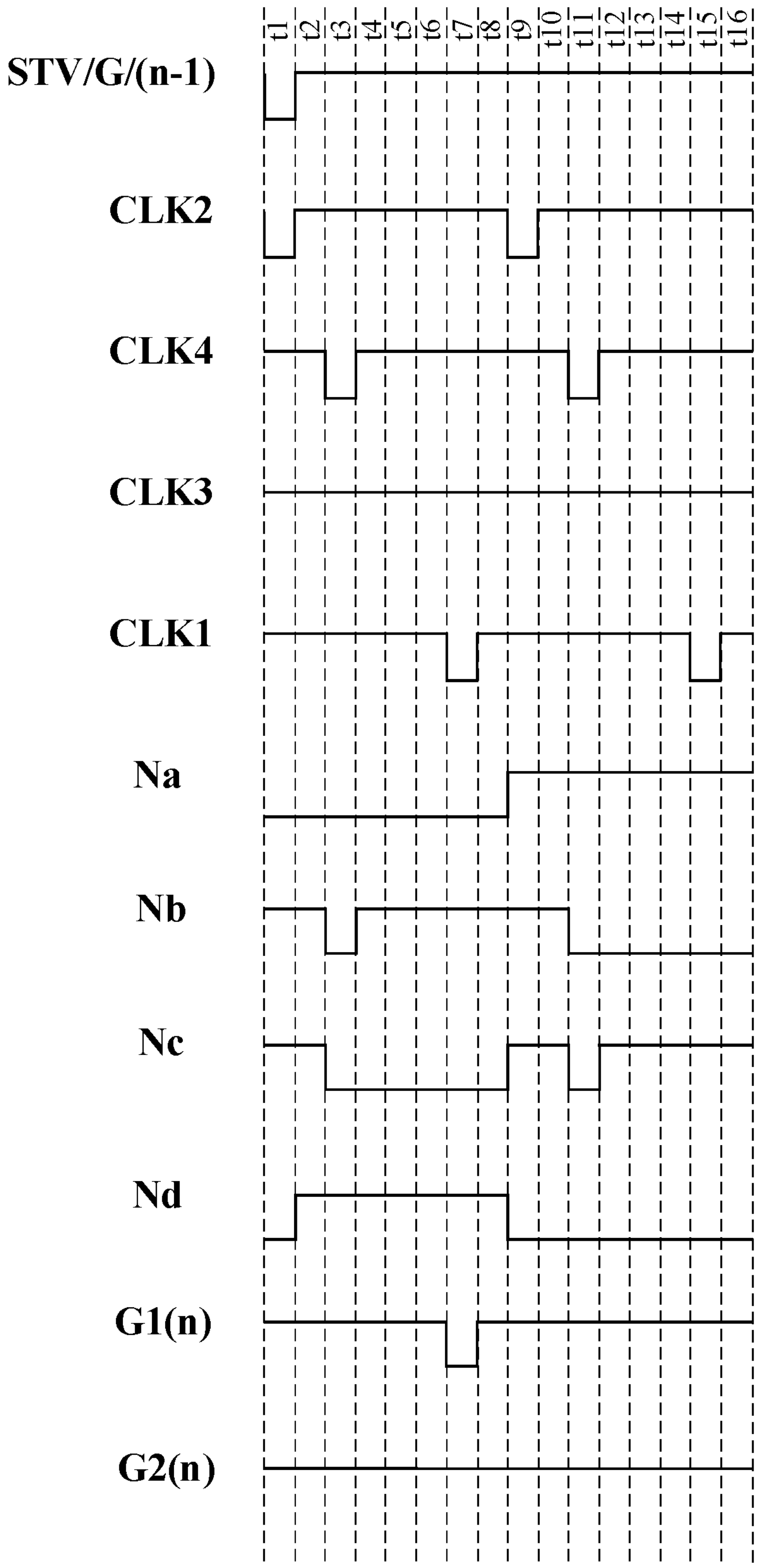
FIG. 4 is a timing diagram of operating a respective scan unit in a scan circuit in some embodiments according to the present disclosure.

FIG. 4 is a timing diagram of operating a respective scan unit in a scan circuit in some embodiments according to the present disclosure. The operation of the respective scan unit depicted in FIG. 4 is otherwise the same as the operation of the respective scan unit depicted in FIG. 3, except that the third clock signal CLK3 is maintained as an ineffective voltage throughout t1 to t16, and the second control signal G2(*n*) output from the second output terminal TMo2 is an ineffective voltage throughout t1 to t16.

Figure 5:
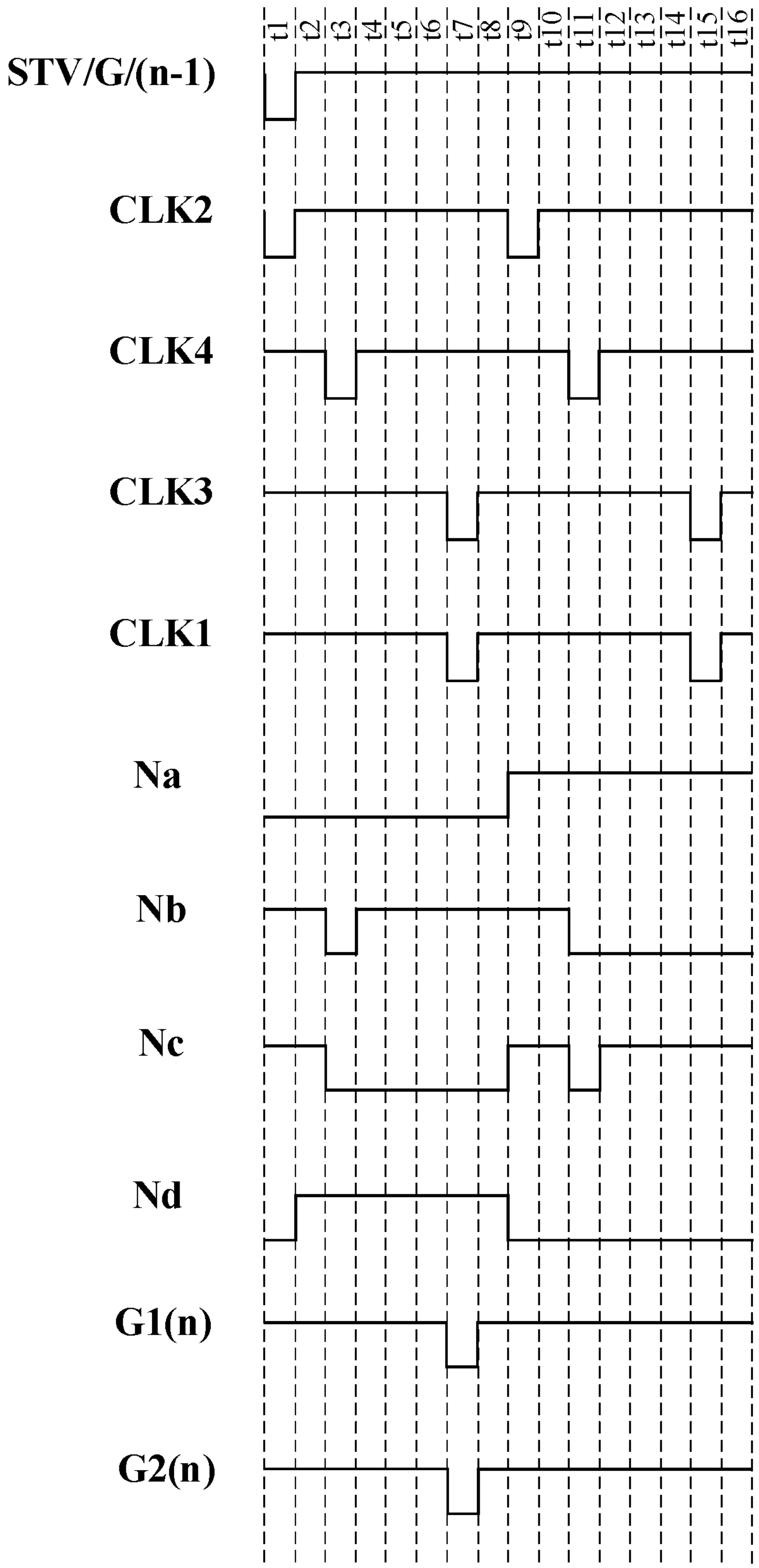
FIG. 5 is a timing diagram of operating a respective scan unit in a scan circuit in some embodiments according to the present disclosure.

FIG. 5 is a timing diagram of operating a respective scan unit in a scan circuit in some embodiments according to the present disclosure. The operation of the respective scan unit depicted in FIG. 5 is otherwise the same as the operation of the respective scan unit depicted in FIG. 3, except that the third clock signal CLK3 and the first clock signal CLK1 are in phase. The first control signal G1(*n*) output from the first output terminal TMo1 and the second control signal G2(*n*) output from the second output terminal TMo2 are also in phase.

Figure 6:
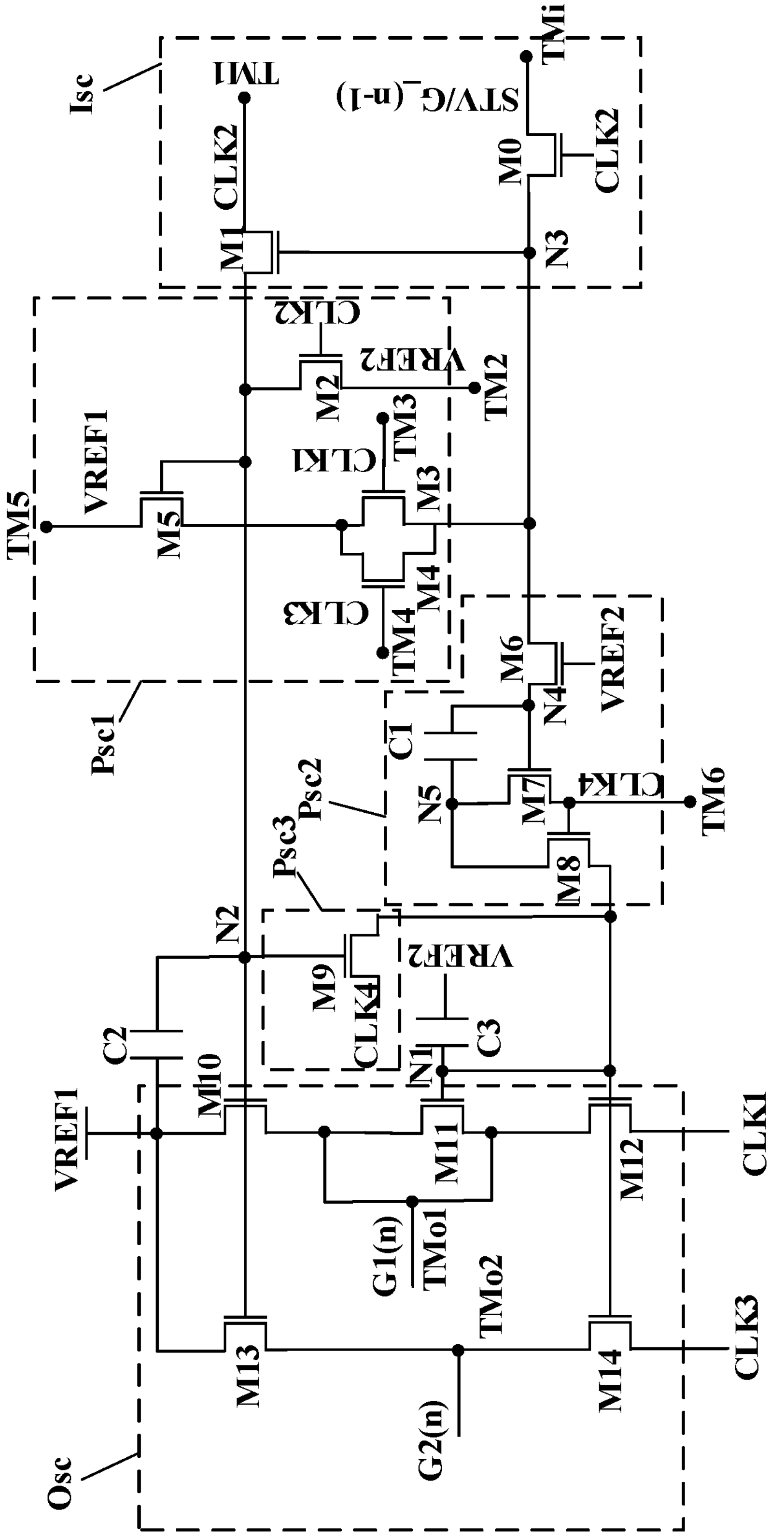
FIG. 6 is a circuit diagram of a respective scan unit in a scan circuit in some embodiments according to the present disclosure.

FIG. 6 is a circuit diagram of a respective scan unit in a scan circuit in some embodiments according to the present disclosure. The respective scan unit depicted in FIG. 6 is otherwise the same as the respective scan unit depicted in FIG. 2 except that the transistors in the respective scan unit depicted in FIG. 6 are all n-type transistors, whereas the transistors in the respective scan unit depicted in FIG. 2 are all p-type transistors. The operation of the respective scan unit depicted in FIG. 6 is otherwise the same as the operation of the respective scan unit depicted in FIG. 2 except that the effective voltages for operating the respective scan unit depicted in FIG. 6 are high voltages, whereas the effective voltages for operating the respective scan unit depicted in FIG. 2 are low voltages.

Figure 7:
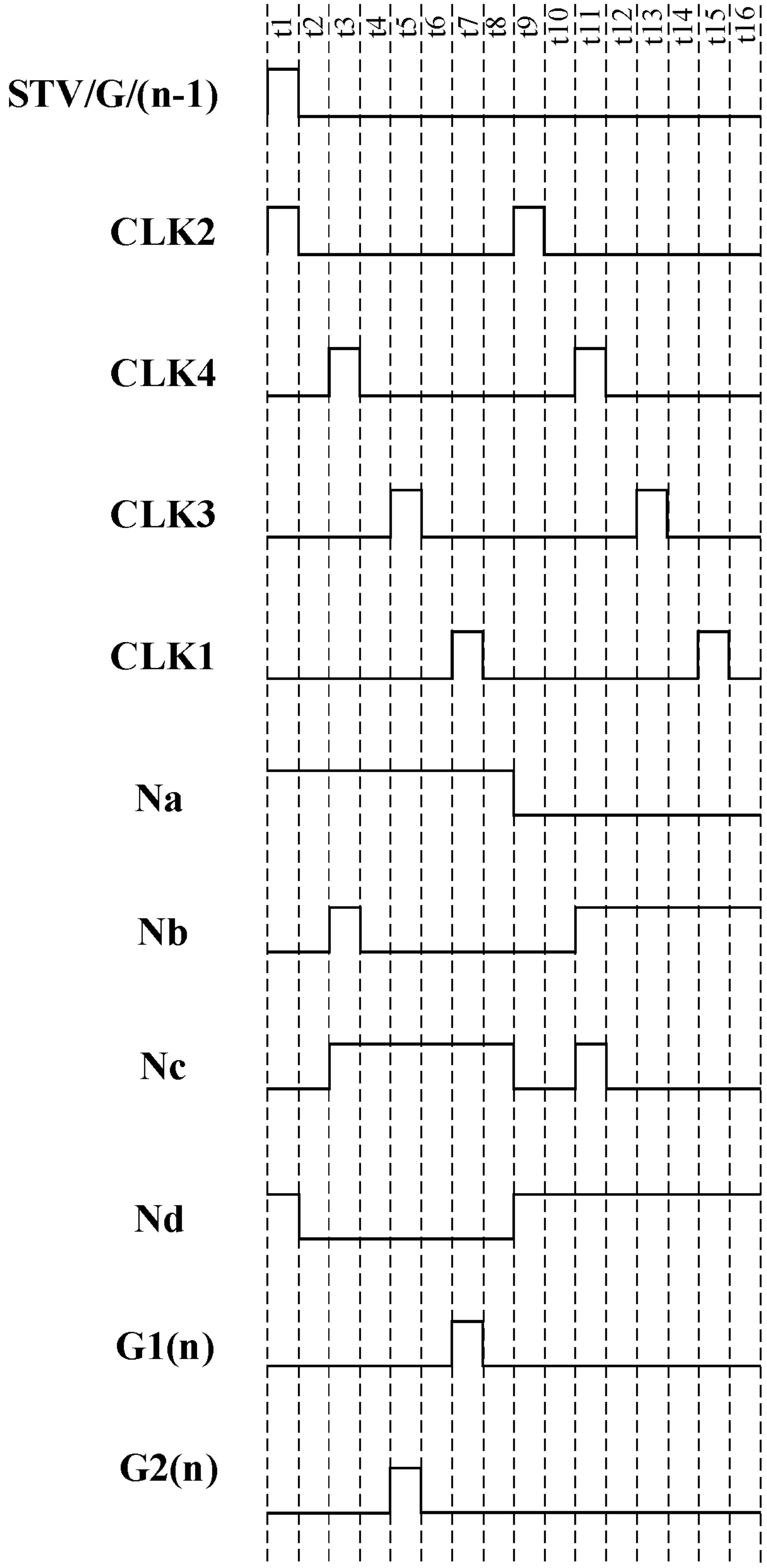
FIG. 7 is a timing diagram of operating a respective scan unit in a scan circuit in some embodiments according to the present disclosure.

FIG. 7 is a timing diagram of operating a respective scan unit in a scan circuit in some embodiments according to the present disclosure. FIG. 7 illustrates the operation of the respective scan unit depicted in FIG. 6 in some embodiments according to the present disclosure. The timing diagram of operating the respective scan unit depicted in FIG. 7 is otherwise the same as the timing diagram of operating the respective scan unit depicted in FIG. 3, except that the effective voltages for operating the respective scan unit depicted in FIG. 7 are high voltages, wherein the effective voltages for operating the respective scan unit depicted in FIG. 3 are low voltages.

Figure 8:
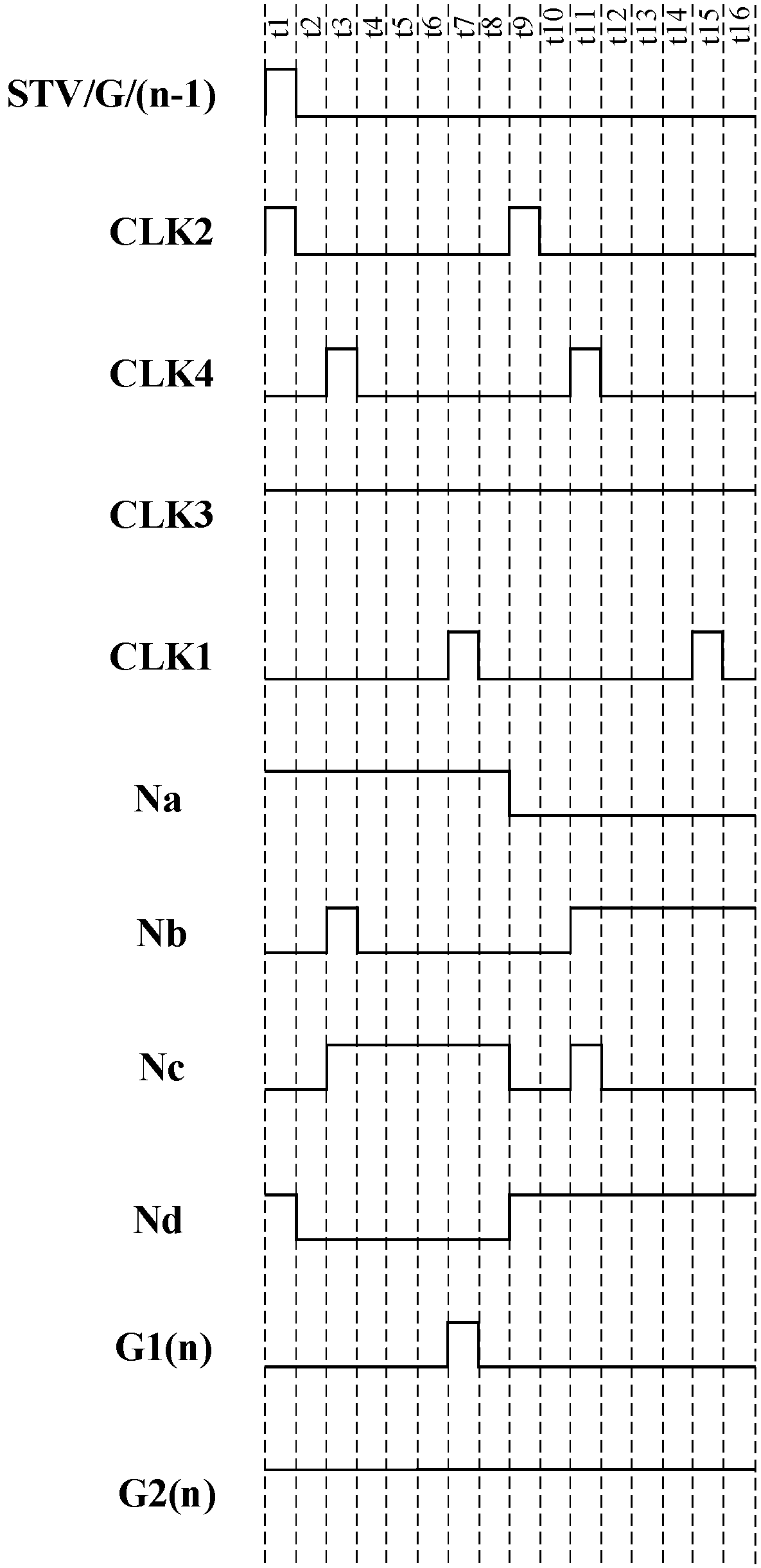
FIG. 8 is a timing diagram of operating a respective scan unit in a scan circuit in some embodiments according to the present disclosure.

FIG. 8 is a timing diagram of operating a respective scan unit in a scan circuit in some embodiments according to the present disclosure. FIG. 8 illustrates the operation of the respective scan unit depicted in FIG. 6 in some embodiments according to the present disclosure. The timing diagram of operating the respective scan unit depicted in FIG. 8 is otherwise the same as the timing diagram of operating the respective scan unit depicted in FIG. 4, except that the effective voltages for operating the respective scan unit depicted in FIG. 8 are high voltages, wherein the effective voltages for operating the respective scan unit depicted in FIG. 4 are low voltages.

Figure 9:
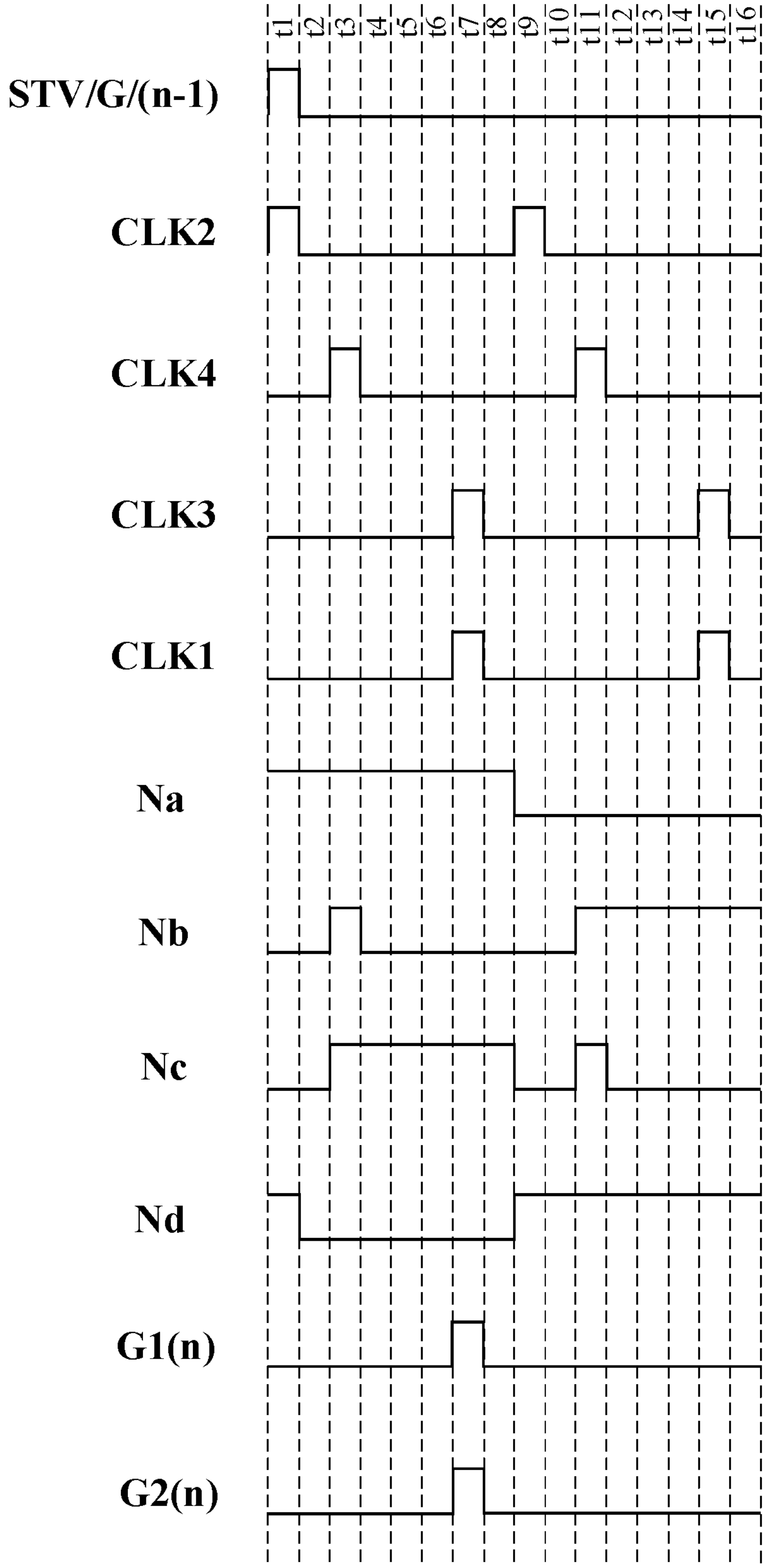
FIG. 9 is a timing diagram of operating a respective scan unit in a scan circuit in some embodiments according to the present disclosure.

FIG. 9 is a timing diagram of operating a respective scan unit in a scan circuit in some embodiments according to the present disclosure. FIG. 9 illustrates the operation of the respective scan unit depicted in FIG. 6 in some embodiments according to the present disclosure. The timing diagram of operating the respective scan unit depicted in FIG. 9 is otherwise the same as the timing diagram of operating the respective scan unit depicted in FIG. 5, except that the effective voltages for operating the respective scan unit depicted in FIG. 9 are high voltages, wherein the effective voltages for operating the respective scan unit depicted in FIG. 5 are low voltages.

Figure 10:
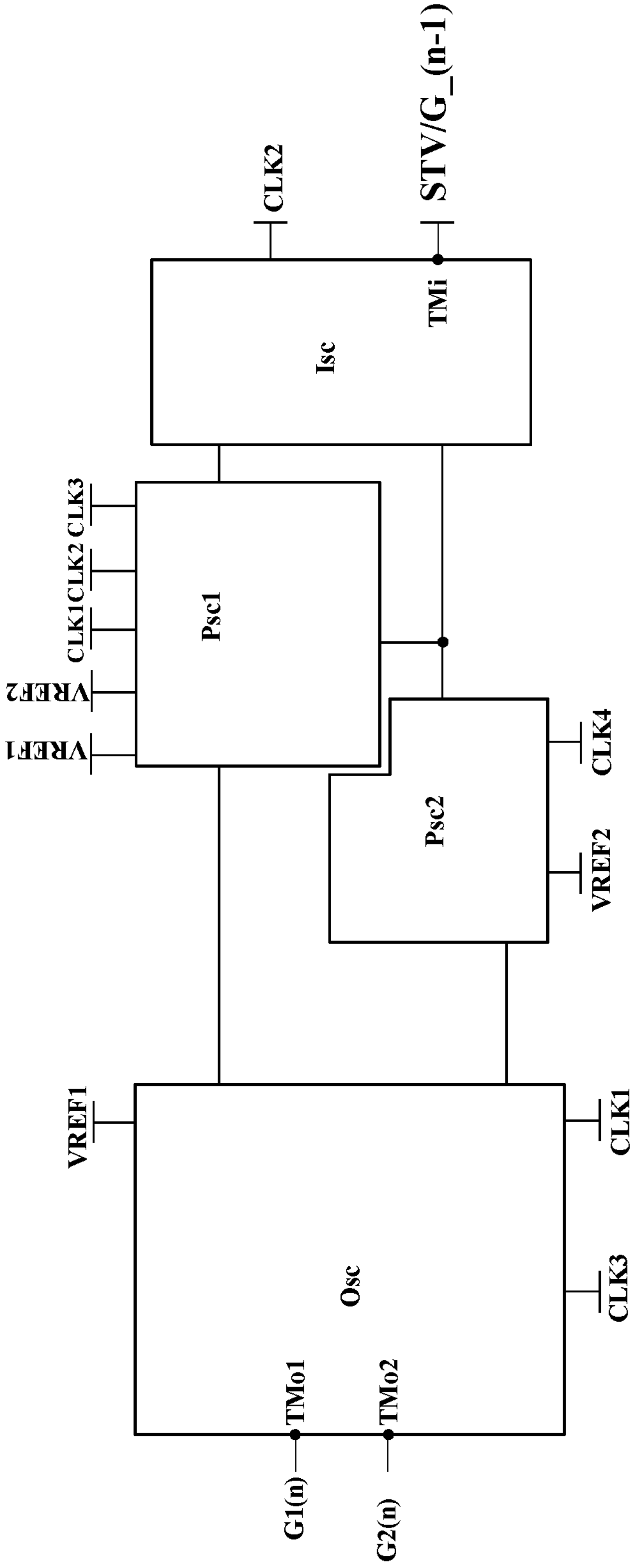
FIG. 10 is a schematic diagram illustrating a respective scan unit in a scan circuit in some embodiments according to the present disclosure.
Figure 11:
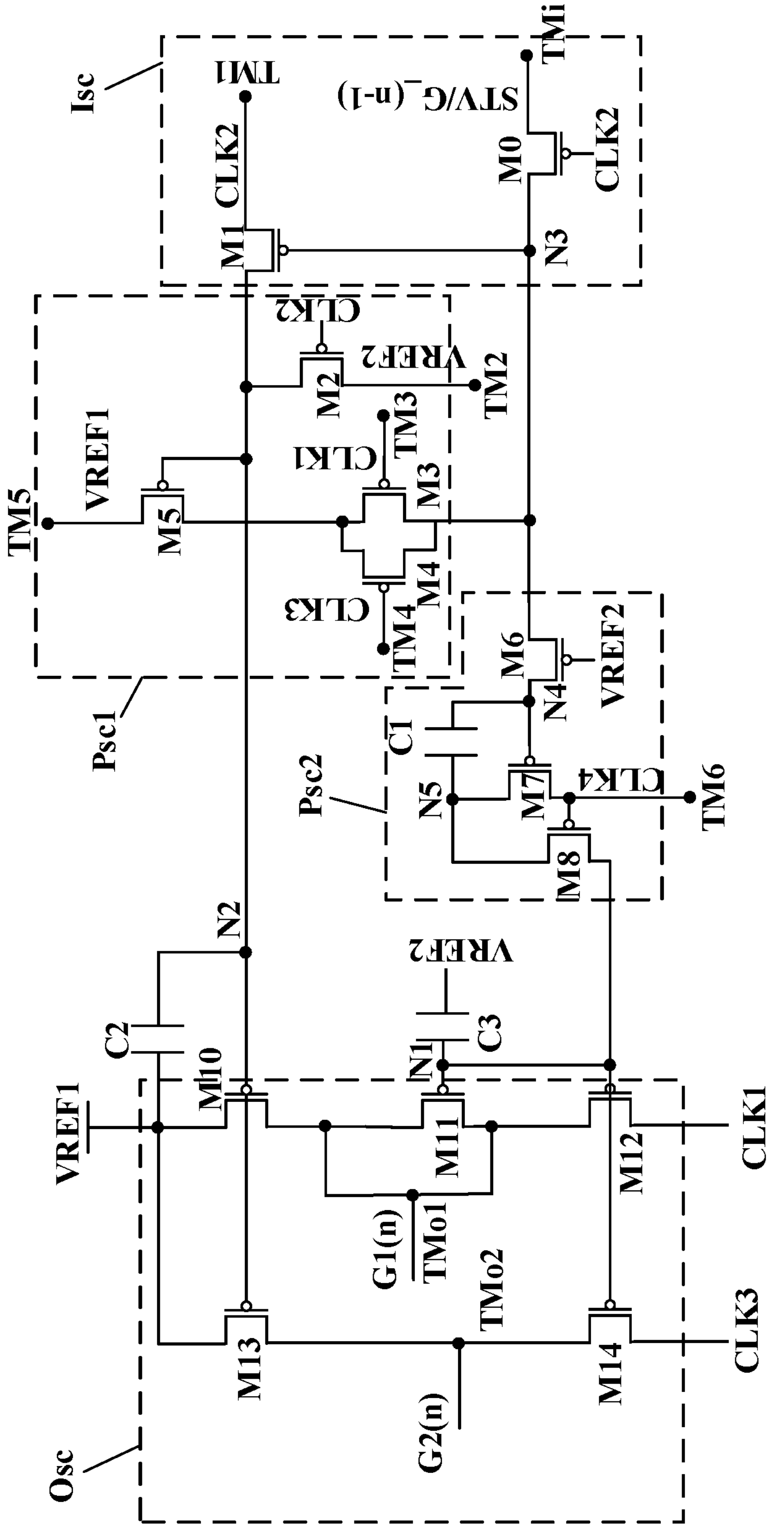
FIG. 11 is a circuit diagram of a respective scan unit in a scan circuit in some embodiments according to the present disclosure.

In some embodiments, the third processing subcircuit Psc3 is optional, e.g., the respective scan unit does not include a third processing subcircuit Psc3. FIG. 10 is a schematic diagram illustrating a respective scan unit in a scan circuit in some embodiments according to the present disclosure. FIG. 11 is a circuit diagram of a respective scan unit in a scan circuit in some embodiments according to the present disclosure. Referring to FIG. 10 and FIG. 11, the respective scan unit in some embodiments includes an input subcircuit Isc, a first processing subcircuit Psc1, a second processing subcircuit Psc2, and an output subcircuit Osc. The respective scan unit depicted in FIG. 10 is otherwise the same as the respective scan unit depicted in FIG. 1 except that the respective scan unit depicted in FIG. 10 does not include a third processing subcircuit. The respective scan unit depicted in FIG. 11 is otherwise the same as the respective scan unit depicted in FIG. 2 except that the respective scan unit depicted in FIG. 11 does not include a third processing subcircuit.

Figure 12:
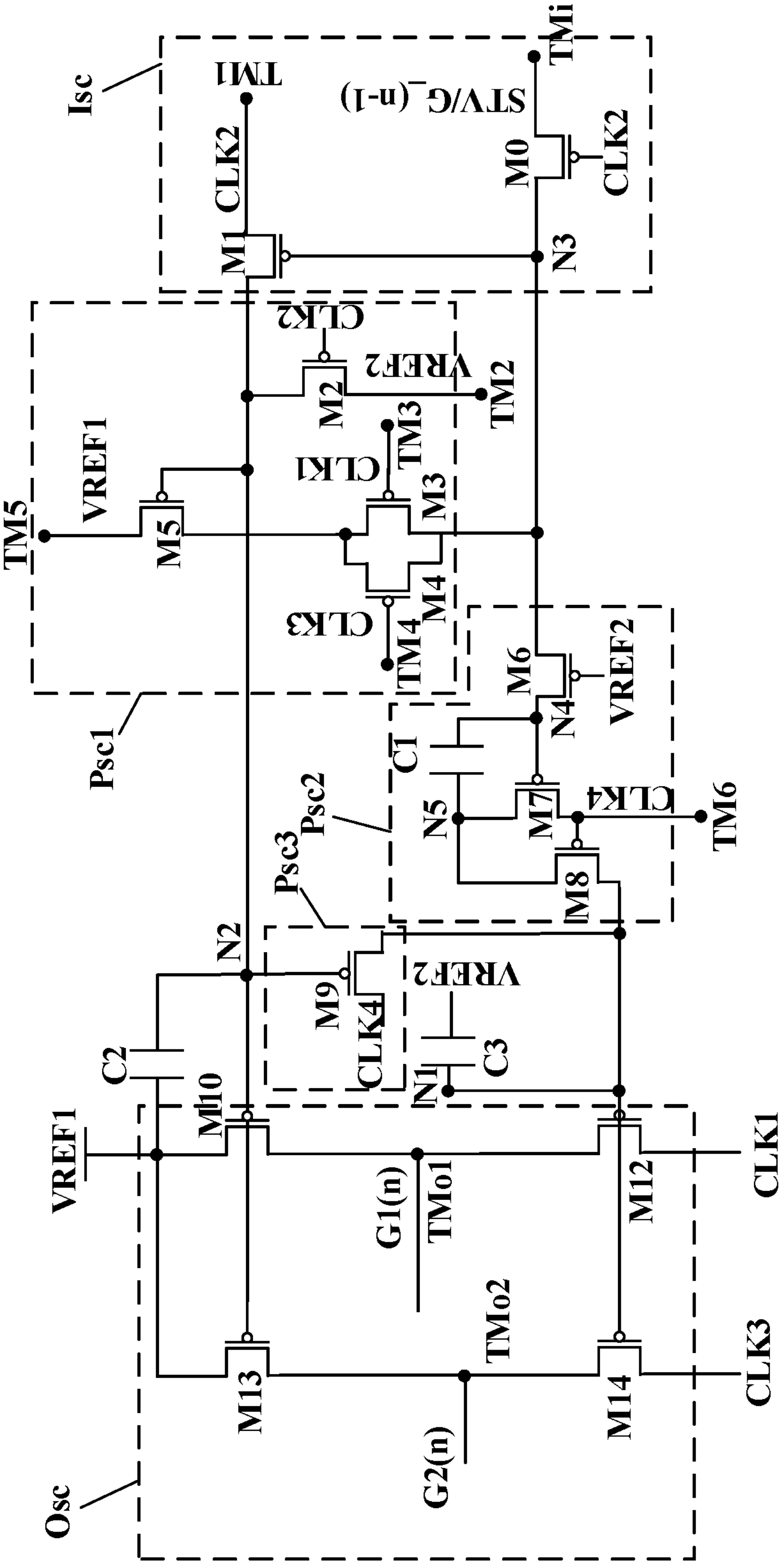
FIG. 12 is a circuit diagram of a respective scan unit in a scan circuit in some embodiments according to the present disclosure.

FIG. 12 is a circuit diagram of a respective scan unit in a scan circuit in some embodiments according to the present disclosure. The respective scan unit depicted in FIG. 12 is otherwise the same as the respective scan unit depicted in FIG. 2 except that the output subcircuit Osc in the respective scan unit depicted in FIG. 12 has a different structure from the output subcircuit Osc in the respective scan unit depicted in FIG. 2. Specifically, the output subcircuit Osc in the respective scan unit depicted in FIG. 12 does not include the eleventh transistor M11.

Figure 13:
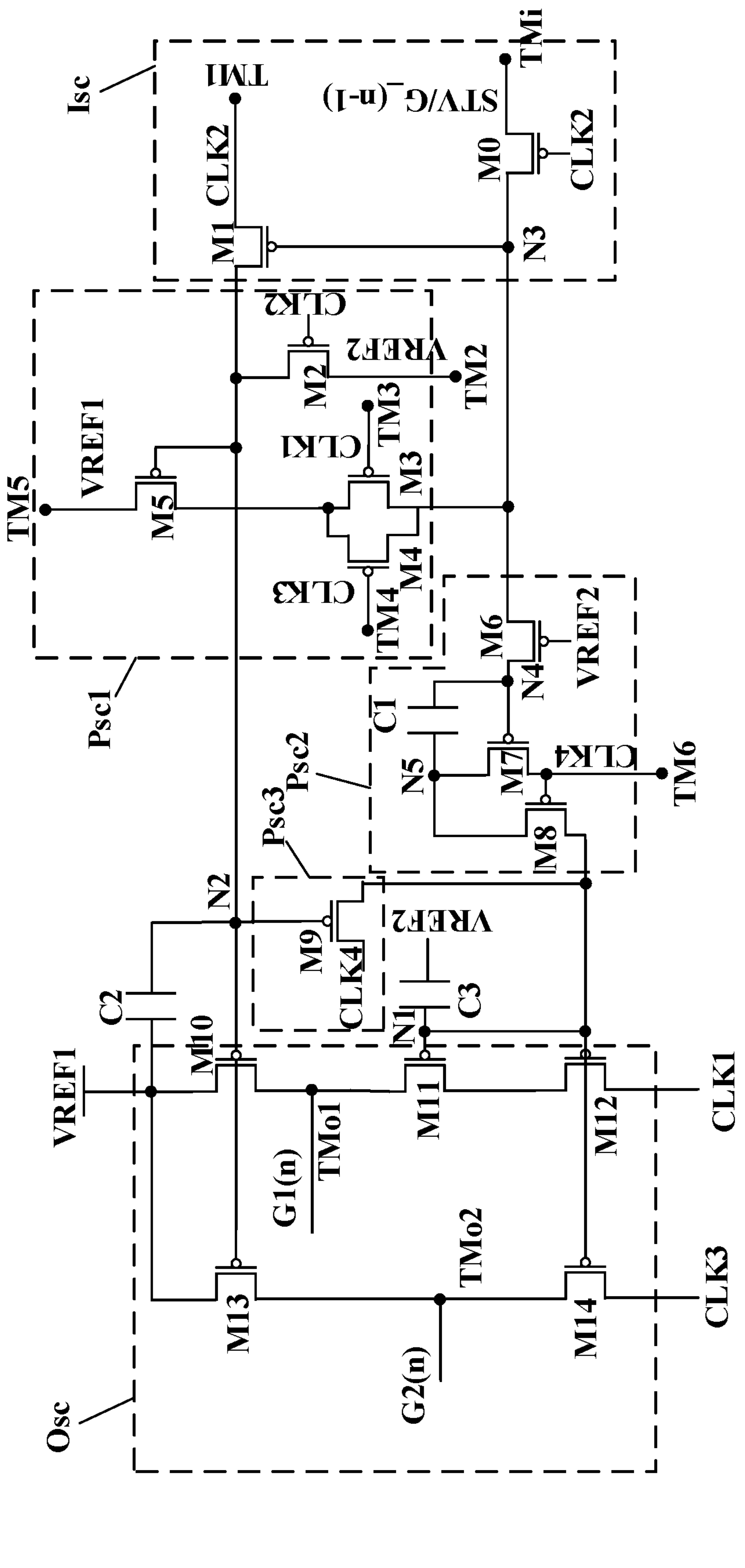
FIG. 13 is a circuit diagram of a respective scan unit in a scan circuit in some embodiments according to the present disclosure.

FIG. 13 is a circuit diagram of a respective scan unit in a scan circuit in some embodiments according to the present disclosure. The respective scan unit depicted in FIG. 13 is otherwise the same as the respective scan unit depicted in FIG. 2 except that the source electrode and the drain electrode of the eleventh transistor M11 are not shorted in the respective scan unit depicted in FIG. 13. In the respective scan unit depicted in FIG. 13, the first output terminal TMo1 is directly connected to the drain electrode of the eleventh transistor M11 but not directly connected to the source electrode of the eleventh transistor M11.

Figure 14:
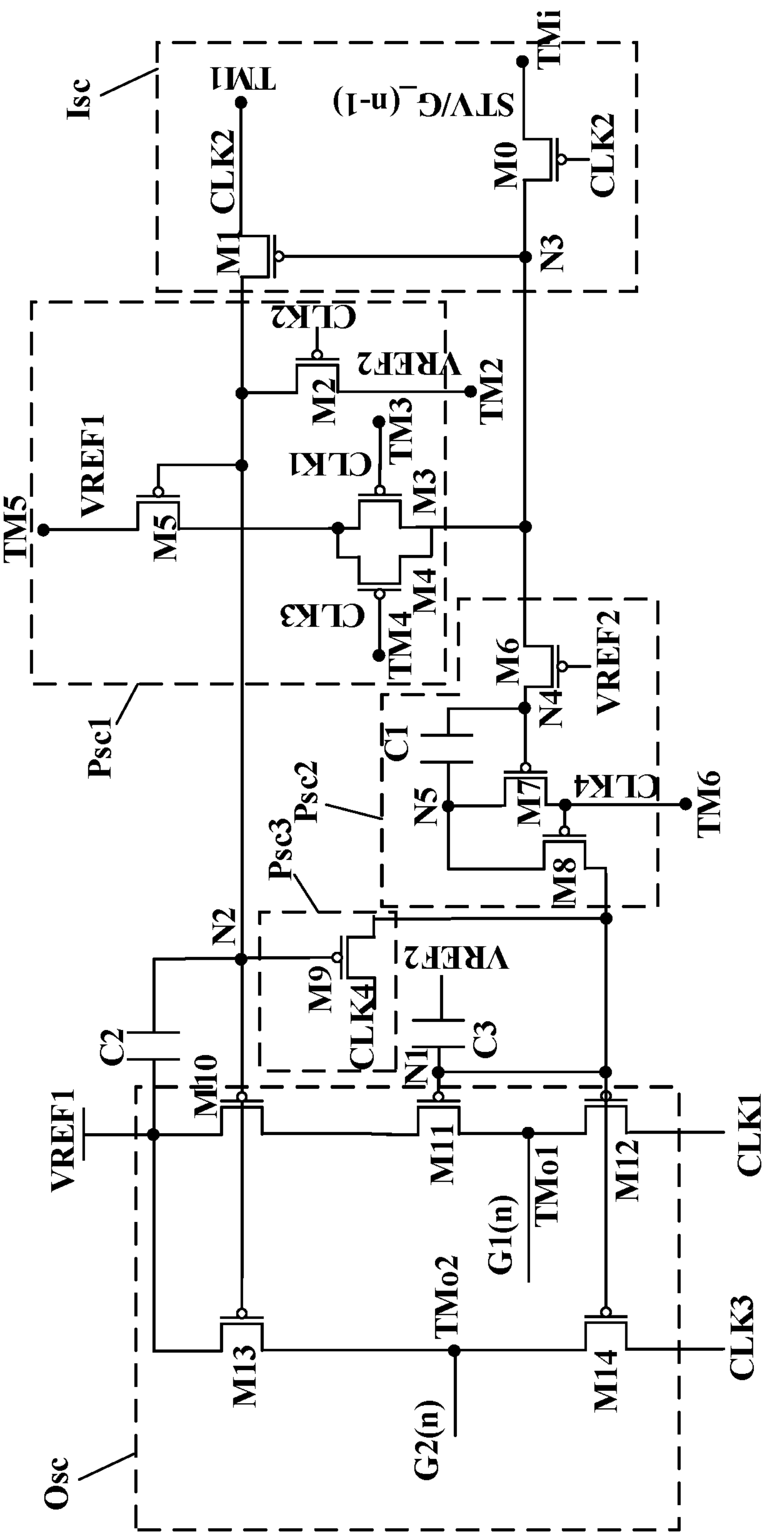
FIG. 14 is a circuit diagram of a respective scan unit in a scan circuit in some embodiments according to the present disclosure.

FIG. 14 is a circuit diagram of a respective scan unit in a scan circuit in some embodiments according to the present disclosure. The respective scan unit depicted in FIG. 14 is otherwise the same as the respective scan unit depicted in FIG. 2 except that the source electrode and the drain electrode of the eleventh transistor M11 are not shorted in the respective scan unit depicted in FIG. 14. In the respective scan unit depicted in FIG. 14, the first output terminal TMo1 is directly connected to the source electrode of the eleventh transistor M11 but not directly connected to the drain electrode of the eleventh transistor M11.

In some embodiments, referring to FIG. 1 to FIG. 14, the respective scan unit of the plurality of scan units includes at least one of an input subcircuit Isc, a first processing subcircuit Psc1, a second processing subcircuit Psc2, or an output subcircuit Osc. The respective scan unit is configured to receive at least one of a first clock signal CLK1, a second clock signal CLK2, a third clock signal CLK3, a fourth clock signal CLK4, a first reference signal VREF1, or a second reference signal VREF2. Optionally, the output subcircuit Osc includes a first output terminal TMo1, a second output terminal TMo2, a twelfth transistor M12, and a fourteenth transistor M14. Optionally, a source electrode of the twelfth transistor M12 is coupled to a third terminal TM3 configured to receive the first clock signal CLK1. Optionally, a drain electrode of the twelfth transistor M12 is coupled to the first output terminal TMo1 configured to output a first control signal G1($n$). Optionally, a source electrode of the fourteenth transistor M14 is coupled to a fourth terminal TM4 configured to receive the third clock signal CLK3. Optionally, a drain electrode of the fourteenth transistor M14 is coupled to the second output terminal TMo2 configured to output a second control signal G2($n$). Optionally, gate electrodes of the twelfth transistor M12 and the fourteenth transistor M14 are coupled to (e.g., directly connected to) a first node N1. In one example, the gate electrodes of the twelfth transistor M12 and the fourteenth transistor M14 are directly connected to the first node N1.

In some embodiments, the output subcircuit Osc further includes a tenth transistor M10 and a thirteenth transistor M13. Optionally, source electrodes of the tenth transistor M10 and the thirteenth transistor M13 are coupled to a fifth terminal configured to receive the first reference signal VREF1. Optionally, a drain electrode of the tenth transistor M10 is coupled to the first output terminal TMo1. Optionally, a drain electrode of the thirteenth transistor M13 is coupled to the second output terminal TMo2. Optionally, gate electrodes of the tenth transistor M10 and the thirteenth transistor M13 are coupled to (e.g., directly connected to) a second node N2. In one example, the gate electrodes of the tenth transistor M10 and the thirteenth transistor M13 are directly connected to the second node N2.

In some embodiments, the output subcircuit Osc further includes an eleventh transistor M11 coupled between the tenth transistor M10 and the twelfth transistor M12. Optionally, a gate electrode of the eleventh transistor M11 is coupled to the first node N1. Optionally, at least one of a source electrode and a drain electrode of the eleventh transistor M11 is coupled to the first output terminal TMo1. Optionally, both of the source electrode and the drain electrode of the eleventh transistor M11 are coupled to the first output terminal TMo1.

In some embodiments, the respective scan unit further includes a second capacitor C2. Optionally, a first capacitor electrode of the second capacitor C2 is coupled to the source electrode of the tenth transistor M10. Optionally, a second capacitor electrode of the second capacitor C2 is coupled to the second node N2.

In some embodiments, the respective scan unit further includes a third capacitor C3. Optionally, a first capacitor electrode of the third capacitor C3 is coupled to the first node N1. Optionally, a second capacitor electrode of the third capacitor C3 is coupled to a second terminal TM2 configured to receive a second reference signal VREF2.

In some embodiments, the input subcircuit Isc includes an input transistor M0, a first transistor M1, an input terminal TMi, and a first terminal TM1. Optionally, a gate electrode of the input transistor M0 and a source electrode of the first transistor M1 are coupled to the first terminal TM1 configured to receive the second clock signal CLK2. Optionally, a gate electrode of the first transistor M1 and a drain electrode of the input transistor M0 are coupled to a third node N3. Optionally, a source electrode of the input transistor M0 is coupled to the input terminal TMi configured to receive a start signal STV or an output signal G_(n−1) from a previous scan unit of a previous stage. Optionally, a drain electrode of the first transistor M1 is coupled to a second node N2.

In some embodiments, the first processing subcircuit Psc1 includes at least one of a second transistor M2, a third transistor M3, a fourth transistor M4, or a fifth transistor M5. Optionally, source electrodes of the third transistor M3 and the fourth transistor M4 are coupled to a drain electrode of the fifth transistor M5. Optionally, drain electrodes of the third transistor M3 and the fourth transistor M4 are coupled to a third node N3. Optionally, a gate electrode of the third transistor M3 is coupled to the third terminal TM3 configured to receive the first clock signal CLK1. Optionally, a gate electrode of the fourth transistor M4 is coupled to the fourth terminal TM4 configured to receive the third clock signal CLK3.

In some embodiments, a gate electrode of the fifth transistor M5 and a drain electrode of the second transistor M2 are coupled to a second node N2. Optionally, a source electrode of the fifth transistor M5 is coupled to a fifth terminal TM5 configured to receive the first reference signal VREF1. Optionally, a source electrode of the second transistor M2 is coupled to a second terminal TM2 configured to receive the second reference signal VREF2.

In some embodiments, the second processing subcircuit Psc2 includes a seventh transistor M7 and an eighth transistor M8. Optionally, a gate electrode of the seventh transistor M7 is coupled to a fourth node N4. Optionally, a source electrode of the seventh transistor M7 and a gate electrode of the eighth transistor M8 are coupled to a sixth terminal TM6 configured to receive the fourth clock signal CLK4. Optionally, a drain electrode of the seventh transistor M7 and a source electrode of the eighth transistor M8 are coupled to a fifth node N5. Optionally, a drain electrode of the eighth transistor M8 is coupled to the first node N1.

In some embodiments, the second processing subcircuit Psc2 further includes a sixth transistor M6 and a first capacitor C1. Optionally, a gate electrode of the sixth transistor M6 is coupled to a second terminal TM2 configured to receive the second reference signal VREF2. Optionally, a source electrode of the sixth transistor M6 is coupled to a third node N3. Optionally, a drain electrode of the sixth transistor M6 and a first capacitor electrode of the first capacitor C1 are coupled to the fourth node N4. Optionally, a second capacitor electrode of the first capacitor C1 is coupled to the fifth node N5.

In some embodiments, the respective scan unit further includes a third processing subcircuit Psc3. Optionally, the third processing subcircuit Psc3 includes a ninth transistor M9 having a gate electrode coupled to a second node N2, a source electrode coupled to a sixth terminal TM6 configured to receive the fourth clock signal CLK6, and a drain electrode coupled to the first node N1.

Figure 15:
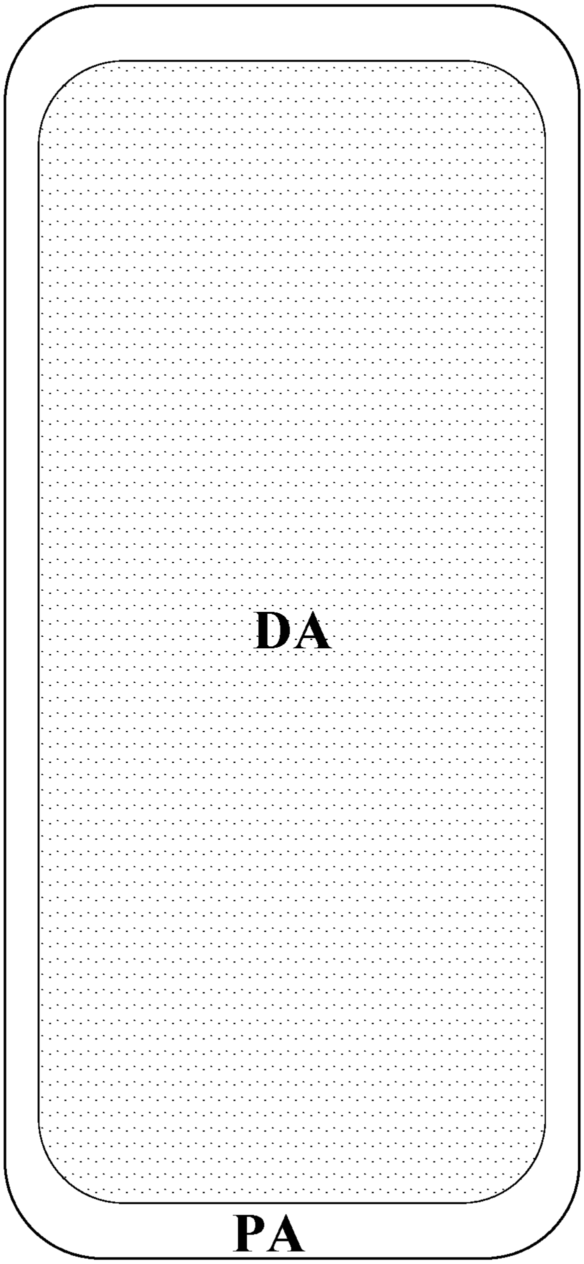
FIG. 15 is a schematic diagram illustrating the structure of a light emitting substrate in some embodiments according to the present disclosure.

In another aspect, the present disclosure provides a light emitting substrate driven by the scan circuit. FIG. 15 is a schematic diagram illustrating the structure of a light emitting substrate in some embodiments according to the present disclosure. Referring to FIG. 15, the light emitting substrate in some embodiments includes a display region DA and a peripheral region PA. As used herein, the term "display region" refers to an area of a light emitting substrate in a display panel where image is actually displayed. Optionally, the display region may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels. As used herein the term "peripheral region" refers to an area of a light emitting substrate in a display panel where various circuits and wires are provided to transmit signals to the display substrate. To increase the transparency of the display apparatus, non-transparent or opaque components of the array apparatus (e.g., battery, printed circuit board, metal frame), can be disposed in the peripheral region rather than in the display region.

Figure 16:
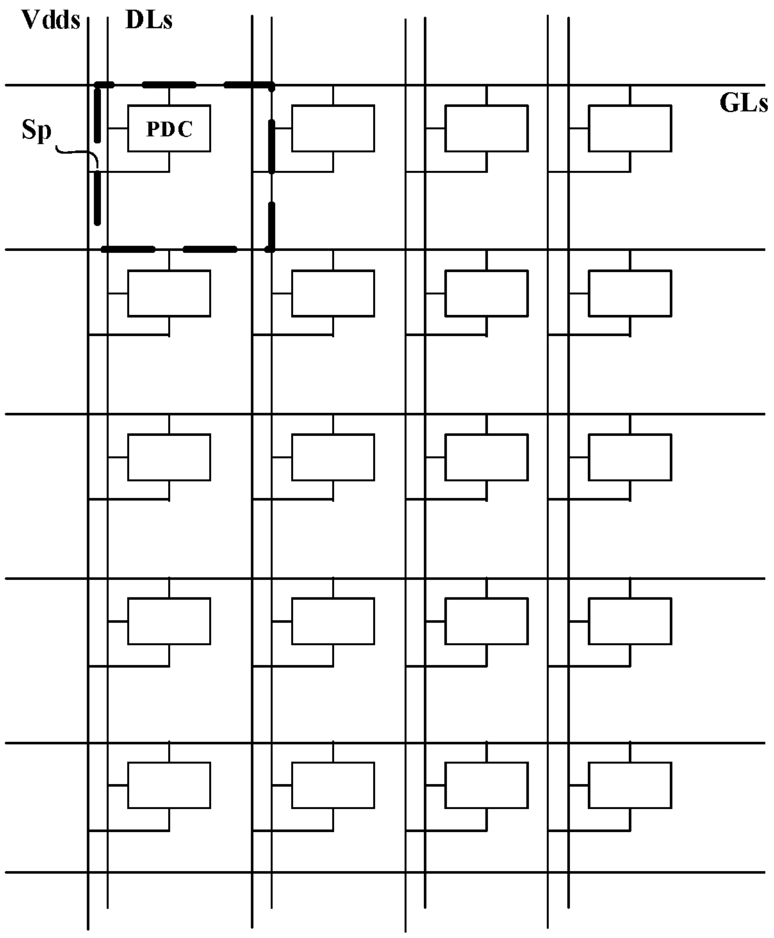
FIG. 16 is a circuit diagram of a light emitting substrate in some embodiments according to the present disclosure.

FIG. 16 is a circuit diagram of a light emitting substrate in some embodiments according to the present disclosure. Referring to FIG. 16, the light emitting substrate includes an array of subpixels. Each subpixel includes an electronic component, e.g., a light emitting element. In some embodiments, the light emitting substrate further includes a plurality of light emitting elements driven by the plurality of pixel driving circuits. In one example, the light emitting element is driven by a respective pixel driving circuit. The light emitting substrate includes a plurality of gate lines GLs, a plurality of data lines DLs, and a plurality of power supply voltage lines Vdds. Light emission in a respective subpixel Sp is driven by a respective pixel driving circuit PDC. In one example, a high voltage signal is input, through a respective one of the plurality of power supply voltage lines Vdds, to the respective pixel driving circuit PDC connected to an anode of the light emitting element; a low voltage signal (a constant voltage supply line) is input to a cathode of the light emitting element. A voltage difference between the high voltage signal (e.g., the VDD signal) and the low voltage signal (e.g., the VSS signal) is a driving voltage $\Delta V$ that drives light emission in the light emitting element.

The light emitting substrate in some embodiments includes a plurality of subpixels. In some embodiments, the plurality of subpixels includes a respective first subpixel, a respective second subpixel, a respective third subpixel, and a respective fourth subpixel. Optionally, a respective pixel of the light emitting substrate includes the respective first subpixel, the respective second subpixel, the respective third subpixel, and the respective fourth subpixel. The plurality of subpixels in the light emitting substrate are arranged in an array. In one example, the array of the plurality of subpixels includes a S1-S2-S3-S4 format repeating array, in which SI stands for the respective first subpixel, S2 stands for the respective second subpixel, S3 stands for the respective third subpixel, and S4 stands for the respective fourth subpixel. In another example, the S1-S2-S3-S4 format is a C1-C2-C3-C4 format, in which C1 stands for the respective first subpixel of a first color, C2 stands for the respective second subpixel of a second color, C3 stands for the respective third subpixel of a third color, and C4 stands for the respective fourth subpixel of a fourth color. In another example, the S1-S2-S3-S4 format is a C1-C2-C3-C2' format, in which C1 stands for the respective first subpixel of a first color, C2 stands for the respective second subpixel of a second color, C3 stands for the respective third subpixel of a third color, and C2' stands for the respective fourth subpixel of the second color. In another example, the C1-C2-C3-C2' format is a R-G-B-G format, in which the respective first subpixel is a red subpixel, the respective second subpixel is a green subpixel, the respective third subpixel is a blue subpixel, and the respective fourth subpixel is a green subpixel.

Various appropriate pixel driving circuits may be used in the present light emitting substrate. Examples of appropriate driving circuits include 3TIC, 2TIC, 4TIC, 4T2C, 5T2C, 6TIC, 7TIC, 7T2C, 8TIC, and 8T2C. Various appropriate light emitting elements may be used in the present light emitting substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 17:
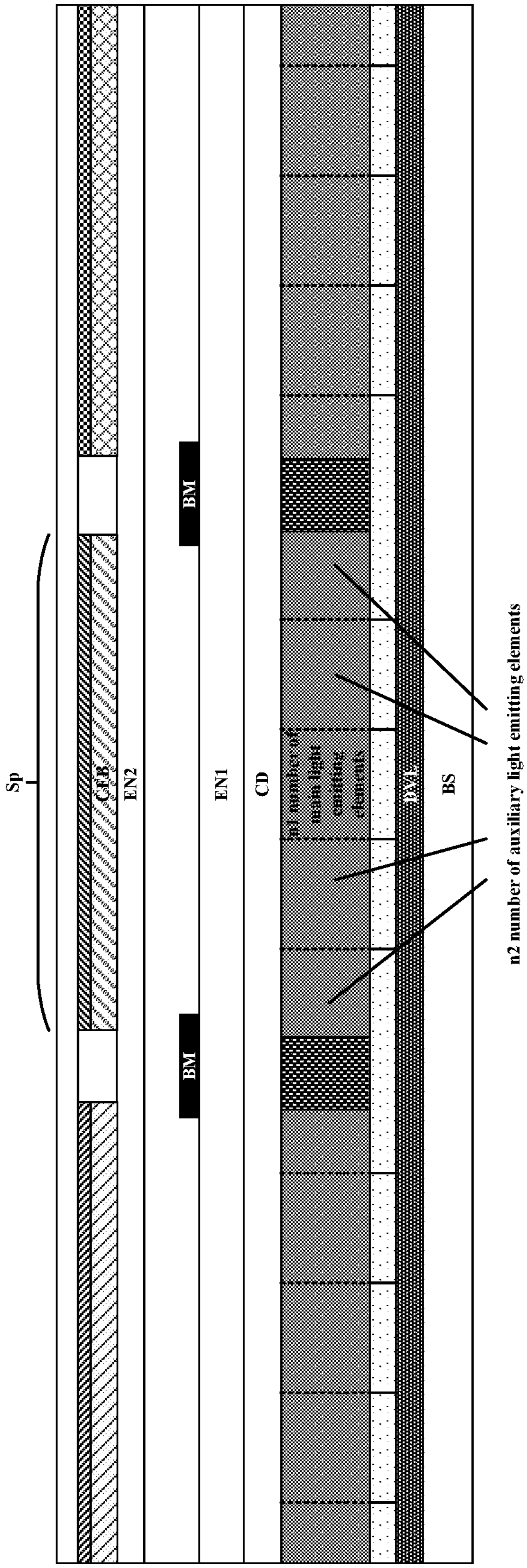
FIG. 17 is a cross-sectional view of a light emitting substrate in some embodiments according to the present disclosure.

FIG. 17 is a cross-sectional view of a light emitting substrate in some embodiments according to the present disclosure. Referring to FIG. 17, the display panel in some embodiments includes a plurality of subpixels. A respective subpixel Sp of the plurality of subpixels in some embodiments includes n1 number of main light emitting elements and n2 number of auxiliary light emitting elements, n1≥1, and n2≥1. Optionally, n1 is an integer. Optionally, n2 is an integer.

In the present light emitting substrate, the term "subpixel" refers to an element of a pixel, the subpixel may include multiple pixel driving circuits and multiple light emitting elements. However, the multiple light emitting elements in a subpixel emit light to achieve a grayscale required for the element of the pixel. For example, a pixel may include three subpixels, a red subpixel, a green subpixel, and a blue subpixel. To display a pixel of an image, the red subpixel emits light to achieve a first grayscale, the green subpixel emits light to achieve a second grayscale, and the blue subpixel emits light to achieve a third grayscale. Light emitted from the multiple light emitting elements in a red subpixel together achieves the first grayscale. Light emitted from the multiple light emitting elements in a green subpixel together achieves the second grayscale. Light emitted from the multiple light emitting elements in a blue subpixel together achieves the third grayscale. Accordingly, the multiple pixel driving circuits are controlled by at least one same control signal. For example, a signal from a light emitting control signal line may be transmitted to the multiple pixel driving circuits in phase as the light emitting control signal for each of the multiple pixel driving circuits. In another example, a signal from a gate line may be transmitted to the multiple pixel driving circuits in phase as the gate scanning signal for each of the multiple pixel driving circuits. In another example, only one data signal is transmitted to the multiple pixel driving circuits, e.g., the data signal is transmitted to only one or two of the multiple pixel driving circuits.

Referring to FIG. 17 again, the light emitting substrate further includes a pixel driving layer DVL, which includes n1 number of main pixel driving circuits and n2 number of auxiliary pixel driving circuits, n1≥1, and n2≥1. Optionally, n1 is an integer. Optionally, n2 is an integer. A respective main pixel driving circuit of the n1 number of main pixel driving circuits is configured to drive light emission in a respective main light emitting element of the n1 number of main light emitting elements. A respective auxiliary pixel driving circuit of the n2 number of auxiliary pixel driving circuits is configured to drive light emission in a respective auxiliary light emitting element of the n2 number of auxiliary light emitting elements.

Figure 18:
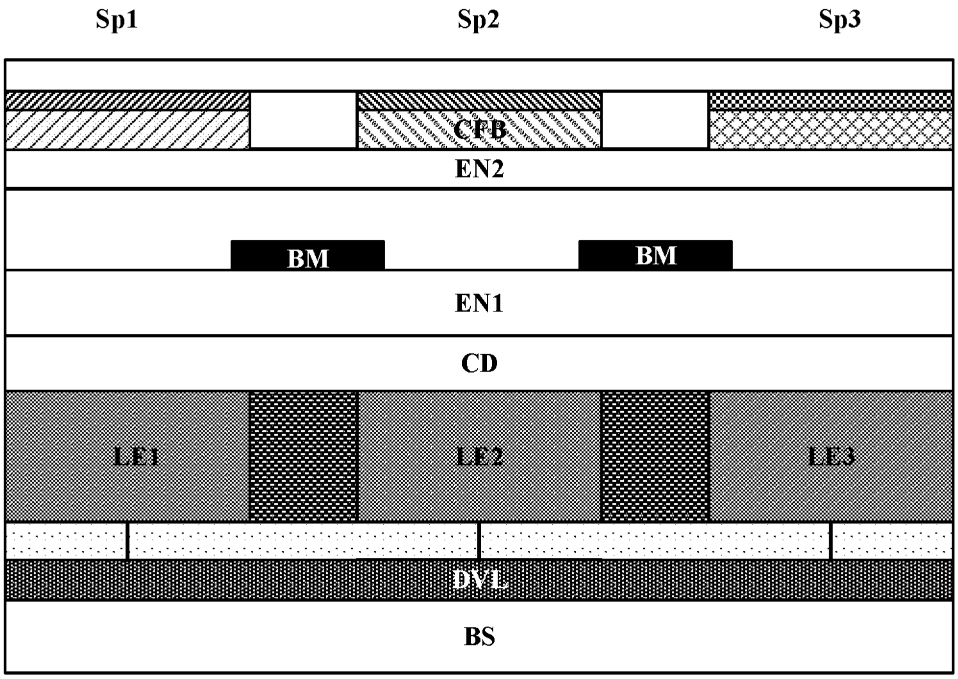
FIG. 18 is a cross-sectional view of a light emitting substrate in some embodiments according to the present disclosure.

FIG. 18 is a cross-sectional view of a light emitting substrate in some embodiments according to the present disclosure. Referring to FIG. 18, a pixel of the light emitting substrate includes three subpixels, Sp1, Sp2, and Sp3. Each subpixel includes a single light emitting element and a single pixel driving circuit in a pixel driving layer DVL. Three light emitting elements, LE1, LE2, and LE3 are denoted in FIG. 4. The inventors of the present disclosure discover that cross-talk issue occurs between adjacent subpixels. For example, light emitted from the first light emitting element LEI may enter the second subpixel Sp2. To reduce the cross-talk, the light emitting substrate includes a black matrix BM in an inter-subpixel region between adjacent subpixels. However, the inventors of the present disclosure discover that the black matrix BM typically absorbs light, lowering light utilization efficiency in the light emitting substrate. The cross-talk issue is particularly prominent when all of the light emitting elements are blue light emitting elements, due to the wide angle of light emitted from the blue light emitting elements.

The inventors of the present disclosure discover that the display method and the intricate structure of the light emitting substrate according to the present disclosure can efficiently prevent inter-subpixel cross-talk while maintaining an excellent light utilization efficiency. The present display method includes multiple display modes in which different number of light emitting elements in a same subpixel are configured to emit light. In some embodiments, for displaying a first frame of image, the method includes controlling light emission of a respective subpixel to be limited in the n1 number of main light emitting elements and m number of the n2 number of auxiliary light emitting elements, 0≤m≤n2. For displaying a second frame of image, controlling light emission of the respective subpixel to be limited in the n1 number of main light emitting elements and m' number of the n2 number of auxiliary light emitting elements, 0≤m'≤n2, and m≠m'.

In one example, for displaying the first frame of image in a first mode, the light emission of the respective subpixel is limited in the n1 number of main light emitting elements, m=0. for displaying the second frame of image in a second mode, the light emission of the respective subpixel is limited in the n1 number of main light emitting elements and the n2 number of auxiliary light emitting elements, m'=n2.

The inventors of the present disclosure discover that the display method and the intricate structure of the light emitting substrate according to the present disclosure can efficiently prevent inter-subpixel cross-talk while maintaining an excellent light utilization efficiency. The present display method includes multiple display modes in which different number of light emitting elements in a same subpixel are configured to emit light. In some embodiments, for displaying a first frame of image, the method includes controlling light emission of a respective subpixel to be limited in the n1 number of main light emitting elements and m number of the n2 number of auxiliary light emitting elements, 0≤m≤n2. For displaying a second frame of image, controlling light emission of the respective subpixel to be limited in the n1 number of main light emitting elements and m' number of the n2 number of auxiliary light emitting elements, 0≤m'≤n2, and m≠m'.

In one example, for displaying the first frame of image in a first mode, the light emission of the respective subpixel is limited in the n1 number of main light emitting elements, m=0. for displaying the second frame of image in a second mode, the light emission of the respective subpixel is limited in the n1 number of main light emitting elements and the n2 number of auxiliary light emitting elements, m'=n2.

Figure 19A:
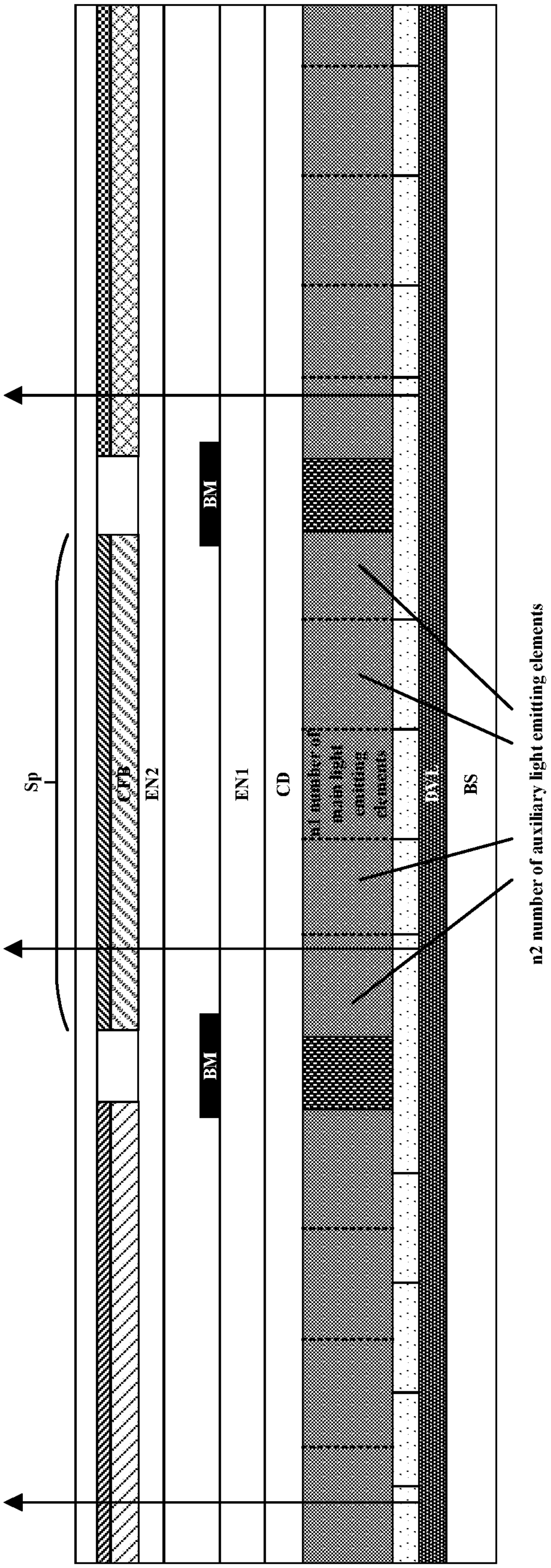
FIG. 19A is a schematic diagram of a light emitting substrate for image display in a first mode in some embodiments according to the present disclosure.
Figure 19B:
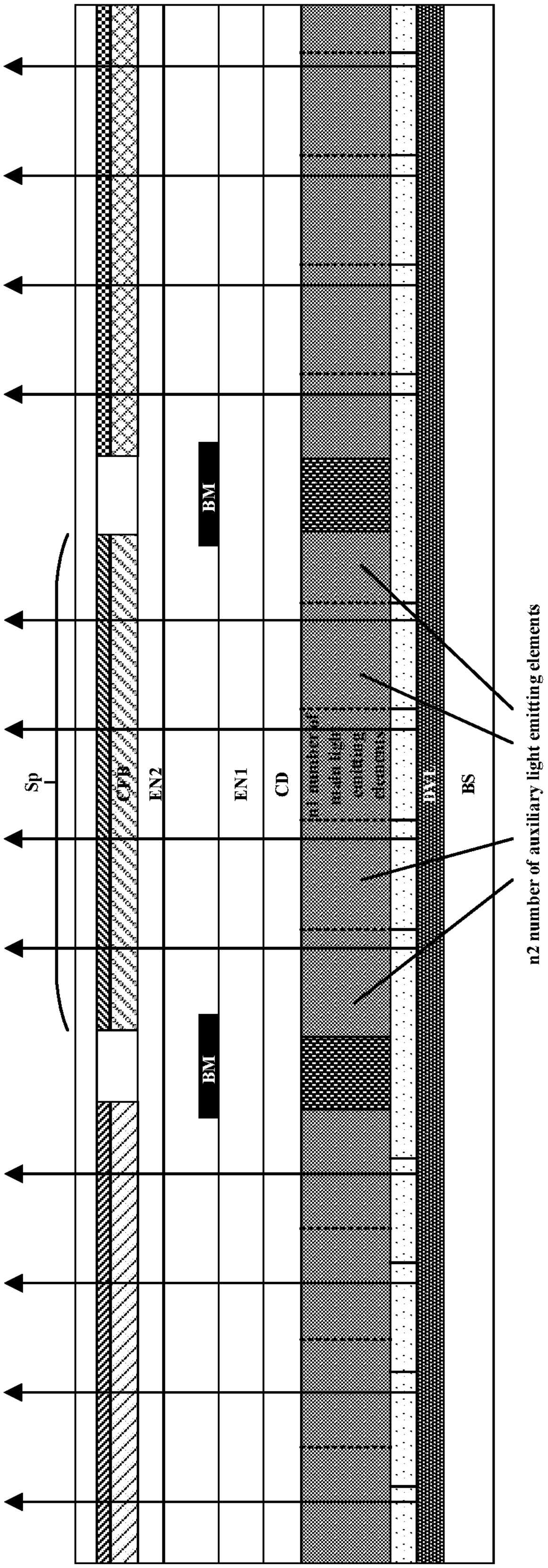
FIG. 19B is a schematic diagram of a light emitting substrate for image display in a second mode in some embodiments according to the present disclosure.

FIG. 19A is a schematic diagram of a light emitting substrate for image display in a first mode in some embodiments according to the present disclosure. In the example depicted in FIG. 19A, n1=1, n2=3. Referring to FIG. 19A, in the first mode, only the n1 number of main light emitting elements are configured to emit light, whereas the n2 number of auxiliary light emitting elements are not configured to emit light. FIG. 19B is a schematic diagram of a light emitting substrate for image display in a second mode in some embodiments according to the present disclosure. Referring to FIG. 19B, in the second mode, the n1 number of main light emitting elements and the n2 number of auxiliary light emitting elements are all configured to emit light.

Different display modes according to the present display method may be used in different scenarios. In one example, a first mode is used when at least a portion of the display panel comprising the respective subpixel is configured to display a monochromatic image. Referring to FIG. 5, the n1 number of main light emitting elements are adjacent to the black matrix BM, which prevents cross-talk between the respective subpixel and a first adjacent subpixel on a first side (the left side) of the respective subpixel. Because the n2 number of auxiliary light emitting elements do not emit light, and the n1 number of main light emitting elements are spaced apart from a second adjacent subpixel on a second side (the right side), cross-talk between the respective subpixel and the second adjacent subpixel on the second side of the respective subpixel is also prevented.

Similarly, the first mode may be used when the first frame of image of the respective subpixel has a high contrast compared to a frame of image in an adjacent subpixel. In one example, the first mode is used when the frame of image in the adjacent subpixel has a lower grayscale than the first frame of image of the respective subpixel.

In another example, a second mode is used when at least a portion of the display panel comprising the respective subpixel is configured to display a color image, for which light utilization efficiency becomes more important. For example, to achieve a brightness of 80 nit in the respective subpixel, the n1 number of main light emitting elements may be configured to contribute 65 nit while the n2 number of auxiliary light emitting elements contributes 15 nit, light utilization efficiency may be significantly enhanced in the light emitting substrate.

The display modes are not limited to the first mode and the second mode. A total of n2 number of modes may be implemented in the present display method. In some embodiments, a third mode is use. For displaying a third frame of image in a third mode, the method includes controlling light emission of the respective subpixel to be limited in the nl number of main light emitting elements and m" number of the n2 number of auxiliary light emitting elements, 1<m"<n2, and m<m"<m'.

Figure 20:
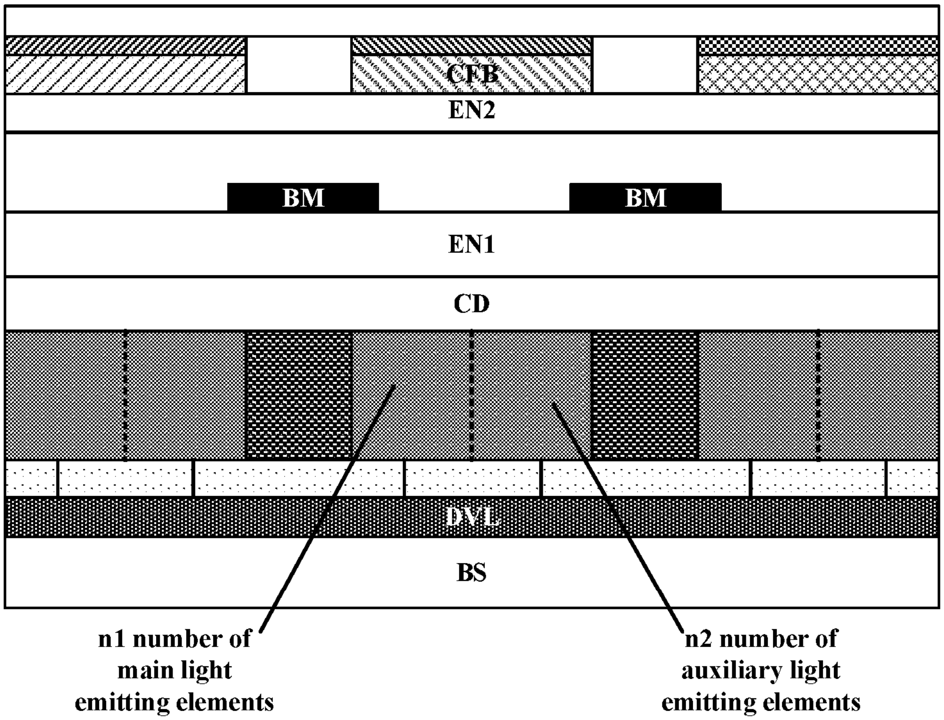
FIG. 20 is a cross-sectional view of a light emitting substrate in some embodiments according to the present disclosure.

In one example, n1=1, and n2=1. FIG. 20 is a cross-sectional view of a light emitting substrate in some embodiments according to the present disclosure. Referring to FIG. 20, in some embodiments, the n1 number of main light emitting elements consists of a single main light emitting element, the n2 number of auxiliary light emitting elements consists of a single auxiliary light emitting element, the n1 number of main pixel driving circuits in a pixel driving layer DVL consists of a single main pixel driving circuit, the n2 number of auxiliary pixel driving circuits consists of a single auxiliary pixel driving circuit.

Various appropriate implementations may be used for achieving the display method. In some embodiments, each of the n2 number of modes may be realized by controlling the n1 number of main pixel driving circuits and the n2 number of auxiliary pixel driving circuits. In some embodiments, the method includes driving light emission in a respective main light emitting element of the n1 number of main light emitting elements by a respective main pixel driving circuit; and driving light emission in a respective auxiliary light emitting element of the n2 number of auxiliary light emitting elements by a respective auxiliary pixel driving circuit coupled to the respective main pixel driving circuit.

Figure 21:
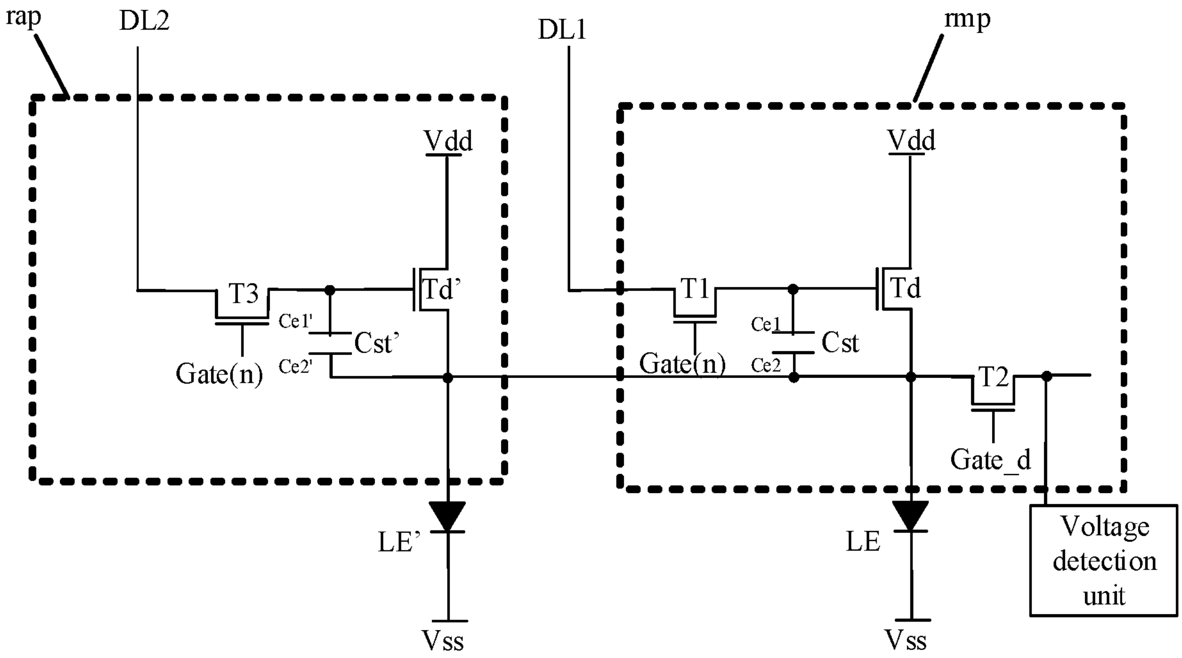
FIG. 21 is a circuit diagram illustrating the structure of a respective main pixel driving circuit, a respective auxiliary pixel driving circuit, a respective main light emitting element, and a respective auxiliary light emitting element in some embodiments according to the present disclosure.

FIG. 21 is a circuit diagram illustrating the structure of a respective main pixel driving circuit, a respective auxiliary pixel driving circuit, a respective main light emitting element, and a respective auxiliary light emitting element in some embodiments according to the present disclosure. Various appropriate pixel driving circuits may be used in the present light emitting substrate. Examples of appropriate driving circuits for the respective main pixel driving circuit and the respective auxiliary pixel driving circuit include 3TIC, 2TIC, 4TIC, 4T2C, 5T2C, 6TIC, 7TIC, 7T2C, 8TIC, and 8T2C. In one example, the respective auxiliary pixel driving circuit has a simpler circuit structure as compared to the respective main pixel driving circuit. In another example, the respective main pixel driving circuit has a total number of transistors greater than the respective auxiliary pixel driving circuit.

Referring to FIG. 21, in one example, the respective main pixel driving circuit rmp is a 3TIC driving circuit. In some embodiments, the respective main pixel driving circuit rmp includes a first storage capacitor Cst comprising a first capacitor electrode Ce1 and a second capacitor electrode Ce2; a first driving transistor Td having a gate electrode coupled to the first capacitor electrode Ce1 of the first storage capacitor Cst, a source electrode coupled to a power supply voltage signal line Vdd; a first transistor T1 having a gate electrode coupled to a respective gate line Gate(n) and configured to receive a first control signal from the respective gate line Gate(n), a source electrode coupled to a respective first data line DL1 and configured to receive a first data signal from the respective first data line DL1, and a drain electrode coupled to the first capacitor electrode Ce1 of the first storage capacitor Cst; a second transistor T2 having a gate electrode coupled to a detection control gate line Gate_d, a source electrode coupled to the second capacitor electrode Ce2 of the first storage capacitor Cst and the drain electrode of the driving transistor Td, and a drain electrode coupled to a voltage detection unit configured to detect a threshold voltage of the driving transistor Td. In some embodiments, the respective auxiliary pixel driving circuit rap includes a second storage capacitor Cst' comprising a first capacitor electrode Ce1' and a second capacitor electrode Ce2'; a second driving transistor Td' having a gate electrode coupled to the first capacitor electrode Ce1' of the second storage capacitor Cst', a source electrode coupled to a power supply voltage signal line Vdd; a third transistor T3 having a gate electrode coupled to the respective gate line Gate(n) and configured to receive a first control signal from the respective gate line Gate(n), a source electrode coupled to a respective second data line DL2 and configured to receive a second data signal from the respective second data line DL2, and a drain electrode coupled to the first capacitor electrode Ce1' of the second storage capacitor Cst'.

In the light emitting substrate illustrated in FIG. 21, the respective main pixel driving circuit rmp and the respective auxiliary pixel driving circuit rap are configured to be provided with respective data signals separately and independently from two distinct data lines, the respective first data line DL1 and the respective second data line DL2. In order to accommodate the auxiliary light emitting elements and auxiliary pixel driving circuits, a total number of data lines required in the light emitting substrate increases. Accordingly, a greater number of source integrated circuits is required, and it is more complicated to fabricate the light emitting substrate.

Figure 22A:
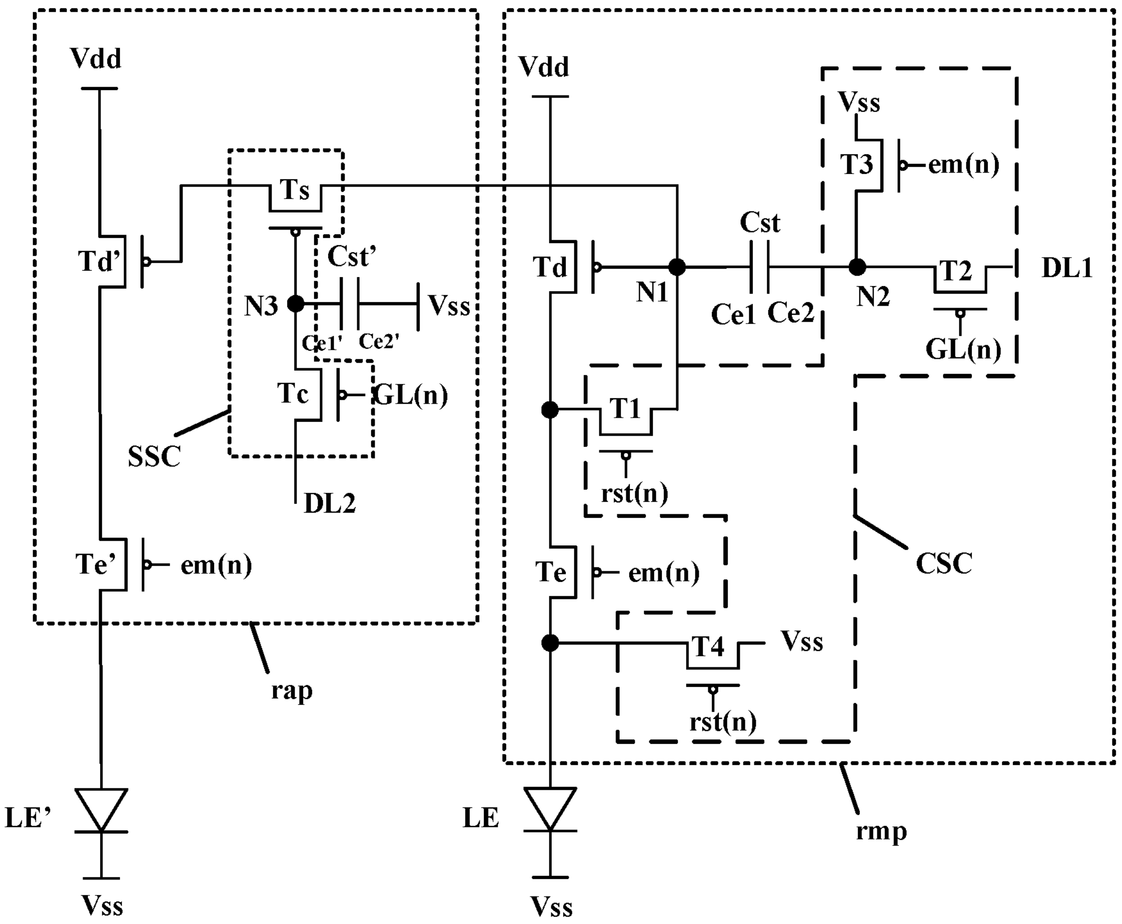
FIG. 22A is a circuit diagram illustrating the structure of a respective main pixel driving circuit, a respective auxiliary pixel driving circuit, a respective main light emitting element, and a respective auxiliary light emitting element in some embodiments according to the present disclosure.

FIG. 22A is a circuit diagram illustrating the structure of a respective main pixel driving circuit, a respective auxiliary pixel driving circuit, a respective main light emitting element, and a respective auxiliary light emitting element in some embodiments according to the present disclosure. Referring to FIG. 22A, in one example, the respective main pixel driving circuit rmp is a 6TIC driving circuit. In some embodiments, the respective main pixel driving circuit rmp includes a first storage capacitor Cst comprising a first capacitor electrode Ce1 and a second capacitor electrode Ce2; a first driving transistor Td having a gate electrode coupled to the first capacitor electrode Ce1, a source electrode coupled to a power supply voltage signal line Vdd; a first transistor T1 having a gate electrode coupled to a reset control signal line rst(n), a source electrode coupled to a drain electrode of the first driving transistor Td, and a drain electrode coupled to the gate electrode of the first driving transistor Td and the first capacitor electrode Ce1; a second transistor T2 having a gate electrode coupled to a gate line GL(n), a source electrode coupled to a respective first data line DL1, and a drain electrode coupled to the second capacitor electrode Ce2; a third transistor T3 having a gate electrode coupled to a light emission control signal line em(n), a source electrode coupled to a constant voltage supply line Vss, and a drain electrode coupled to the second capacitor electrode Ce2 and the drain electrode of the second transistor T2; a fourth transistor T4 having a gate electrode coupled to a reset control signal line rst(n), a source electrode coupled to the constant voltage supply line Vss, and a drain electrode coupled to an anode of a respective main light emitting element LE of the n1 number of main light emitting elements; and a first light emission control transistor Te having a gate electrode coupled to the light emission control signal line em(n), a source electrode coupled to the drain electrode of the first driving transistor Td and the source electrode of the first transistor T1, and a drain electrode coupled to the anode of the respective main light emitting element LE and the drain electrode of the fourth transistor T4.

Referring to FIG. 22A, in one example, the respective auxiliary pixel driving circuit rap is a 4TIC driving circuit. In some embodiments, the respective auxiliary pixel driving circuit rap includes a second driving transistor Td' having a source electrode coupled to a power supply voltage signal line Vdd; a second light emission control transistor Te' having a gate electrode coupled to a light emission control signal line em(n), a source electrode coupled to a drain electrode of the second driving transistor Td', and a drain electrode coupled to the anode of a respective auxiliary light emitting element LE' of the n2 number of auxiliary light emitting elements; a switching transistor Ts having a source electrode coupled to a first driving transistor Td of the respective main pixel driving circuit rmp and a first capacitor electrode Ce1 of a first storage capacitor Cst of the respective main pixel driving circuit rmp, and a drain electrode coupled to a gate electrode of the second driving transistor Td' of the respective auxiliary pixel driving circuit rap; a control transistor Tc having a gate electrode coupled to a gate line GL(n), a source electrode coupled to a respective second data line DL2, and a drain electrode coupled to a gate electrode of the switching transistor Ts; a second storage capacitor Cst' having a first capacitor electrode Ce1' coupled to the gate electrode of the switching transistor Ts and the drain electrode of the control transistor Tc, and a second capacitor electrode Ce2' coupled to a constant voltage supply line Vss.

In the light emitting substrate illustrated in FIG. 22A, the respective main pixel driving circuit rmp and the respective auxiliary pixel driving circuit rap are configured to be provided with respective data signals separately and independently from two distinct data lines, the respective first data line DL1 and the respective second data line DL2. In order to accommodate the auxiliary light emitting elements and auxiliary pixel driving circuits, a total number of data lines required in the light emitting substrate increases. Accordingly, a greater number of source integrated circuits is required, and it is more complicated to fabricate the light emitting substrate.

The inventors of the present disclosure discover that the scan circuit depicted in the present disclosure may be used for driving light emission in the light emitting substrate having main light emitting elements and auxiliary light emitting elements, without the need of increasing the total number of data lines in the light emitting substrate.

Figure 22B:
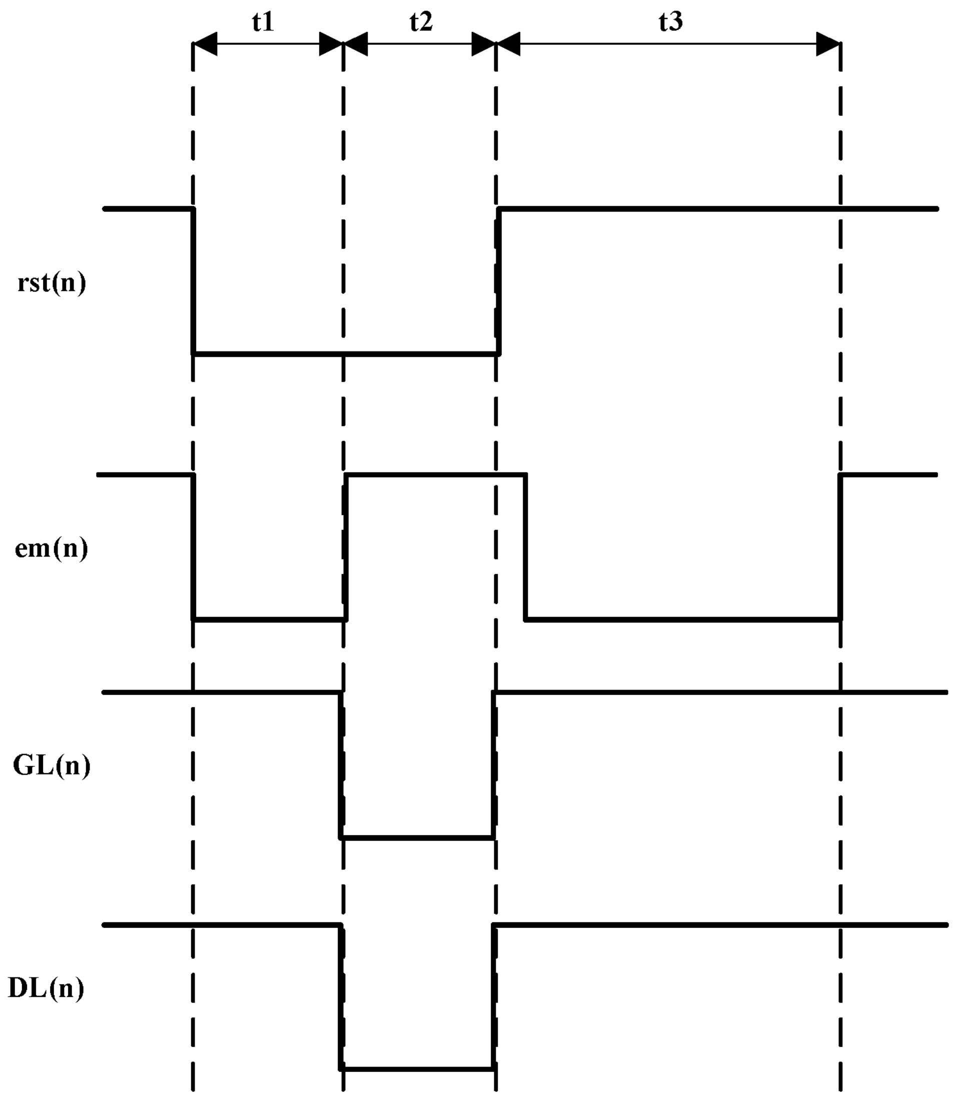
FIG. 22B is a timing diagram of operating a light emitting substrate in some embodiments according to the present disclosure.

FIG. 22B is a timing diagram of operating a light emitting substrate in some embodiments according to the present disclosure. Referring to FIG. 22B, an image display phase with respect to the respective subpixel in some embodiments includes a first sub-phase t1 and a second sub-phase t2. In the first sub-phase t1, the reset control signal line rst(n) is configured to provide a low voltage signal to the gate electrodes of the first transistor T1 and the fourth transistor T4 in the respective main pixel driving circuit, thereby turning on the first transistor T1 and the fourth transistor T4. The light emission control signal line em(n) is configured to provide a low voltage signal to the gate electrodes of the third transistor T3 and the first light emission control transistor Te in the respective main pixel driving circuit, thereby turning on the third transistor T3 and the first light emission control transistor Te. The light emission control signal line em(n) is configured to provide the same low voltage signal to the gate electrode of the second light emission control transistor Te' in the respective auxiliary pixel driving circuit, thereby turning on the second light emission control transistor Te' in the respective auxiliary pixel driving circuit rap. In the first sub-phase t1, the switching transistor Ts in the respective auxiliary pixel driving circuit rap is turned off. The voltage level at the N1 node and at the N2 node are reset to a low voltage level of the constant voltage supply line Vss.

In the second sub-phase t2, the reset control signal line rst(n) is configured to provide a low voltage signal to the gate electrodes of the first transistor T1 and the fourth transistor T4 in the respective main pixel driving circuit, thereby turning on the first transistor T1 and the fourth transistor T4. The light emission control signal line em(n) is configured to provide a high voltage signal to the gate electrodes of the third transistor T3 and the first light emission control transistor Te in the respective main pixel driving circuit rmp, thereby turning off the third transistor T3 and the first light emission control transistor Te. The light emission control signal line em(n) is configured to provide the same high voltage signal to the gate electrode of the second light emission control transistor Te' in the respective auxiliary pixel driving circuit, thereby turning off the second light emission control transistor Te' in the respective auxiliary pixel driving circuit rap. The gate line GL(n) is configured to provide a low voltage signal to the gate electrode of the second transistor T2 in the respective main pixel driving circuit rmp, thereby turning on the second transistor T2 in the respective main pixel driving circuit rmp. The gate line GL(n) is configured to provide a same low voltage signal to the gate electrode of the control transistor Tc in the respective auxiliary pixel driving circuit rap, thereby turning on the control transistor Tc in the respective auxiliary pixel driving circuit rap. In the second sub-phase t2, the third transistor T3 in the respective main pixel driving circuit rmp is turned off. The first transistor T1 and the second transistor T2 in the respective main pixel driving circuit rmp are turned on. The first light emission control transistor Te in the respective main pixel driving circuit rmp is turned off. The N1 node charges the gate electrode of the first driving transistor Td until the voltage level at the gate electrode of the first driving transistor Td reaches a level of the power supply voltage signal line Vdd plus a threshold voltage of the first driving transistor Td. The N2 node is charged to a level of the data line DL(n). The control transistor Tc in the respective auxiliary pixel driving circuit rap is turned on, the N3 node is charged to a level of the control signal line CSL. The control signal line CSL is configured to provide either a high voltage signal (VGH) or a low voltage signal (VGL).

In the third sub-phase t3, the light emission control signal line em(n) is configured to provide a low voltage signal to the gate electrodes of the third transistor T3 and the first light emission control transistor Te in the respective main pixel driving circuit rmp, thereby turning on the third transistor T3 and the first light emission control transistor Te. The light emission control signal line em(n) is configured to provide the same low voltage signal to the gate electrode of the second light emission control transistor Te' in the respective auxiliary pixel driving circuit, thereby turning on the second light emission control transistor Te' in the respective auxiliary pixel driving circuit rap. The gate line GL(n) is configured to provide a high voltage signal to the gate electrode of the second transistor T2 in the respective main pixel driving circuit rmp, thereby turning off the second transistor T2 in the respective main pixel driving circuit rmp. The gate line GL(n) is configured to provide a same high voltage signal to the gate electrode of the control transistor Tc in the respective auxiliary pixel driving circuit rap, thereby turning off the control transistor Tc in the respective auxiliary pixel driving circuit rap. The reset control signal line rst(n) is configured to provide a high voltage signal to the gate electrodes of the first transistor T1 and the fourth transistor T4 in the respective main pixel driving circuit, thereby turning off the first transistor T1 and the fourth transistor T4. The voltage level at the N2 node changes from the level of the data line DL(n) to the level of the constant voltage supply line Vss. The voltage level at the N1 node changes from Vdd+Vth (the level of the power supply voltage signal line Vdd plus the threshold voltage of the first driving transistor Td) to Vdd+Vth+Vss−DL(n) (a level of the power supply voltage signal line Vdd plus the threshold voltage of the first driving transistor Td, plus the level of the constant voltage supply line Vss, minus the level of the data line DL(n)).

If, in the second sub-phase t2, the control signal line CSL is configured to provide the high voltage signal (VGH), the switching transistor Ts is turned off in the third sub-phase t3, and the respective auxiliary light emitting element LE' does not emit light in the third sub-phase t3.

If, in the second sub-phase t2, the control signal line CSL is configured to provide the low voltage signal (VGL), the switching transistor Ts is turned on in the third sub-phase t3. The gate electrode of the second driving transistor Td' in the respective auxiliary pixel driving circuit rap is charged to a same voltage level at the N1 node, e.g., to Vdd+Vth+Vss−DL(n) (the level of the power supply voltage signal line Vdd plus the threshold voltage of the first driving transistor Td, plus the level of the constant voltage supply line Vss, minus the level of the data line DL(n)). Because the second light emission control transistor Te' in the respective auxiliary pixel driving circuit rap is turned on in the third sub-phase t3, the respective auxiliary light emitting element LE' emits light in the third sub-phase t3.

In some embodiments, the respective main pixel driving circuit rmp includes a compensation subcircuit CSC. Optionally, the compensation subcircuit CSC includes a first transistor T1 having a gate electrode coupled to a reset control signal line rst(n), a source electrode coupled to a drain electrode of the first driving transistor Td, and a drain electrode coupled to the gate electrode of the first driving transistor Td and the first capacitor electrode Ce1 of the storage capacitor Cst; a second transistor T2 having a gate electrode coupled to a gate line GL(n), a source electrode coupled to a data line DL(n), and a drain electrode coupled to the second capacitor electrode Ce2 of the storage capacitor Cst; a third transistor T3 having a gate electrode coupled to a light emission control signal line em(n), a source electrode coupled to a constant voltage supply line Vss, and a drain electrode coupled to the second capacitor electrode Ce2 of the storage capacitor Cst and the drain electrode of the second transistor T2; and a fourth transistor T4 having a gate electrode coupled to a reset control signal line rst(n), a source electrode coupled to the constant voltage supply line Vss, and a drain electrode coupled to an anode of a respective main light emitting element LE of the n1 number of main light emitting elements.

In some embodiments, the respective auxiliary pixel driving circuit rap shares the compensation subcircuit CSC with the respective main pixel driving circuit rmp. In some embodiments, threshold voltage levels of the first driving transistor Td and the second driving transistor Td' are substantially the same. Optionally, a ratio of a channel width to a channel length of the active layer in the first driving transistor Td and a ratio of a channel width to a channel length of the active layer in the second driving transistor Td' are substantially the same. In one example, the first driving transistor Td and the second driving transistor Td' are fabricated in the light emitting substrate so that they are proximal to each other, to ensure their threshold voltage levels are substantially the same. As used herein, the term "substantially the same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

In some embodiments, the respective auxiliary pixel driving circuit rap includes a selection subcircuit SSC. Optionally, the selection subcircuit SSC includes a switching transistor Ts having a source electrode coupled to a first driving transistor Td of the respective main pixel driving circuit rmp and a first capacitor electrode Ce1 of a first storage capacitor Cst of the respective main pixel driving circuit rmp, and a drain electrode coupled to a gate electrode of the second driving transistor Td' of the respective auxiliary pixel driving circuit rap; and a control transistor Tc having a gate electrode coupled to a gate line GL(n), a source electrode coupled to a control signal line CSL, and a drain electrode coupled to a gate electrode of the switching transistor Ts.

Referring to FIG. 22A, gate electrodes of the second driving transistor Td' in the respective auxiliary pixel driving circuit rap and the first driving transistor Td in the respective main pixel driving circuit rmp are commonly coupled to the N1 node. As discussed above, when the control signal line CSL is configured to provide a turning-on voltage in the second sub-phase t2, the gate electrode of the second driving transistor Td' in the respective auxiliary pixel driving circuit rap is charged to a same voltage level at the N1 node, and the respective auxiliary light emitting element LE' emits light in the third sub-phase t3. Accordingly, the display method in some embodiments includes providing a same voltage signal to a gate electrode of a second driving transistor Td' in the respective auxiliary pixel driving circuit and to a gate electrode of a first driving transistor Td in the respective main pixel driving circuit, thereby driving light emission in the respective auxiliary light emitting element and in the respective main light emitting element.

In some embodiments, the display method includes providing a control signal to the respective auxiliary pixel driving circuit to control transmission of the same voltage signal to the gate electrode of the second driving transistor Td' in the respective auxiliary pixel driving circuit. Optionally, when the control signal is a turning-on signal, the same voltage signal is transmitted to the gate electrode of the second driving transistor in the respective auxiliary pixel driving circuit, thereby turning on the second driving transistor. The respective auxiliary light emitting element LE' emits light. Optionally, the control signal is a turning-off signal, the gate electrode of the second driving transistor in the respective auxiliary pixel driving circuit is configured not to receive the same voltage signal, and the second driving transistor is turned off. The respective auxiliary light emitting element LE' does not emit light.

Referring to FIG. 22A, the data signal for the respective subpixel is provided only to the respective main pixel driving circuit rmp, but not to the respective auxiliary pixel driving circuit rap. Specifically, the data signal for the respective subpixel is provided to the source electrode of the second transistor T2 in the respective main pixel driving circuit rmp. In some embodiments, the display method includes providing a data signal to the respective main pixel driving circuit rmp configured to drive light emission in the respective main light emitting element LE, without providing the data signal to the respective auxiliary pixel driving circuit rap configured to drive light emission in the respective auxiliary light emitting element LE'.

In some embodiments, the display method includes providing a same light emission control signal to a light emission control transistor in the respective main pixel driving circuit and the respective auxiliary pixel driving circuit. As shown in FIG. 22A, the same light emission control signal is provided, in phase, to the first light emission control transistor Te in the respective main pixel driving circuit rmp, and to the second light emission control transistor Te' in the respective auxiliary pixel driving circuit rap.

In some embodiments, the display method includes providing a same gate scanning signal, in phase, to a data write transistor (e.g., the second transistor T2) in the respective main pixel driving circuit rmp and to a control transistor Tc in the respective auxiliary pixel driving circuit rap.

Figure 23:
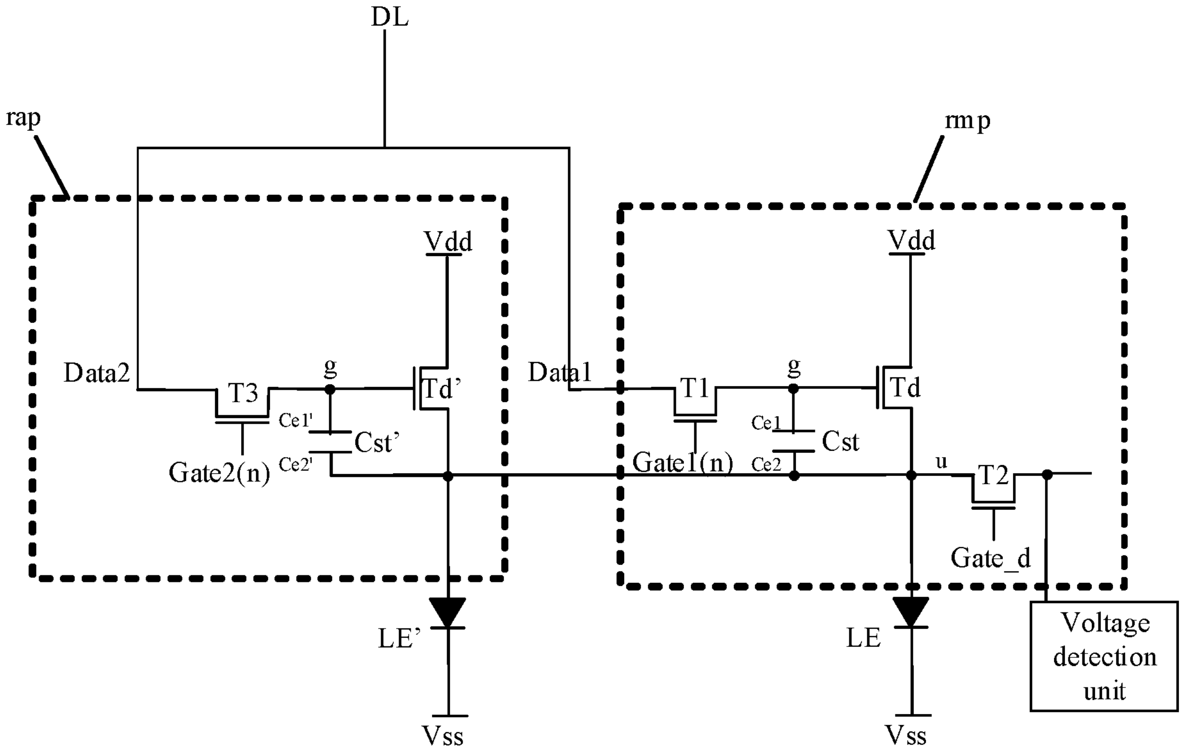
FIG. 23 is a circuit diagram illustrating the structure of a respective main pixel driving circuit, a respective auxiliary pixel driving circuit, a respective main light emitting element, and a respective auxiliary light emitting element in some embodiments according to the present disclosure.

FIG. 23 is a circuit diagram illustrating the structure of a respective main pixel driving circuit, a respective auxiliary pixel driving circuit, a respective main light emitting element, and a respective auxiliary light emitting element in some embodiments according to the present disclosure. Referring to FIG. 23, in one example, the respective main pixel driving circuit rmp is a 3TIC driving circuit. In some embodiments, the respective main pixel driving circuit rmp includes a first storage capacitor Cst comprising a first capacitor electrode Ce1 and a second capacitor electrode Ce2; a first driving transistor Td having a gate electrode coupled to the first capacitor electrode Ce1 of the first storage capacitor Cst, a source electrode coupled to a power supply voltage signal line Vdd; a first transistor T1 having a gate electrode coupled to a respective first gate line Gate1(*n*) and configured to receive a first control signal from the respective first gate line Gate1(*n*), a source electrode coupled to a respective data line DL and configured to receive a first data signal Data1 from the respective data line DL, and a drain electrode coupled to the first capacitor electrode Ce1 of the first storage capacitor Cst; a second transistor T2 having a gate electrode coupled to a detection control gate line Gate_d, a source electrode coupled to the second capacitor electrode Ce2 of the first storage capacitor Cst and the drain electrode of the driving transistor Td, and a drain electrode coupled to a voltage detection unit configured to detect a threshold voltage of the driving transistor Td. In some embodiments, the respective auxiliary pixel driving circuit rap includes a second storage capacitor Cst' comprising a first capacitor electrode Ce1' and a second capacitor electrode Ce2'; a second driving transistor Td' having a gate electrode coupled to the first capacitor electrode Ce1' of the second storage capacitor Cst', a source electrode coupled to a power supply voltage signal line Vdd; a third transistor T3 having a gate electrode coupled to a respective second gate line Gate2(*n*) and configured to receive a second control signal from the respective second gate line Gate2(*n*), a source electrode coupled to a respective data line DL and configured to receive a second data signal Data2 from the respective data line DL, and a drain electrode coupled to the first capacitor electrode Ce1' of the second storage capacitor Cst'.

In the light emitting substrate illustrated in FIG. 23, the respective main pixel driving circuit rmp and the respective auxiliary pixel driving circuit rap are configured to be provided with respective data signals (the first data signal Data1 and the second data signal Data2) from a same data line configured to transmit the first data signal Data1 and the second data signal Data2 in a time-division manner. A total number of data lines in the light emitting substrate remains the same as that in a light emitting substrate without auxiliary light emitting elements.

The first data signal Data1 and the second data signal Data2 transmitted by a same data line may be respectively written into the respective main pixel driving circuit rmp and the respective auxiliary pixel driving circuit rap by controlling timing of a first control signal and a second control signal transmitted by the respective first gate line Gate1(*n*) and the respective second gate line Gate2(*n*), respectively.

Figure 24:
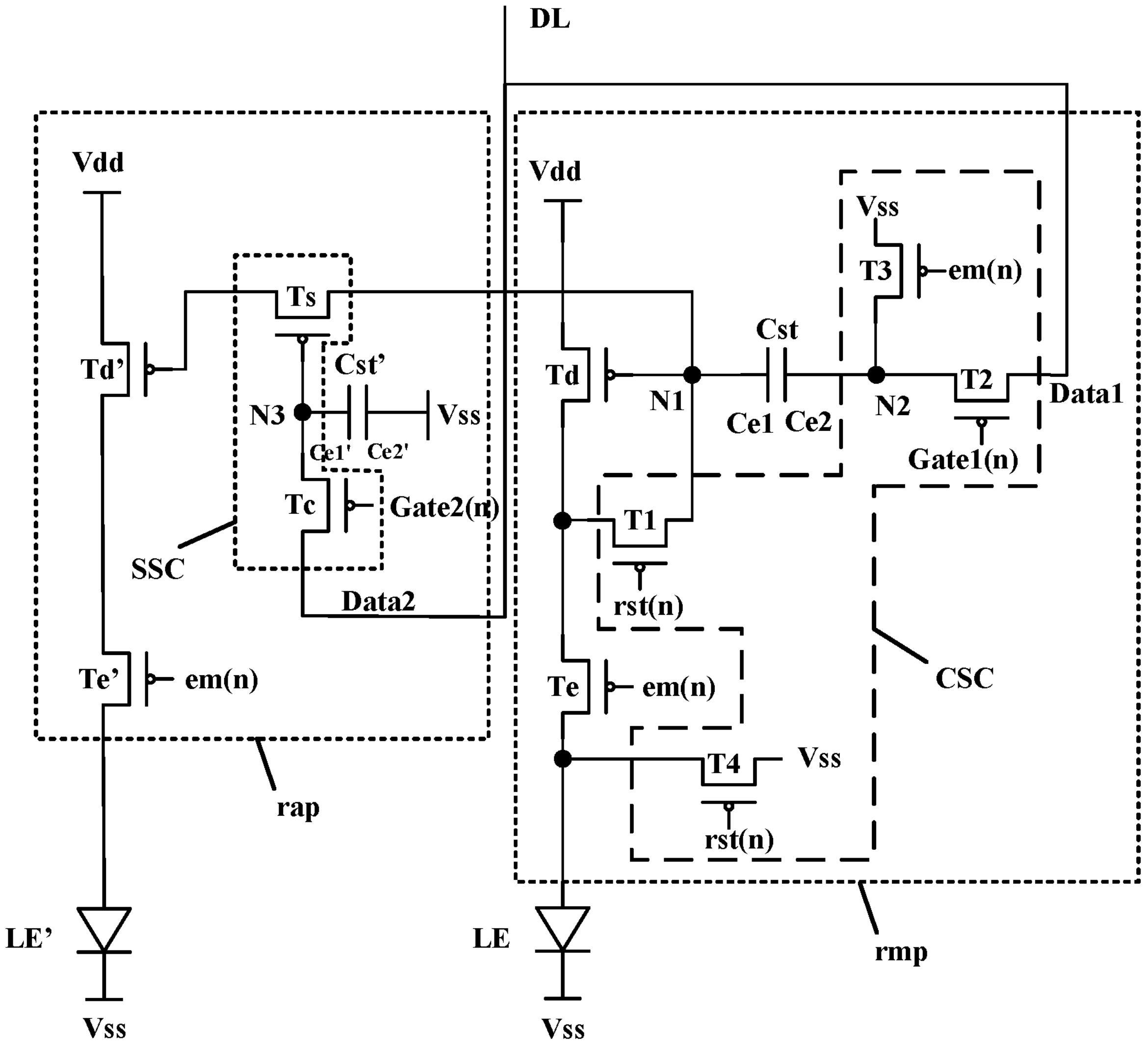
FIG. 24 is a circuit diagram illustrating the structure of a respective main pixel driving circuit, a respective auxiliary pixel driving circuit, a respective main light emitting element, and a respective auxiliary light emitting element in some embodiments according to the present disclosure.

FIG. 24 is a circuit diagram illustrating the structure of a respective main pixel driving circuit, a respective auxiliary pixel driving circuit, a respective main light emitting element, and a respective auxiliary light emitting element in some embodiments according to the present disclosure. Referring to FIG. 24, in one example, the respective main pixel driving circuit rmp is a 6TIC driving circuit. In some embodiments, the respective main pixel driving circuit rmp includes a first storage capacitor Cst comprising a first capacitor electrode Ce1 and a second capacitor electrode Ce2; a first driving transistor Td having a gate electrode coupled to the first capacitor electrode Ce1, a source electrode coupled to a power supply voltage signal line Vdd; a first transistor T1 having a gate electrode coupled to a reset control signal line rst(n), a source electrode coupled to a drain electrode of the first driving transistor Td, and a drain electrode coupled to the gate electrode of the first driving transistor Td and the first capacitor electrode Ce1; a second transistor T2 having a gate electrode coupled to a respective first gate line Gatel(n), a source electrode coupled to a respective data line DL, and a drain electrode coupled to the second capacitor electrode Ce2; a third transistor T3 having a gate electrode coupled to a light emission control signal line em(n), a source electrode coupled to a constant voltage supply line Vss, and a drain electrode coupled to the second capacitor electrode Ce2 and the drain electrode of the second transistor T2; a fourth transistor T4 having a gate electrode coupled to a reset control signal line rst(n), a source electrode coupled to the constant voltage supply line Vss, and a drain electrode coupled to an anode of a respective main light emitting element LE of the n1 number of main light emitting elements; and a first light emission control transistor Te having a gate electrode coupled to the light emission control signal line em(n), a source electrode coupled to the drain electrode of the first driving transistor Td and the source electrode of the first transistor T1, and a drain electrode coupled to the anode of the respective main light emitting element LE and the drain electrode of the fourth transistor T4.

Referring to FIG. 24, in one example, the respective auxiliary pixel driving circuit rap is a 4TIC driving circuit. In some embodiments, the respective auxiliary pixel driving circuit rap includes a second driving transistor Td' having a source electrode coupled to a power supply voltage signal line Vdd; a second light emission control transistor Te' having a gate electrode coupled to a light emission control signal line em(n), a source electrode coupled to a drain electrode of the second driving transistor Td', and a drain electrode coupled to the anode of a respective auxiliary light emitting element LE' of the n2 number of auxiliary light emitting elements; a switching transistor Ts having a source electrode coupled to a first driving transistor Td of the respective main pixel driving circuit rmp and a first capacitor electrode Ce1 of a first storage capacitor Cst of the respective main pixel driving circuit rmp, and a drain electrode coupled to a gate electrode of the second driving transistor Td' of the respective auxiliary pixel driving circuit rap; a control transistor Tc having a gate electrode coupled to a respective second gate line Gate2(*n*), a source electrode coupled to a respective second data line DL2, and a drain electrode coupled to a gate electrode of the switching transistor Ts; a second storage capacitor Cst' having a first capacitor electrode Ce1' coupled to the gate electrode of the switching transistor Ts and the drain electrode of the control transistor Tc, and a second capacitor electrode Ce2' coupled to a constant voltage supply line Vss.

In the light emitting substrate illustrated in FIG. 24, the respective main pixel driving circuit rmp and the respective auxiliary pixel driving circuit rap are configured to be provided with respective data signals (the first data signal Data1 and the second data signal Data2) from a same data line configured to transmit the first data signal Data1 and the second data signal Data2 in a time-division manner. A total number of data lines in the light emitting substrate remains the same as that in a light emitting substrate without auxiliary light emitting elements.

The first data signal Data1 and the second data signal Data2 transmitted by a same data line may be respectively written into the respective main pixel driving circuit rmp and the respective auxiliary pixel driving circuit rap by controlling timing of a first control signal and a second control signal transmitted by the respective first gate line Gate1(*n*) and the respective second gate line Gate2(*n*), respectively.

Referring to FIG. 23, FIG. 24, FIGS. 1 to 14, the first control signal transmitted by the respective first gate line Gate1(*n*) may be the first control signal G1(*n*) output from the scan unit depicted in FIG. 1 to FIG. 14, and the second control signal transmitted by the respective second gate line Gate2(*n*) may be the second control signal G2(*n*) output from the scan unit depicted in FIG. 1 to FIG. 14.

In some embodiments, the scan unit is configured to transmit the first control signal G1(*n*) and the second control signal G2(*n*) to respective main pixel driving circuits and respective auxiliary pixel driving circuits in a row of subpixels. Optionally, the first control signal G1(*n*) and the second control signal G2(*n*) are different from each other. Referring to FIG. 3 and FIG. 7, the first control signal G1(*n*) and the second control signal G2(*n*) are provided in different phases (e.g., in the fifth phase t5 and the seventh phase t7, respectively). Data write transistors (e.g., T1 and T3 in FIG. 23 or T2 and Tc in FIG. 24) are turned on at different timing, thereby providing the first data signal Data1 and the second data signal Data2 to the respective main pixel driving circuit rmp and the respective auxiliary pixel driving circuit rap using a same data line (e.g., the data line DL in FIG. 23 and FIG. 24).

In some embodiments, the scan unit is configured to transmit the first control signal G1(*n*) to the respective first gate line Gatel(n), but does not transmit the second control signal G2(*n*) to the respective second gate line Gate2(*n*). Referring to FIG. 4 and FIG. 8, the first control signal G1(*n*) is provided in the seventh phase t7, and no second control signal is provided. Referring to FIG. 23 and FIG. 24, the data write transistor (e.g., T1 in FIG. 23 or T2 in FIG. 24) in the respective main pixel driving circuit rmp is turned on by the first control signal G1(*n*), but the data write transistor (e.g., T3 in FIG. 23 or Tc in FIG. 24) in the respective auxiliary pixel driving circuit rap remains turned off. The first data signal Data1 is written into the respective main pixel driving circuit rmp, however, no data signal is written into the respective auxiliary pixel driving circuit rap. As a result, only the respective main light emitting element LE emits light, whereas the respective auxiliary light emitting element LE' does not emit light.

In some embodiments, the scan unit is configured to transmit the first control signal G1(*n*) and the second control signal G2(*n*) to respective main pixel driving circuits and respective auxiliary pixel driving circuits in a row of subpixels. Optionally, the first control signal G1(*n*) and the second control signal G2(*n*) are different from each other. Referring to FIG. 5 and FIG. 9, the first control signal G1(*n*) and the second control signal G2(*n*) are provided in a same phase (e.g., in the seventh phase t7). Referring to FIG. 21 and FIG. 22A, the data write transistors in the respective main pixel driving circuit rmp and the respective auxiliary pixel driving circuit rap are coupled to different data lines, e.g., the respective first data line DL1 and the respective second data line DL2. Data write transistors (e.g., T1 and T3 in FIG. 21 or T2 and Tc in FIG. 22A) are turned on at the same timing, thereby providing the first data signal Data1 and the second data signal Data2 simultaneously to the respective main pixel driving circuit rmp and the respective auxiliary pixel driving circuit rap using two different data lines (e.g., the respective first data line DL1 and the respective second data line DL2 in FIG. 21 and FIG. 22A).

In some embodiments, the scan circuit and the light emitting substrate are implemented in a display panel having a plurality of display subareas having at least two different resolutions. The scan circuit described herein may be used for driving light emission in the plurality of display subareas. Optionally, in a display subarea having a higher resolution, the first control signal G1(*n*) and the second control signal G2(*n*) are provided to two rows of subpixels in the high-resolution display subarea. Optionally, in a display subarea having a low resolution, the first control signal G1(*n*) is provided to one of two rows of subpixels in the low-resolution display subarea. The other row of the subpixels in the low-resolution display subarea is not provided with the second control signal G2(*n*). In one example, the operation methods depicted in FIG. 3, FIG. 5, FIG. 7, or FIG. 9 may be used in the high-resolution display subarea, and the operation methods depicted in FIG. 4 or FIG. 8 may be used in the low-resolution display subarea.

Figure 25:
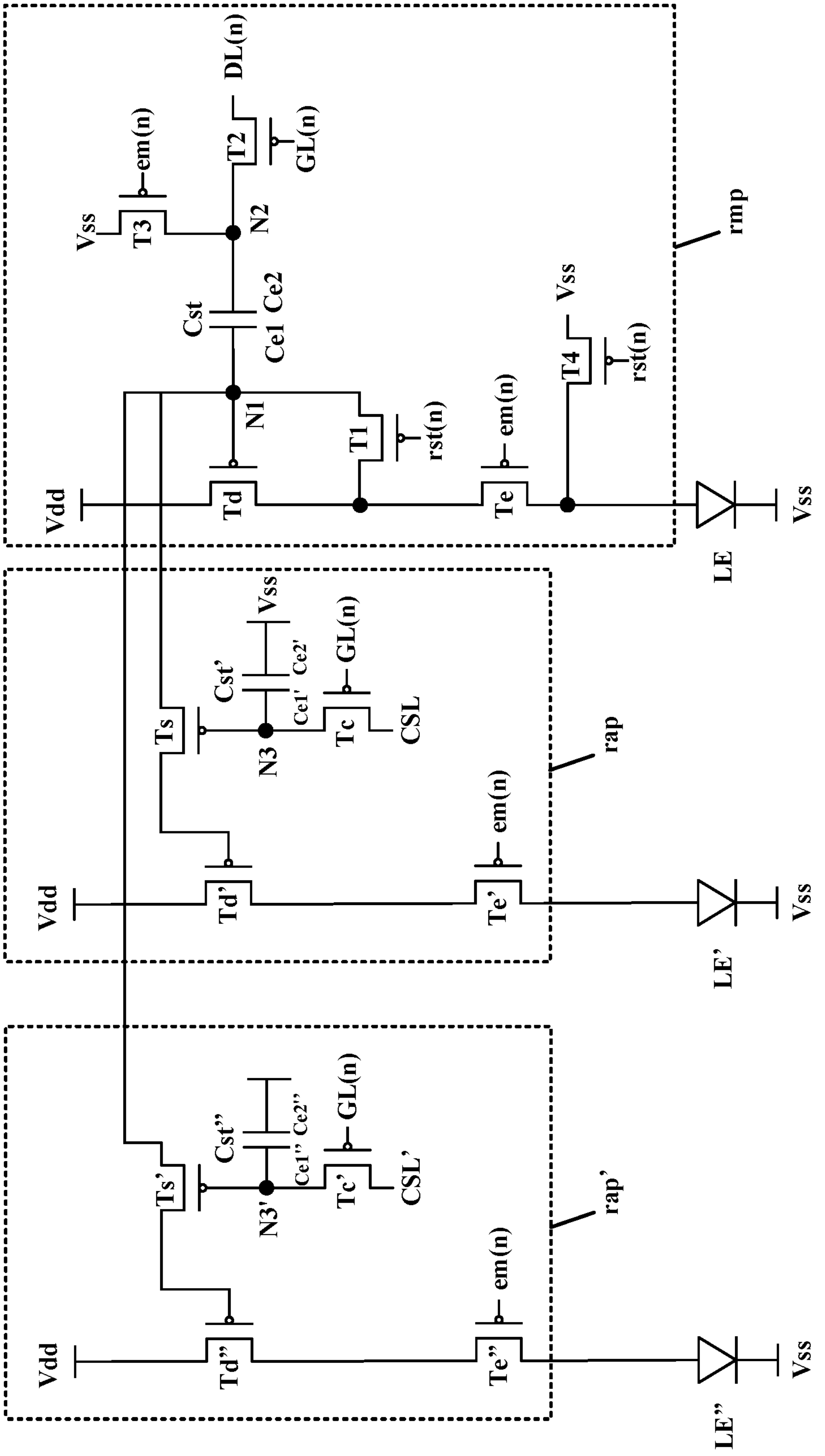
FIG. 25 is a circuit diagram illustrating the structure of a respective main pixel driving circuit, a respective auxiliary pixel driving circuit, a second respective auxiliary pixel driving circuit, a respective main light emitting element, a respective auxiliary light emitting element and a second respective auxiliary light emitting element in some embodiments according to the present disclosure.

FIG. 25 is a circuit diagram illustrating the structure of a respective main pixel driving circuit, a respective auxiliary pixel driving circuit, a second respective auxiliary pixel driving circuit, a respective main light emitting element, a respective auxiliary light emitting element and a second respective auxiliary light emitting element in some embodiments according to the present disclosure. FIG. 25 illustrates an example in which n1=1, and n2=2. The structures of the respective main pixel driving circuit rmp and the respective auxiliary pixel driving circuit rap are the same as those depicted in FIG. 22A. The second respective auxiliary pixel driving circuit rap' is configured to drive light emission in the second respective auxiliary light emitting element LE".

Referring to FIG. 25, in one example, the second respective auxiliary pixel driving circuit rap' is a 4TIC driving circuit. In some embodiments, the second respective auxiliary pixel driving circuit rap' includes a third driving transistor Td" having a source electrode coupled to a power supply voltage signal line Vdd; a third light emission control transistor Te" having a gate electrode coupled to a light emission control signal line em(n), a source electrode coupled to a drain electrode of the third driving transistor Td", and a drain electrode coupled to the anode of a second respective auxiliary light emitting element LE" of the n2 number of auxiliary light emitting elements; a switching transistor Ts' having a source electrode coupled to a first driving transistor Td of the respective main pixel driving circuit rmp and a first capacitor electrode Ce1 of a first storage capacitor Cst of the respective main pixel driving circuit rmp, and a drain electrode coupled to a gate electrode of the third driving transistor Td" of the second respective auxiliary pixel driving circuit rap'; a control transistor Tc' having a gate electrode coupled to a gate line GL(n), a source electrode coupled to a second control signal line CSL', and a drain electrode coupled to a gate electrode of the switching transistor Ts'; a third storage capacitor Cst" having a first capacitor electrode Ce1" coupled to the gate electrode of the switching transistor Ts' and the drain electrode of the control transistor Tc', and a second capacitor electrode Ce2" coupled to a constant voltage supply line Vss.

In some embodiments, a total number of control signal lines configured to transmit signals to the respective subpixel is n2. Light emission in the n2 number of auxiliary light emitting elements can be independently controlled with respect to each individual auxiliary light emitting element. Each of the n2 number of auxiliary light emitting elements can be turned on or off independently, depending on the individual control signal ($CSL_1$, . . . , $CSL_i$, . . . , $CSL_{n2}$, 1≤i≤n2) transmitted to the individual auxiliary pixel driving circuit. When the i-th control signal provided by $CSL_i$ is a turning-on signal, the same voltage signal (Vdd+Vth+Vss−DL(n)) is transmitted to the gate electrode of the driving transistor in the i-th auxiliary pixel driving circuit, thereby turning on the driving transistor in the i-th auxiliary pixel driving circuit. When the i-th control signal provided by $CSL_i$ is a turning-off signal, the gate electrode of the driving transistor in the i-th auxiliary pixel driving circuit is configured not to receive the same voltage signal, and the driving transistor in the i-th auxiliary pixel driving circuit is turned off.

In some embodiments, gate electrodes of second driving transistors in the n2 number of auxiliary pixel driving circuits and gate electrodes of first driving transistors in the n1 number of main pixel driving circuits are commonly coupled to the N1 node. The display method includes providing a same voltage signal (Vdd+Vth+Vss−DL(n)) to the gate electrodes of second driving transistors in the n2 number of auxiliary pixel driving circuits and the gate electrodes of first driving transistors in the n1 number of main pixel driving circuits.

In some embodiments, the data signal for the respective subpixel is provided only to the respective main pixel driving circuit rmp, but not to the n2 number of auxiliary pixel driving circuits. Specifically, the data signal for the respective subpixel is provided to the source electrode of the second transistor T2 in the respective main pixel driving circuit rmp. In some embodiments, the display method includes providing a data signal to the respective main pixel driving circuit rmp configured to drive light emission in the respective main light emitting element LE, without providing the data signal to the n2 number of auxiliary pixel driving circuits configured to drive light emission in the n2 number of auxiliary light emitting elements.

In some embodiments, a same light emission control signal is provided to a first light emission control transistor in the respective main pixel driving circuit and second light emission control transistors in the n2 number of auxiliary pixel driving circuits.

In some embodiments, a same gate scanning signal is provided to a data write transistor in the respective main pixel driving circuit and to control transistors in the n2 number of auxiliary pixel driving circuits.

The n1 number of main light emitting elements and the n2 number of auxiliary light emitting elements may have various appropriate areas. In one example, the n1 number of main light emitting elements and the n2 number of auxiliary light emitting elements have a same uniform area. In another example, a respective one of the n1 number of main light emitting elements has an area greater than a respective one of the n2 number of auxiliary light emitting elements. In another example, a respective one of the n1 number of main light emitting elements has an area smaller than a respective one of the n2 number of auxiliary light emitting elements.

Accordingly, in some embodiments, the display method includes providing a display panel comprising a plurality of subpixels, a respective subpixel of the plurality of subpixels comprising n1 number of main light emitting areas and n2 number of auxiliary light emitting areas, n1≥1, and n2≥1. Optionally, for displaying a first frame of image, controlling light emission of the respective subpixel to be limited in the n1 number of main light emitting areas and m number of the n2 number of auxiliary light emitting areas, 0≤m≤n2. Optionally, for displaying a second frame of image, controlling light emission of the respective subpixel to be limited in the n1 number of main light emitting areas and m' number of the n2 number of auxiliary light emitting areas, 0≤m'≤n2, and m≠m'.

In some embodiments, for displaying the first frame of image in a first mode, the light emission of the respective subpixel is limited in the n1 number of main light emitting areas, m=0. Optionally, for displaying the second frame of image in a second mode, the light emission of the respective subpixel is limited in the n1 number of main light emitting areas and the n2 number of auxiliary light emitting areas, m'=n2.

In some embodiments, in the first mode, at least a portion of the display panel comprising the respective subpixel is configured to display a monochromatic image, or the first frame of image has a high contrast compared to a frame of image in an adjacent subpixel. Optionally, in the second mode, at least a portion of the display panel comprising the respective subpixel is configured to display a color image.

In some embodiments, the display method further includes, for displaying a third frame of image in a third mode, controlling light emission of the respective subpixel to be limited in the n1 number of main light emitting areas and m" number of the n2 number of auxiliary light emitting areas, 1<m"<n2, and m<m"<m'.

In another aspect, the present disclosure further provides a method of operating a display apparatus comprising a light emitting substrate and a scan circuit configured to provide control signals to the light emitting substrate. In some embodiments, the method includes providing at least one of a first clock signal, a second clock signal, a third clock signal, a fourth clock signal, a first reference signal, or a second reference signal to a respective scan unit of the plurality of scan units of the scan circuit; outputting an effective voltage of the first clock signal as a first control signal to the light emitting substrate; and outputting an effective voltage of the third clock signal as a second control signal to the light emitting substrate.

In some embodiments, the first clock signal, the second clock signal, the third clock signal, the fourth clock signal are independent of each other, for example, the first clock signal, the second clock signal, the third clock signal, the fourth clock signal are independently generated, and independently transmitted to the scan circuit through separate signal lines. Optionally, at least two of the first clock signal, the second clock signal, the third clock signal, the fourth clock signal are different signals. Optionally, all four of the first clock signal, the second clock signal, the third clock signal, the fourth clock signal are different signals.

In some embodiments, the first control signal and the second control signal are independent of each other, for example, the first control signal and the second control signal are independently generated, and independently transmitted to the scan circuit through separate signal lines. Optionally, the first control signal and the second control signal are different signals.

In some embodiments, outputting the first control signal and outputting the second control signal include providing the first clock signal to a source electrode of the twelfth transistor; providing the third clock signal to a source electrode of the fourteenth transistor; and coupling gate electrodes of the twelfth transistor and the fourth transistor to a first node.

In some embodiments, the first control signal and the second control signal are out of phase with respect to each other. Optionally, the light emitting substrate includes a plurality of subpixels. A respective subpixel of the plurality of subpixels includes at least a main light emitting element driven by a main pixel driving circuit and at least an auxiliary light emitting element driven by an auxiliary pixel driving circuit. Optionally, the method further includes providing the first control signal to the main pixel driving circuit; providing the second control signal to the auxiliary pixel driving circuit; providing a first data signal to the main pixel driving circuit; and providing a second data signal to the auxiliary pixel driving circuit. Optionally, the first data signal and the second data signal are provided using a single data line connecting a source integrated circuit and the light emitting substrate. In one example, at least a portion of the data line transmitting the first data signal and the second data signal together is a data line extending at least partially in a display region. In another example, n1 number of first data signals for the n1 number of main pixel driving circuits and n2 number of second data signals for the n2 number of auxiliary pixel driving circuits are provided using a single data line connecting a source integrated circuit and the light emitting substrate. In another example, at least a portion of the data line transmitting the n1 number of first data signals for the n1 number of main pixel driving circuits and the n2 number of second data signals for the n2 number of auxiliary pixel driving circuits together is a data line extending at least partially in a display region.

In some embodiments, the method further includes adjusting the third clock signal to have a constant ineffective voltage level; and outputting an ineffective voltage of the third clock signal to the light emitting substrate.

In some embodiments, the light emitting substrate includes a plurality of subpixels. A respective subpixel of the plurality of subpixels includes at least a main light emitting element driven by a main pixel driving circuit and at least an auxiliary light emitting element driven by an auxiliary pixel driving circuit. Optionally, the method further includes providing the first control signal to the main pixel driving circuit; and providing the ineffective voltage of the third clock signal to the auxiliary pixel driving circuit.

In some embodiments, the first control signal and the second control signal are in phase with respect to each other.

In some embodiments, the method includes providing control signals to a high-resolution subarea of the light emitting substrate; and providing control signals to a low-resolution subarea of the light emitting substrate.

In some embodiments, providing control signals to the high-resolution subarea of the light emitting substrate includes outputting the effective voltage of the first clock signal as the first control signal to a first adjacent row of subpixels in the high-resolution subarea; and outputting the effective voltage of the third clock signal as the second control signal to a second adjacent row of subpixels in the high-resolution subarea. Optionally, the first control signal output to the first adjacent row of subpixels in the high-resolution subarea and the second control signal output to the second adjacent row of subpixels in the high-resolution subarea are out of phase with respect to each other. Optionally, the first control signal output to the first adjacent row of subpixels in the high-resolution subarea and the second control signal output to the second adjacent row of subpixels in the high-resolution subarea are in phase with respect to each other.

In some embodiments, providing control signals to the low-resolution subarea of the light emitting substrate includes outputting the effective voltage of the first clock signal as the first control signal to a third adjacent row of subpixels in the low-resolution subarea; adjusting the third clock signal to have a constant ineffective voltage level; and outputting an ineffective voltage of the third clock signal to a fourth adjacent row of subpixels in the low-resolution subarea.

In another aspect, the present disclosure provides a light emitting substate having a plurality of subpixels. In some embodiments, a respective subpixel of the plurality of subpixels includes n1 number of main light emitting elements; n1 number of main pixel driving circuits configured to drive light emission in the n1 number of main light emitting elements; n2 number of auxiliary light emitting elements; and n2 number of auxiliary pixel driving circuits configured to drive light emission in the n2 number of auxiliary light emitting elements. Optionally, n1≥1, and n2≥1. Optionally, n1=1, and n2=1. Optionally, a respective main pixel driving circuit of the n1 number of main pixel driving circuits comprises a first storage capacitor, a first driving transistor, a first light emission control transistor, and a compensation subcircuit. Optionally, a respective auxiliary pixel driving circuit of the n2 number of auxiliary pixel driving circuits comprises a second storage capacitor, a second driving transistor, a second light emission control transistor, and a selection subcircuit. Optionally, threshold voltage levels of the first driving transistor and the second driving transistor are substantially the same.

Referring to FIG. 22A, in some embodiments, a gate electrode of a second driving transistor Td' in a respective auxiliary pixel driving circuit rap of the n2 number of auxiliary pixel driving circuits and a gate electrode of a first driving transistor Td in a respective main pixel driving circuit rmp of the n1 number of main pixel driving circuits are coupled to a same node (the N1 node). Optionally, gate electrodes of first driving transistors in the n1 number of main pixel driving circuits and gate electrodes of second driving transistors in the n2 number of auxiliary pixel driving circuits are commonly coupled to the same node. In some embodiments, the respective main pixel driving circuit includes a first storage capacitor Cst comprising a first capacitor electrode Ce1 coupled to the same node.

In some embodiments, a gate electrode of the first driving transistor Td and a first capacitor electrode Ce1 of the first storage capacitor Cst are connected to a first node N1. Optionally, a gate electrode of the second driving transistor Td' and a first capacitor electrode Ce1' of the second storage capacitor Cst' are connected to the first node N1 through the switching transistor Ts.

In some embodiments, the respective auxiliary pixel driving circuit rap includes a switching transistor Ts coupled to the gate electrode of the second driving transistor Td' of the respective auxiliary pixel driving circuit rap, and coupled to the same node (the N1 node). Optionally, the switching transistor Ts is configured to control the gate electrode of the second driving transistor Td' of the respective auxiliary pixel driving circuit rap to electrically connect with, or disconnect from, the same node.

In some embodiments, the respective auxiliary pixel driving circuit rap includes a control transistor Tc coupled to the switching transistor Ts of the respective auxiliary pixel driving circuit rap. A source electrode of the control transistor Tc of the respective auxiliary pixel driving circuit rap is coupled to a control signal line CSL. A drain electrode of the control transistor Tc of the respective auxiliary pixel driving circuit rap is coupled to the gate electrode of the switching transistor Ts of the respective auxiliary pixel driving circuit rap. A gate electrode of the control transistor Tc of the respective auxiliary pixel driving circuit rap is coupled to a gate line GL(n). The gate electrode of the control transistor Tc of the respective auxiliary pixel driving circuit rap is provided with a same gate scanning signal provided to a data write transistor (e.g., T2) in the respective main pixel driving circuit rmp.

In some embodiments, the control signal line CSL is configured to provide a control signal. When the control signal is a turning-on signal, the switching transistor Ts is turned on to allow the gate electrode of the second driving transistor Td' in the respective auxiliary pixel driving circuit rap and the gate electrode of the first driving transistor Td in the respective main pixel driving circuit rmp receive a same voltage signal at the same node. When the control signal is a turning-off signal, the switching transistor Ts is turned off to disconnect the gate electrode of the second driving transistor Td' in the respective auxiliary pixel driving circuit rap from the same node.

In some embodiments, the light emitting substrate includes n2 number of control signal lines configured to transmit control signals to the n2 number of auxiliary pixel driving circuits, independently. Each of the n2 number of control signal lines ($CSL_1, \ldots, CSL_i, \ldots, CSL_{n2}$, 1≤i≤n2) can independently transmit an individual control signal to an individual auxiliary pixel driving circuit. Each of the n2 number of auxiliary light emitting elements can be turned on or off independently, depending on the individual control signal ($CSL_1, \ldots, CSL_i, \ldots, CSL_{n2}$, 1≤i≤n2) transmitted to the individual auxiliary pixel driving circuit. Light emission in the n2 number of auxiliary light emitting elements can be independently controlled with respect to each individual auxiliary light emitting element. When the i-th control signal provided by $CSL_i$ is a turning-on signal, the same voltage signal (Vdd+Vth+Vss−DL(n) is transmitted to the gate electrode of the driving transistor in the i-th auxiliary pixel driving circuit, thereby turning on the driving transistor in the i-th auxiliary pixel driving circuit. When the i-th control signal provided by $CSL_i$ is a turning-off signal, the gate electrode of the driving transistor in the i-th auxiliary pixel driving circuit is configured not to receive the same voltage signal, and the driving transistor in the i-th auxiliary pixel driving circuit is turned off.

In some embodiments, the respective auxiliary pixel driving circuit rap further includes a second storage capacitor Cst' comprising a first capacitor electrode Ce1' and a second capacitor electrode Ce2'. The first capacitor electrode Ce1' of the second storage capacitor Cst' is coupled to the gate electrode of the switching transistor Ts and to the drain electrode of the control transistor Tc; and the second capacitor electrode Ce2' of the second storage capacitor Cst' is coupled to a constant voltage supply line Vss.

In some embodiments, the respective main pixel driving circuit rmp includes a compensation subcircuit CSC. Optionally, the compensation subcircuit CSC includes a first transistor T1 having a gate electrode coupled to a reset control signal line rst(n), a source electrode coupled to a drain electrode of the first driving transistor Td, and a drain electrode coupled to the gate electrode of the first driving transistor Td and the first capacitor electrode Ce1 of the storage capacitor Cst; a second transistor T2 having a gate electrode coupled to a gate line GL(n), a source electrode coupled to a data line DL(n), and a drain electrode coupled to the second capacitor electrode Ce2 of the storage capacitor Cst; a third transistor T3 having a gate electrode coupled to a light emission control signal line em(n), a source electrode coupled to a constant voltage supply line Vss, and a drain electrode coupled to the second capacitor electrode Ce2 of the storage capacitor Cst and the drain electrode of the second transistor T2; and a fourth transistor T4 having a gate electrode coupled to a reset control signal line rst(n), a source electrode coupled to the constant voltage supply line Vss, and a drain electrode coupled to an anode of a respective main light emitting element LE of the n1 number of main light emitting elements.

In some embodiments, the respective auxiliary pixel driving circuit rap shares the compensation subcircuit CSC with the respective main pixel driving circuit rmp. In some embodiments, threshold voltage levels of the first driving transistor Td and the second driving transistor Td' are substantially the same. Optionally, a ratio of a channel width to a channel length of the active layer in the first driving transistor Td and a ratio of a channel width to a channel length of the active layer in the second driving transistor Td' are substantially the same. In one example, the first driving transistor Td and the second driving transistor Td' are fabricated in the light emitting substrate so that they are proximal to each other, to ensure their threshold voltage levels are substantially the same.

In some embodiments, the respective auxiliary pixel driving circuit rap includes a selection subcircuit SSC. Optionally, the selection subcircuit SSC includes a switching transistor Ts having a source electrode coupled to a first driving transistor Td of the respective main pixel driving circuit rmp and a first capacitor electrode Ce1 of a first storage capacitor Cst of the respective main pixel driving circuit rmp, and a drain electrode coupled to a gate electrode of the second driving transistor Td' of the respective auxiliary pixel driving circuit rap; and a control transistor Tc having a gate electrode coupled to a gate line GL(n), a source electrode coupled to a control signal line CSL, and a drain electrode coupled to a gate electrode of the switching transistor Ts.

In some embodiments, the n1 number of main light emitting elements and the n2 number of auxiliary light emitting elements are configured to emit light of a same color. Optionally, the light of the same color has a wavelength in a range of 435 nm to 480 nm, e.g., 435 nm to 440 nm, 440 nm to 445 nm, 445 nm to 450 nm, 450 nm to 455 nm, 455 nm to 460 nm, 460 nm to 465 nm, 465 nm to 470 nm, 470 nm to 475 nm, or 475 nm to 480 nm. In one example, the light of the same color has a wavelength in a range of 450 nm to 460 nm.

In some embodiments, a respective main light emitting element of the n1 number of main light emitting elements has a first light emitting area; and a respective auxiliary light emitting element of the n2 number of auxiliary light emitting elements has a second light emitting area. Optionally, the first light emitting area is greater than the second light emitting area.

In some embodiments, the n1 number of main light emitting elements has a first combined light emitting area; and the n2 number of auxiliary light emitting elements has a second combined light emitting area. Optionally, the first combined light emitting area is greater than the second combined light emitting area.

In another aspect, the present invention provides a display panel. In some embodiments, the display panel includes the light emitting substrate described herein or fabricated by a method described herein, and a color filter. Referring to FIG. 17, FIG. 18, and FIG. 20, the display panel in some embodiments further includes a color filter comprising a plurality of color filter blocks CFB. An orthographic projection of a respective color filter block of the plurality of color filter blocks CFB on a base substrate BS at least partially overlaps with an orthographic projection of the n1 number of main light emitting elements on the base substrate BS and at least partially overlaps with an orthographic projection of the n2 number of auxiliary light emitting elements on the base substrate BS.

Referring to FIG. 17, FIG. 18, and FIG. 20, the display panel in some embodiments further includes a first encapsulating layer EN1 encapsulating the plurality of light emitting elements, and a second encapsulating layer EN2 encapsulating the plurality of color filter blocks CFB.

Referring to FIG. 17, FIG. 18, and FIG. 20, the display panel in some embodiments further includes a unitary cathode CD extending throughout the plurality of subpixels.

Figure 26:
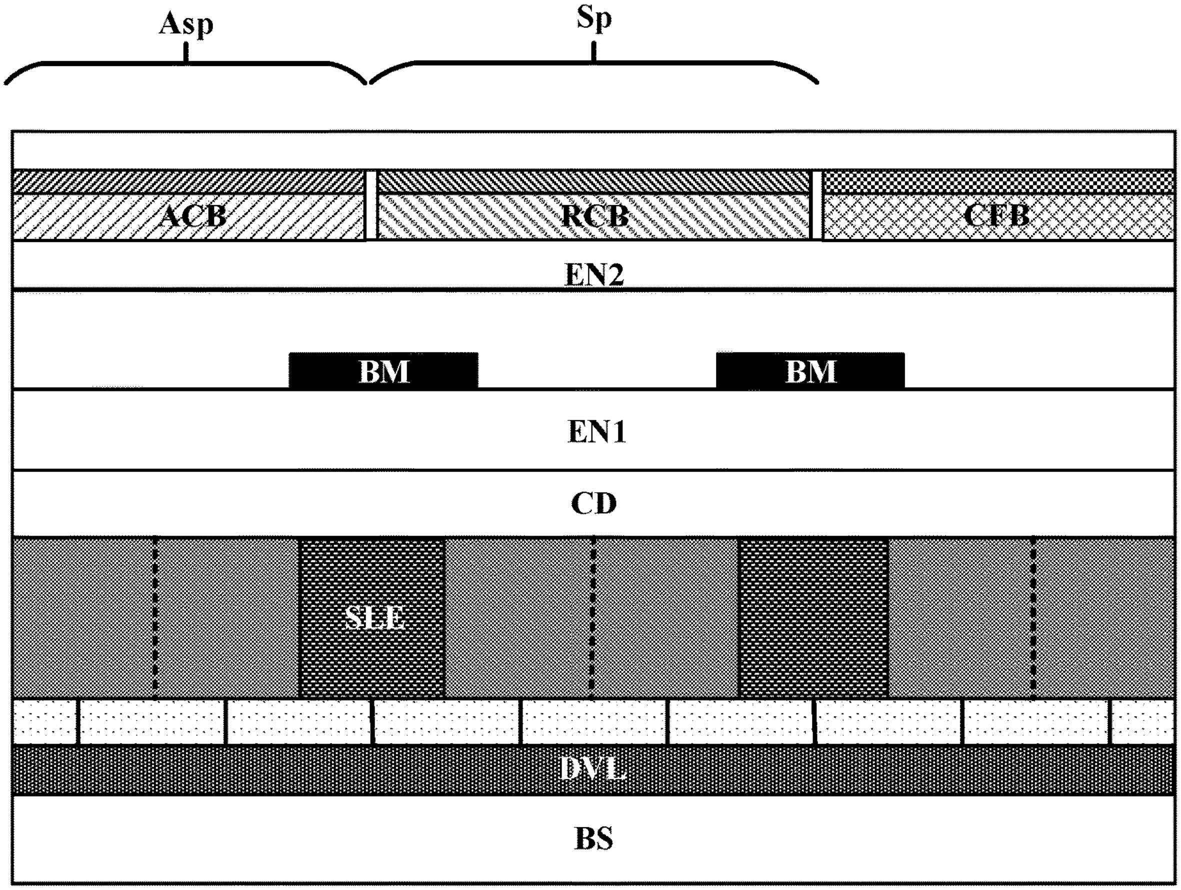
FIG. 26 is a cross-sectional view of a light emitting substrate in some embodiments according to the present disclosure.

In some embodiments, one or more auxiliary light emitting elements may be shared by two adjacent color filter blocks of the plurality of color filter blocks CFB. FIG. 26 is a cross-sectional view of a light emitting substrate in some embodiments according to the present disclosure. Referring to FIG. 26, the light emitting substrate further includes a shared light emitting element SLE and a shared pixel driving circuit that are shared between the respective subpixel Sp and an adjacent subpixel Asp. The shared pixel driving circuit is configured to drive light emission in the shared light emitting element SLE. An orthographic projection of the shared light emitting element SLE on a base substrate BS at least partially overlaps with an orthographic projection of a respective color filter block RCB of the plurality of color filter blocks CFB on a base substrate BS, and at least partially overlaps with an adjacent color filter block ACB of the plurality of color filter blocks CFB on a base substrate BS. The respective color filter block RCB and the adjacent color filter block ACB are adjacent to each other. The respective color filter block RCB corresponds to the respective subpixel Sp, and the adjacent color filter block ACB corresponds to the adjacent subpixel Asp.

In one example, the shared pixel driving circuit is coupled to a respective main pixel driving circuit in the respective subpixel Sp, a gate electrode of a driving transistor in the shared pixel driving circuit is coupled to a gate electrode of a first driving transistor in the main pixel driving circuit in the respective subpixel Sp.

In another example, the shared pixel driving circuit is coupled to a main pixel driving circuit in the adjacent subpixel Asp, a gate electrode of a driving transistor in the shared pixel driving circuit is coupled to a gate electrode of a first driving transistor in the main pixel driving circuit in the adjacent subpixel Asp.

Figure 27:
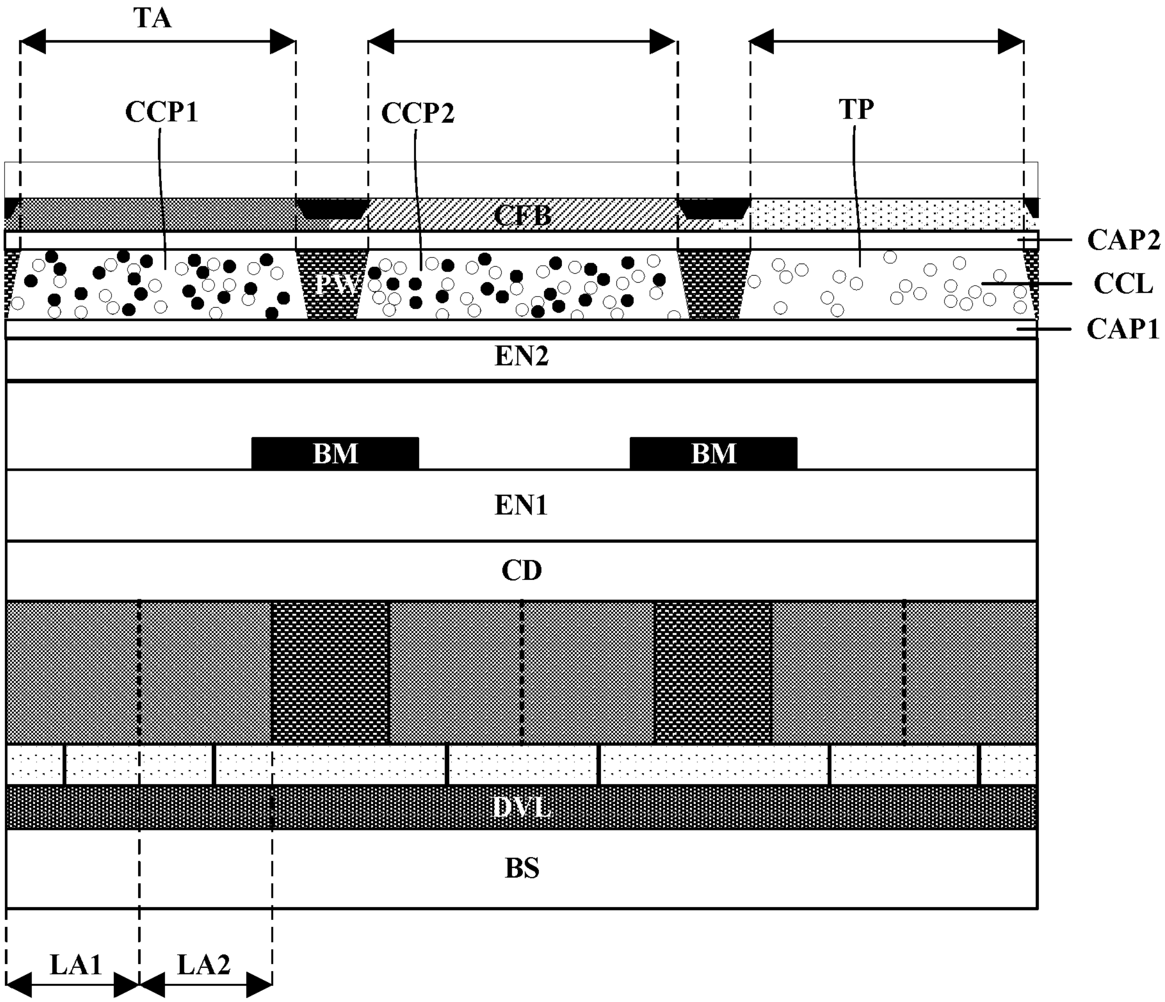
FIG. 27 is a schematic diagram illustrating the structure of a display panel in some embodiments according to the present disclosure.

FIG. 27 is a schematic diagram illustrating the structure of a display panel in some embodiments according to the present disclosure. Referring to FIG. 27, the color filter in some embodiments includes a plurality of color filter blocks CFB in a plurality of light transmittance areas TA, respectively. The n1 number of main light emitting elements have first light emitting areas LA1. The n2 number of auxiliary light emitting elements have second light emitting areas LA2. In some embodiments, a respective light transmittance area of the plurality of light transmittance areas TA at least partially overlaps with first light emitting areas of the n1 number of main light emitting elements, and at least partially overlaps with second light emitting areas of the n2 number of auxiliary light emitting elements.

In some embodiments, the display panel further includes a color conversion layer CCL. Optionally, the color conversion layer CCL includes a plurality of color conversion blocks of a first color CCP1, a plurality of color conversion blocks of a second color CCP2, and a plurality of light transmissive blocks, and optionally, a plurality of light transmissive blocks TP. In one example, the first color is a red color, the second color is a green color. The plurality of light transmissive blocks TP do not convert light into a different wavelength. In another example, the plurality of light transmissive blocks TP correspond to blue subpixels.

In some embodiments, the display panel includes a first capping layer CAP1 on the light emitting substrate; a color conversion layer CCL on a side of the first capping layer CAP1 away from the light emitting substrate; and a second capping layer CAP2 on a side of the color conversion layer CCL away from the first capping layer CAP1. Optionally, the color filter is on a side of the second capping layer CAP2 away from the color conversion layer CCL. The first capping layer CAP1 and the second capping layer CAP2 may be made of an inorganic insulating material such as silicon dioxide, silicon nitride, and silicon oxynitride.

Figure 28A:
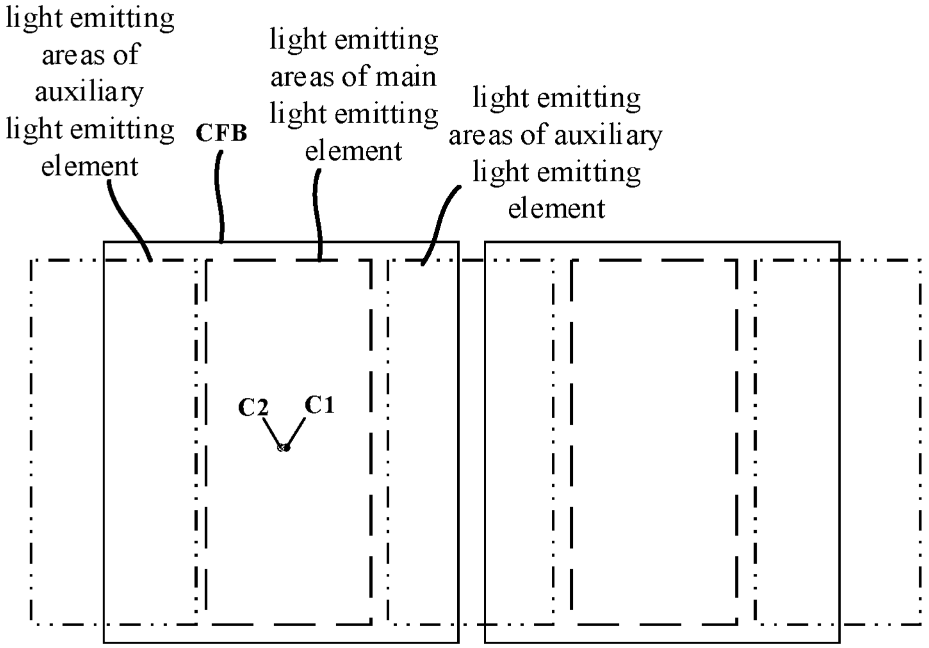
FIG. 28A is a plan view of a color filter and light emitting elements in some embodiments according to the present disclosure.

FIG. 28A is a plan view of a color filter and light emitting elements in some embodiments according to the present disclosure. Referring to FIG. 28A, a respective color filter block of the plurality of color filter blocks CFB is in a respective light transmittance area of the plurality of light transmittance areas (e.g., "TA" in FIG. 27). In some embodiments, a respective light transmittance area of the plurality of light transmittance areas at least partially overlaps with light emitting areas of the n1 number of main light emitting elements, and at least partially overlaps with light emitting areas of the n2 number of auxiliary light emitting elements. Optionally, the respective light transmittance area of the plurality of light transmittance areas completely covers light emitting areas of the n1 number of main light emitting elements, and at least partially overlaps with light emitting areas of the n2 number of auxiliary light emitting elements.

In some embodiments, an orthographic projection of a respective color filter block of the plurality of color filter blocks CFB on a base substrate at least partially overlaps with an orthographic projection of the n1 number of main light emitting elements on the base substrate, and at least partially overlaps with an orthographic projection of the n2 number of auxiliary light emitting elements on the base substrate. Optionally, the orthographic projection of a respective color filter block of the plurality of color filter blocks CFB on the base substrate completely covers an orthographic projection of the n1 number of main light emitting elements on the base substrate, and at least partially overlaps with the orthographic projection of the n2 number of auxiliary light emitting elements on the base substrate.

In some embodiments, a center C1 of an orthographic projection of the n1 number of main light emitting elements on a base substrate substantially overlaps with a center C2 of an orthographic projection of a respective color filter block of the plurality of color filter blocks on the base substrate. As used herein, the term "substantially overlap" refers to that two points (e.g., "centers") are spaced apart by no more than 1000 μm, e.g., no more than 900 μm, no more than 800 μm, no more than 700 μm, no more than 600 μm, no more than 500 μm, no more than 400 μm, no more than 300 μm, no more than 200 μm, no more than 100 μm, no more than 90 μm, no more than 80 μm, no more than 70 μm, no more than 60 μm, no more than 50 μm, no more than 40 μm, no more than 30 μm, no more than 20 μm, no more than 10 μm, no more than 5 μm, no more than 4 μm, no more than 3 μm, no more than 2 μm, or no more than 1 μm.

Figure 28B:
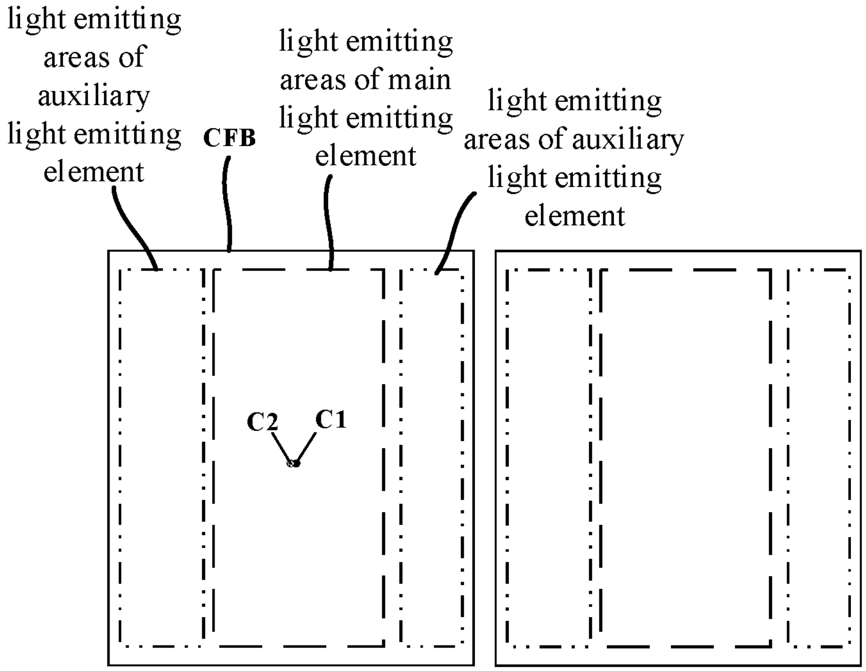
FIG. 28B is a plan view of a color filter and light emitting elements in some embodiments according to the present disclosure.

FIG. 28B is a plan view of a color filter and light emitting elements in some embodiments according to the present disclosure. Referring to FIG. 28B, a respective light transmittance area of the plurality of light transmittance areas completely covers light emitting areas of the n1 number of main light emitting elements, and completely covers light emitting areas of the n2 number of auxiliary light emitting elements. Optionally, an orthographic projection of a respective color filter block of the plurality of color filter blocks CFB on a base substrate completely covers an orthographic projection of the n1 number of main light emitting elements on the base substrate, and completely covers an orthographic projection of the n2 number of auxiliary light emitting elements on the base substrate. Optionally, a center C1 of an orthographic projection of the n1 number of main light emitting elements on a base substrate substantially overlaps with a center C2 of an orthographic projection of a respective color filter block of the plurality of color filter blocks on the base substrate. In FIG. 28B, a respective light emitting area of a respective main light emitting element is greater than a respective light emitting area of a respective auxiliary light emitting element.

Figure 28C:
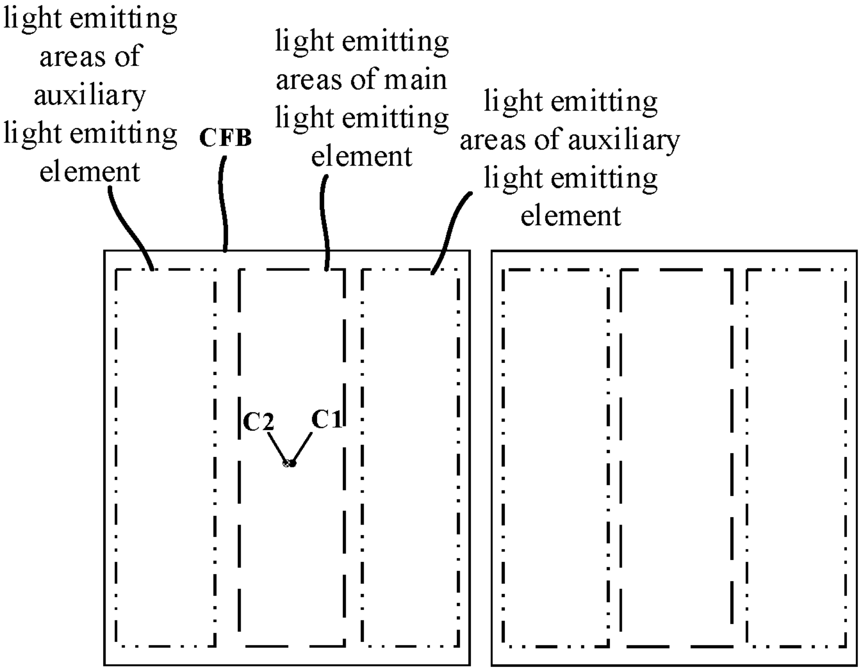
FIG. 28C is a plan view of a color filter and light emitting elements in some embodiments according to the present disclosure.

FIG. 28C is a plan view of a color filter and light emitting elements in some embodiments according to the present disclosure. Referring to FIG. 28C, a respective light emitting area of a respective main light emitting element is substantially the same as a respective light emitting area of a respective auxiliary light emitting element.

As used herein, the term "center" refers to, for example, a geometric center (particularly for a regular shape), an approximate geometric center, an equivalent center such as a center of mass or a center of gravity (particularly for an irregular shape).

In another aspect, the present invention provides a display apparatus, including the scan circuit and the light emitting substrate described herein or fabricated by a method described herein, the scan circuit configured to provide control signals to the light emitting substrate. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

In some embodiments, the display apparatus includes one or more processors configured to determine a display mode for a respective subpixel of the plurality of subpixels in the display apparatus. In some embodiments, the one or more processors are configured to receive data signals for image display in the display panel from a printed circuit, the one or more processors are further configured to determine whether or not at least a portion of the display panel comprising the respective subpixel is configured to display a monochromatic image, based on the data signals. Optionally, upon determination that at least a portion of the display panel comprising the respective subpixel is configured to display a monochromatic image, the one or more processors is configured to transmit one or more signals to the respective subpixel, controlling light emission of the respective subpixel to be limited in the n1 number of main light emitting elements and m number of the n2 number of auxiliary light emitting elements, $0 \leq m \leq n2$.

In some embodiments, the one or more processors are configured to receive data signals for a frame of image, the one or more processors are further configured to determine whether or not a first frame of image of the respective subpixel has a high contrast compared to a frame of image in an adjacent subpixel, based on the data signals. Optionally, upon determination that the first frame of image of the respective subpixel has a high contrast compared to the frame of image in an adjacent subpixel, the one or more processors is configured to transmit one or more signals to the respective subpixel, controlling light emission of the respective subpixel to be limited in the n1 number of main light emitting elements and m number of the n2 number of auxiliary light emitting elements, $0 \leq m \leq n2$.

In some embodiments, the one or more processors are configured to receive data signals for a frame of image, the one or more processors are further configured to determine whether or not at least a portion of the display panel comprising the respective subpixel is configured to display a color image. Optionally, upon determination that at least a portion of the display panel comprising the respective subpixel is configured to display a color image, the one or more processors is configured to transmit one or more signals to the respective subpixel, controlling light emission of the respective subpixel to be limited in the n1 number of main light emitting elements and m' number of the n2 number of auxiliary light emitting elements, 0≤m'≤n2, and m ≠m'.

In some embodiments, the one or more processors are configured to receive data signals for a frame of image, the one or more processors are further configured to transmit one or more signals to the respective subpixel, controlling light emission of the respective subpixel to be limited in the n1 number of main light emitting elements and m" number of the n2 number of auxiliary light emitting elements, 1<m"<n2, and m<m"<m'.

In another aspect, the present invention provides a method of fabricating a scan circuit. In some embodiments, the method includes forming a plurality of scan units in a plurality of stages, respectively. In some embodiments, forming a respective scan unit of the plurality of scan units includes forming at least one of an input subcircuit, a first processing subcircuit, a second processing subcircuit, or an output subcircuit. Optionally, the respective scan unit is configured to receive at least one of a first clock signal, a second clock signal, a third clock signal, a fourth clock signal, a first reference signal, or a second reference signal. Optionally, forming the output subcircuit includes forming a first output terminal, forming a second output terminal, forming a twelfth transistor, and forming a fourteenth transistor. Optionally, forming the output subcircuit includes coupling a source electrode of the twelfth transistor to a third terminal configured to receive the first clock signal; coupling a drain electrode of the twelfth transistor to the first output terminal configured to output a first control signal; coupling a source electrode of the fourteenth transistor to a fourth terminal configured to receive the third clock signal; coupling a drain electrode of the fourteenth transistor to the second output terminal configured to output a second control signal; and coupling gate electrodes of the twelfth transistor and the fourth transistor to a first node.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A scan circuit, comprising a plurality of scan subcircuits in a plurality of stages, respectively;

wherein a respective scan subcircuit of the plurality of scan subcircuits comprises an output subcircuit, and at least one of an input subcircuit, a first processing subcircuit, or a second processing subcircuit;

the respective scan subcircuit is configured to receive at least one of a first clock signal, a second clock signal, a third clock signal, a fourth clock signal, a first reference signal, or a second reference signal;

wherein the output subcircuit comprises a first output terminal, a second output terminal, a first switch transistor, and a second switch transistor;

a source electrode of the first switch transistor is coupled to a third terminal configured to receive the first clock signal;

a drain electrode of the first switch transistor is coupled to the first output terminal configured to output a first control signal;

a source electrode of the second switch transistor is coupled to a fourth terminal configured to receive the third clock signal;

a drain electrode of the second switch transistor is coupled to the second output terminal configured to output a second control signal; and gate electrodes of the first switch transistor and the second switch transistor are coupled to a first node;

wherein the first processing subcircuit comprises a second transistor, a third transistor, a fourth transistor, and a fifth transistor;

source electrodes of the third transistor and the fourth transistor are coupled to a drain electrode of the fifth transistor;

drain electrodes of the third transistor and the fourth transistor are coupled to a third node;

a gate electrode of the third transistor is coupled to the third terminal configured to receive the first clock signal; and a gate electrode of the fourth transistor is coupled to the fourth terminal configured to receive the third clock signal;

wherein a gate electrode of the fifth transistor and a drain electrode of the second transistor are coupled to a second node;

a source electrode of the fifth transistor is coupled to a fifth terminal configured to receive the first reference signal; and a source electrode of the second transistor is coupled to a second terminal configured to receive the second reference signal.

2. The scan circuit of claim 1, wherein the output subcircuit further comprises a first control transistor and a second control transistor;

a source electrode of the first control transistor and a source electrode of the second control transistor are coupled to a fifth terminal configured to receive the first reference signal;

a drain electrode of the first control transistor is coupled to the first output terminal;

a drain electrode of the second control transistor is coupled to the second output terminal; and gate electrodes of the first control transistor and the second control transistor are coupled to a second node.

3. The scan circuit of claim 2, wherein the output subcircuit further comprises an eleventh transistor coupled between the first control transistor and the first switch transistor;

a gate electrode of the eleventh transistor is coupled to the first node; and at least one of a source electrode and a drain electrode of the eleventh transistor is coupled to the first output terminal.

4. The scan circuit of claim 3, wherein both of the source electrode and the drain electrode of the eleventh transistor is coupled to the first output terminal.

5. The scan circuit of claim 2, wherein the respective scan subcircuit further comprises a second capacitor;

a first capacitor electrode of the second capacitor is coupled to the source electrode of the first control transistor; and a second capacitor electrode of the second capacitor is coupled to the second node.

6. The scan circuit of claim 1, wherein the respective scan subcircuit further comprises a third capacitor;

a first capacitor electrode of the third capacitor is coupled to the first node; and a second capacitor electrode of the third capacitor is coupled to a second terminal configured to receive a second reference signal.

7. The scan circuit of claim 1, wherein the input subcircuit comprises an input transistor, a first transistor, an input terminal, and a first terminal;

a gate electrode of the input transistor and a source electrode of the first transistor are coupled to the first terminal configured to receive the second clock signal;

a gate electrode of the first transistor and a drain electrode of the input transistor are coupled to a third node;

a source electrode of the input transistor is coupled to the input terminal configured to receive a start signal or an output signal from a previous scan subcircuit of a previous stage; and a drain electrode of the first transistor is coupled to a second node.

8. The scan circuit of claim 1, wherein the second processing subcircuit comprises a seventh transistor and an eighth transistor;

a gate electrode of the seventh transistor is coupled to a fourth node;

a source electrode of the seventh transistor and a gate electrode of the eighth transistor are coupled to a sixth terminal configured to receive the fourth clock signal;

a drain electrode of the seventh transistor and a source electrode of the eighth transistor are coupled to a fifth node; and a drain electrode of the eighth transistor is coupled to the first node.

9. The scan circuit of claim 1, wherein the respective scan subcircuit further comprises a third processing subcircuit;

wherein the third processing subcircuit comprises a ninth transistor having a gate electrode coupled to a second node, a source electrode coupled to a sixth terminal configured to receive the fourth clock signal, and a drain electrode coupled to the first node.

10. A display apparatus, comprising a light emitting substrate and the scan circuit of claim 1, the scan circuit configured to provide control signals to the light emitting substrate.

11. The display apparatus of claim 10, comprising a plurality of subpixels;

wherein a respective subpixel of the plurality of subpixels comprises:

a first light emitting element;

a first pixel driving circuit configured to control light emission in the first light emitting element;

a second light emitting element; and a second pixel driving circuit configured to control light emission in the second light emitting element;

wherein the first pixel driving circuit is configured to receive the first control signal output from the first output terminal; and the second pixel driving circuit is configured to receive the second control signal output from the second output terminal.

12. The display apparatus of claim 11, wherein the first light emitting element and the second light emitting element are configured to emit a light of a same color.

13. The display apparatus of claim 11, further comprising a color filter substrate;

wherein the color filter substrate comprises:

a color conversion layer comprising a plurality of color conversion blocks; and a color filter comprising a plurality of color filter blocks.

14. A scan circuit, comprising a plurality of scan subcircuits in a plurality of stages, respectively;

wherein a respective scan subcircuit of the plurality of scan subcircuits comprises an output subcircuit, and at least one of an input subcircuit, a first processing subcircuit, or a second processing subcircuit;

the respective scan subcircuit is configured to receive at least one of a first clock signal, a second clock signal, a third clock signal, a fourth clock signal, a first reference signal, or a second reference signal;

wherein the output subcircuit comprises a first output terminal, a second output terminal, a first switch transistor, and a second switch transistor;

a source electrode of the first switch transistor is coupled to a third terminal configured to receive the first clock signal;

a drain electrode of the first switch transistor is coupled to the first output terminal configured to output a first control signal;

a source electrode of the second switch transistor is coupled to a fourth terminal configured to receive the third clock signal;

a drain electrode of the second switch transistor is coupled to the second output terminal configured to output a second control signal; and gate electrodes of the first switch transistor and the second switch transistor are coupled to a first node;

wherein the second processing subcircuit comprises a seventh transistor and an eighth transistor;

a gate electrode of the seventh transistor is coupled to a fourth node;

a source electrode of the seventh transistor and a gate electrode of the eighth transistor are coupled to a sixth terminal configured to receive the fourth clock signal;

a drain electrode of the seventh transistor and a source electrode of the eighth transistor are coupled to a fifth node; and a drain electrode of the eighth transistor is coupled to the first node;

wherein the second processing subcircuit further comprises a sixth transistor and a first capacitor;

a gate electrode of the sixth transistor is coupled to a second terminal configured to receive the second reference signal;

a source electrode of the sixth transistor is coupled to a third node;

a drain electrode of the sixth transistor and a first capacitor electrode of the first capacitor are coupled to the fourth node; and a second capacitor electrode of the first capacitor is coupled to the fifth node.

15. A method of operating a display apparatus comprising a light emitting substrate and a scan circuit configured to provide control signals to the light emitting substrate, comprising:

providing at least one of a first clock signal, a second clock signal, a third clock signal, a fourth clock signal, a first reference signal, or a second reference signal to a respective scan subcircuit of a plurality of scan subcircuits of the scan circuit;

outputting an effective voltage of the first clock signal as a first control signal to the light emitting substrate; and outputting an effective voltage of the third clock signal as a second control signal to the light emitting substrate;

wherein the first control signal and the second control signal are out of phase with respect to each other; and the light emitting substrate comprises a plurality of subpixels, a respective subpixel of the plurality of subpixels comprising at least a main light emitting element driven by a main pixel driving circuit and at least an auxiliary light emitting element driven by an auxiliary pixel driving circuit;

wherein the method further comprises:

providing the first control signal to the main pixel driving circuit;

providing the second control signal to the auxiliary pixel driving circuit;

providing a first data signal to the main pixel driving circuit; and providing a second data signal to the auxiliary pixel driving circuit;

wherein the first data signal and the second data signal are provided using a single data line connecting a source integrated circuit and the light emitting substrate.

16. The method of claim 15, wherein outputting the first control signal and outputting the second control signal comprise:

providing the first clock signal to a source electrode of a first switch transistor;

providing the third clock signal to a source electrode of a second switch transistor; and coupling gate electrodes of the first switch transistor and the second switch transistor to a first node.

17. The method of claim 15, further comprising:

adjusting the third clock signal to have a constant ineffective voltage level; and outputting an ineffective voltage of the third clock signal to the light emitting substrate.

* * * * *